(12) United States Patent
Fife et al.

(10) Patent No.: US 11,973,344 B2
(45) Date of Patent: *Apr. 30, 2024

(54) SYSTEMS AND METHODS TO AGGREGATE DISTRIBUTED ENERGY RESOURCES

(71) Applicant: Enel X North America, Inc., Boston, MA (US)

(72) Inventors: John Michael Fife, Bend, OR (US); Gregg Patterson, Spokane, WA (US)

(73) Assignee: Enel X North America, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,372

(22) Filed: Dec. 28, 2018

(65) Prior Publication Data
US 2020/0004212 A1 Jan. 2, 2020

Related U.S. Application Data

(60) Provisional application No. 62/693,321, filed on Jul. 2, 2018.

(51) Int. Cl.
*G05B 13/04* (2006.01)
*G05B 19/042* (2006.01)
(Continued)

(52) U.S. Cl.
CPC ............ *H02J 3/003* (2020.01); *G05B 13/048* (2013.01); *G05B 19/0421* (2013.01);
(Continued)

(58) Field of Classification Search
CPC ..... G05B 13/048; G05B 19/0421; H02J 3/06; H02J 3/34; H02J 13/0013; H02J 3/46;
(Continued)

(56) References Cited

U.S. PATENT DOCUMENTS 6,366,889 B1* 4/2002 Zaloom .................. G06Q 10/04
705/7.37
7,321,810 B2* 1/2008 Mansingh ........... H02J 3/00125
700/286

(Continued)

OTHER PUBLICATIONS

Tsikalakis et al, "Centralized Control for Optimizing Microgrids Operation", 2008, pp. 1-8, downloaded from teh internet, https://ieeexplore.ieee.org/document/4454000 (Year: 2008).*

(Continued)

*Primary Examiner* — Robert E Fennema
*Assistant Examiner* — Olvin Lopez Alvarez
(74) *Attorney, Agent, or Firm* — Foley & Lardner LLP

(57) ABSTRACT

The present disclosure is directed to systems and methods for economically optimal control of an electrical system. Some embodiments employ generalized multivariable constrained continuous optimization techniques to determine an optimal control sequence over a future time domain in the presence of any number of costs, savings opportunities (value streams), and constraints. Some embodiments also include control methods that enable infrequent recalculation of the optimal setpoints. Some embodiments may include a battery degradation model that, working in conjunction with the economic optimizer, enables the most economical use of any type of battery. Some embodiments include techniques for load and generation learning and prediction. Some embodiments include consideration of external data, such as weather.

22 Claims, 25 Drawing Sheets

(51) Int. Cl.
| | |
|---|---|
| *H02J 3/00* | (2006.01) |
| *H02J 3/06* | (2006.01) |
| *H02J 3/32* | (2006.01) |
| *H02J 3/34* | (2006.01) |
| *H02J 3/38* | (2006.01) |
| *H02J 3/46* | (2006.01) |
| *H02J 13/00* | (2006.01) |
| *G06F 17/13* | (2006.01) |
| *G06Q 50/06* | (2012.01) |

(52) U.S. Cl.
CPC ............... *H02J 3/004* (2020.01); *H02J 3/06* (2013.01); *H02J 3/34* (2013.01); *H02J 3/381* (2013.01); *H02J 3/466* (2020.01); *H02J 13/00032* (2020.01); *G06F 17/13* (2013.01); *G06Q 50/06* (2013.01); *H02J 2300/40* (2020.01); *Y04S 10/12* (2013.01)

(58) Field of Classification Search
CPC .... H02J 3/32; H02J 3/381; H02J 3/001; H02J 3/004; H02J 2300/10; H02J 3/003; H02J 13/00032; H02J 2300/40; H02J 2310/10; H02J 13/0006; G06F 17/13; G06Q 50/06; Y04S 50/16; Y04S 50/10
See application file for complete search history.

(56) References Cited

U.S. PATENT DOCUMENTS

| | | | | |
|---|---|---|---|---|
| 8,849,687 | B2* | 9/2014 | Hakim | G06Q 10/06315 705/7.13 |
| 9,811,061 | B1* | 11/2017 | Hu | H02J 3/00 |
| 10,423,138 | B2* | 9/2019 | Elbsat | H02J 3/003 |
| 10,770,897 | B1* | 9/2020 | Hertz-Shargel | H02J 3/00 |
| 11,101,651 | B2* | 8/2021 | Pavlak | G05B 13/045 |
| 11,594,884 | B2 | 2/2023 | Fife et al. | |
| 2003/0055676 | A1* | 3/2003 | Huneycutt | G06Q 50/06 705/412 |
| 2003/0144864 | A1* | 7/2003 | Mazzarella | H02J 3/004 705/412 |
| 2004/0024494 | A1* | 2/2004 | Bayoumi | H02J 13/0062 700/286 |
| 2005/0043862 | A1 | 2/2005 | Brickfield et al. | |
| 2007/0078856 | A1 | 4/2007 | Dettinger et al. | |
| 2009/0040029 | A1* | 2/2009 | Bridges | B60L 55/00 340/12.37 |
| 2009/0319090 | A1* | 12/2009 | Dillon | G06Q 10/04 700/291 |
| 2011/0106328 | A1* | 5/2011 | Zhou | G05B 13/024 700/291 |
| 2011/0125337 | A1 | 5/2011 | Zavadsky et al. | |
| 2011/0231028 | A1* | 9/2011 | Ozog | G06Q 50/06 700/291 |
| 2012/0029720 | A1* | 2/2012 | Cherian | H02J 13/00 700/297 |
| 2012/0130556 | A1* | 5/2012 | Marhoefer | G06Q 50/06 700/291 |
| 2013/0046895 | A1* | 2/2013 | Metcalfe | H02J 3/008 709/226 |
| 2013/0060719 | A1* | 3/2013 | Burke | G06Q 10/06312 705/412 |
| 2013/0282193 | A1* | 10/2013 | Tyagi | H02J 3/008 700/291 |
| 2014/0018971 | A1 | 1/2014 | Ellis et al. | |
| 2014/0039709 | A1* | 2/2014 | Steven | H02J 3/008 700/291 |
| 2014/0214231 | A1 | 7/2014 | Parsonnet et al. | |
| 2014/0277599 | A1* | 9/2014 | Pande | H02J 3/32 700/22 |
| 2014/0350743 | A1* | 11/2014 | Asghari | G05B 13/048 700/297 |
| 2015/0088315 | A1 | 3/2015 | Behrangrad | |
| 2015/0127185 | A1* | 5/2015 | Behrangrad | H02J 13/00001 700/297 |
| 2015/0185716 | A1 | 7/2015 | Wichmann et al. | |
| 2015/0338869 | A1* | 11/2015 | Behrangrad | G05B 15/02 700/291 |
| 2016/0239006 | A1* | 8/2016 | Mokhtari | H02J 3/14 |
| 2017/0005474 | A1* | 1/2017 | Sanders | H02J 3/383 |
| 2017/0005515 | A1* | 1/2017 | Sanders | H02J 3/14 |
| 2017/0163039 | A1* | 6/2017 | Schwarz | G06Q 10/06375 |
| 2017/0206614 | A1* | 7/2017 | Hwang | G06Q 50/06 |
| 2017/0207629 | A1* | 7/2017 | Seki | H02J 3/00 |
| 2018/0088616 | A1* | 3/2018 | Aggarwal | G06Q 50/06 |
| 2018/0217568 | A1* | 8/2018 | Parvania | H02J 3/008 |
| 2018/0269687 | A1* | 9/2018 | Ghaemi | H02J 3/381 |
| 2018/0285800 | A1* | 10/2018 | Wenzel | H02J 3/00 |
| 2018/0294649 | A1* | 10/2018 | Bright | G05B 13/041 |
| 2018/0321648 | A1* | 11/2018 | Makino | G06Q 50/06 |
| 2018/0342872 | A1* | 11/2018 | Mirzazad Barijough | H02J 13/00016 |
| 2018/0356781 | A1* | 12/2018 | Fu | G05B 19/042 |
| 2019/0020220 | A1* | 1/2019 | Lian | H02J 13/00034 |
| 2019/0165577 | A1* | 5/2019 | Carr | H02J 3/14 |
| 2020/0004212 | A1 | 1/2020 | Fife et al. | |
| 2020/0006944 | A1 | 1/2020 | Fife et al. | |
| 2020/0202459 | A1* | 6/2020 | Chow | G06Q 50/06 |
| 2020/0259329 | A1* | 8/2020 | Brissette | G06Q 30/0283 |
| 2022/0209574 | A1* | 6/2022 | Fife | H02J 3/144 |

OTHER PUBLICATIONS

Dethlefs et al "Multi-Agent-based distributed optimization for Demand-Side-Management applications", 2014, pp. 1489-1496 downloaded from https://ieeexplore.ieee.org/stamp/stamp.jsp?tp=&arnumber=6933194 (Year: 2014).*

Hossa et al (The comparison of medium-term energy demand forecasting methods for the need of microgrid management), 2015, pp. 590-595, downloaded from https://ieeexplore.ieee.org/document/7007711 (Year: 2015).*

Dmitri et al (Comparison of Regression and Neural Network Approaches to Forecast Daily Power Consumption), 2016, pp. 247-250, downloaded from https://ieeexplore.ieee.org/document/7884239 (Year: 2016).*

Hernandez et al (A Study of the Relationship between Weather Variables and Electric Power Demand inside a Smart Grid/Smart World Framework), 2012, pp. 11571-11591, downloaded from https://www.mdpi.com/1424-8220/12/9/11571 (Year: 2012).*

Friedman, et al., Distributed Energy Resources Interconnection Systems: Technology Review and Research Needs, Sep. 2002, National Renewable Energy Laboratory NREL/SR-560-32459, Subcontractor Report, http://www.osti.gov/bridge , pp. 163.

Zurborg, et al., Unlocking Customer Value: The Virtual Power Plant, World Power 2010, pp. 1-5.

Fife , et al., Office Action dated Apr. 2, 2020 for U.S. Appl. No. 16/235,399, pp. 38.

PJM , "Retail Electricity Consumer Opportunities for Demand Response in PJM's Wholesale Markets: Demand Response and why it's important", Accessed at https://web.archive.org/web/20131029013518/https://www.pjm.com/-/media/markets-ops/dsr/end-use-customer-fact-sheet.ashx, Oct. 29, 2013, 3 pgs (year 2013).

Prabhu , et al., "Implementation of Demand Response a University Campus", Energy Research and Development Division Final Project Report, California Energy Commission, Aug. 2015, (year 2015), pp. 81.

Xcel Energy , "2015-2016 Demand-Side Management Plan: Electric and Natural Gas", Public Service Company of Colorado, Aug. 20, 2015, 519 pgs. (Year 2015).

Fife , et al., Office Action dated Oct. 8, 2020 for U.S. Appl. No. 16/235,399.

Fife , et al., Office Action dated Jun. 10, 2021 for U.S. Appl. No. 16/235,399.

Fife , et al., Office Action dated Jan. 24, 2022 for U.S. Appl. No. 16/235,399.

Gross et al., "Short-Term Load Forecasting" Proceedings of the IEEE, vol. 75, No. 12, Dec. 1987, pp. 1558-1573.

(56) References Cited

OTHER PUBLICATIONS

Johnson et al., "Design and Implementation of a Secure Virtual Power Plant" Sandia Report, Sandia National Laboratories, Sep. 2017, 90 pgs.
Hernandez et al., "A Survey on Electric Power Demand Forecasting: Future Trends in Smart Grids, Microgrids and Smart Buildings" IEEE Communications Surveys & Tutorials ( vol. 16, Issue: 3, Third Quarter 2014), pp. 1460-1495.
Sharma et al., "Recursive short-term load-forecasting algorithm" PROC. I EE, vol. 121, No. 1, Jan. 1974, pp. 59-62.

* cited by examiner

SYSTEMS AND METHODS TO AGGREGATE DISTRIBUTED ENERGY RESOURCES

RELATED APPLICATIONS

This application claims priority to U.S. Provisional Patent Application No. 62/693,321, titled "INTELLIGENT AGGREGATION OF DISTRIBUTED ENERGY RESOURCES, AND RELATED SYSTEMS, APPARATUSES, AND METHODS," filed Jul. 2, 2018, which is hereby incorporated herein by reference to the extent such subject matter is not inconsistent herewith.

TECHNICAL FIELD

The present disclosure is directed to aggregating distributed energy resources, and more particularly to systems and methods for intelligent aggregation of distributed energy resources.

BACKGROUND

Electricity supply and delivery costs continue to rise, especially in remote or congested areas. Moreover, load centers (e.g., population centers where electricity is consumed) increasingly demand more electricity. Historically in the U.S., energy infrastructure has been organized so that power is mostly produced by resources inland, and consumption of power is increasing at load centers along the coasts. Transmission and distribution (T&D) systems have been used to move the power from where it's generated to where it's consumed at the load centers. As the load centers demand more electricity, additional T&D systems are needed, particularly to satisfy peak demand. However, T&D systems are expensive and construction of additional T&D systems may be unwise and/or undesirable because full utilization of this additional infrastructure is really only necessary during relatively few peak demand periods, and would otherwise be unutilized or underutilized. Justifying the significant costs of constructing additional T&D resources may make little sense when actual utilization may be relatively infrequent.

Distributed energy resources (DER) are increasingly viewed as a viable means for minimizing rising costs by storing, generating, or refraining from consuming electricity at or closer to the load centers for use during the peak demand times. A DER may refer to one or more of a variety of modular electricity-generating, storage, or consuming technologies, individually or in combination, that is positioned at or close to a load served by or including the DER. Many DER applications are interconnected with a local electrical utility distribution system (the "grid").

A DER may include an energy storage system (ESS) that can enable a consumer of energy to reduce or otherwise control a net consumption from an energy supplier. For example, if electricity supply and/or delivery costs are high at a particular time of day, an ESS, which may include one or more batteries or other storage devices, can generate/discharge electrical energy at that time when costs are high in order to reduce the net consumption from the supplier. Likewise, when electricity rates are low, the ESS may charge so as to have reserve energy to be utilized in a later scenario as above when supply and/or delivery costs are high.

A DER may include a generation system that can be activated to produce energy for consumption by the load center and/or for storage by the ESS for later consumption. For example, any of a photovoltaic (PV) system, a wind farm, or a fuel powered generator may generate electrical energy to be supplied to the load or stored by the ESS.

An individual DER can provide a consumer of energy significant ability to control costs. However, this ability to control costs eludes the electricity provider (e.g., utility) on the grid side of electrical distribution. An electricity provider can offer incentives and other encouragement to consumers to use DERs, but remains at the mercy of consumers to deploy a DER and to use the DER in a manner to provide desired behavior. For example, during a "demand peak," the grid may remain unimpacted by a plurality of DERs that are not put into a state for the consumer to use electricity from the DER rather than from the electricity provider. Electricity providers simply cannot rely upon independent DERs to deliver power in a coordinated manner on short notice to maintain grid stability.

Attempts to leverage the cost savings enabled by DERs for the benefit of an electricity provider have included efforts to aggregate DERs in a coordinated manner to provide a response to a demand on the grid. A plurality of DERs can be linked together by an electronic network and remotely controlled at a centralized system to operate as a virtual power plant (VPP), to reduce customer energy demand at peak hours, and provide reliable energy generation for electricity providers to offset some of the needs for more conventional sources of electricity to meet consumer demands. Electricity providers in the U.S. and Europe are increasingly experimenting with VPPs to help manage and harness the value of DERs scattered across the grid.

While the concept of VPPs is enticing in theory, implementation to effectively aggregate DERs is challenging. Leveraging DERs in a manner to provide a utility-requested power level response without adversely affecting an electricity consumer service, including an electricity consumer's DER resource(s) is extremely difficult. For example, a VPP would not take into consideration activities planned at the sites where the DERs are located, DER size, and expected operating costs on a particular day. For example, a site in a VPP group may have already committed a DER to another service and may therefore have a high cost of participation. As another example, a site in a VPP group may have a larger DER and therefore may have more capacity available than the other sites and can therefore participate at a lower cost. Traditional VPPs do not take into consideration these specific factors of the individual DERs and sites.

An aggregation engine (e.g., a centralized controller) that functions as a centralized optimization engine to economically optimize aggregation of DERs may be beneficial and may be desirable to enable intelligent actions to be taken in order to more effectively utilize DERs such as by minimizing the total electricity-related cost of the group, without the aforementioned drawbacks.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION

Figure 1:
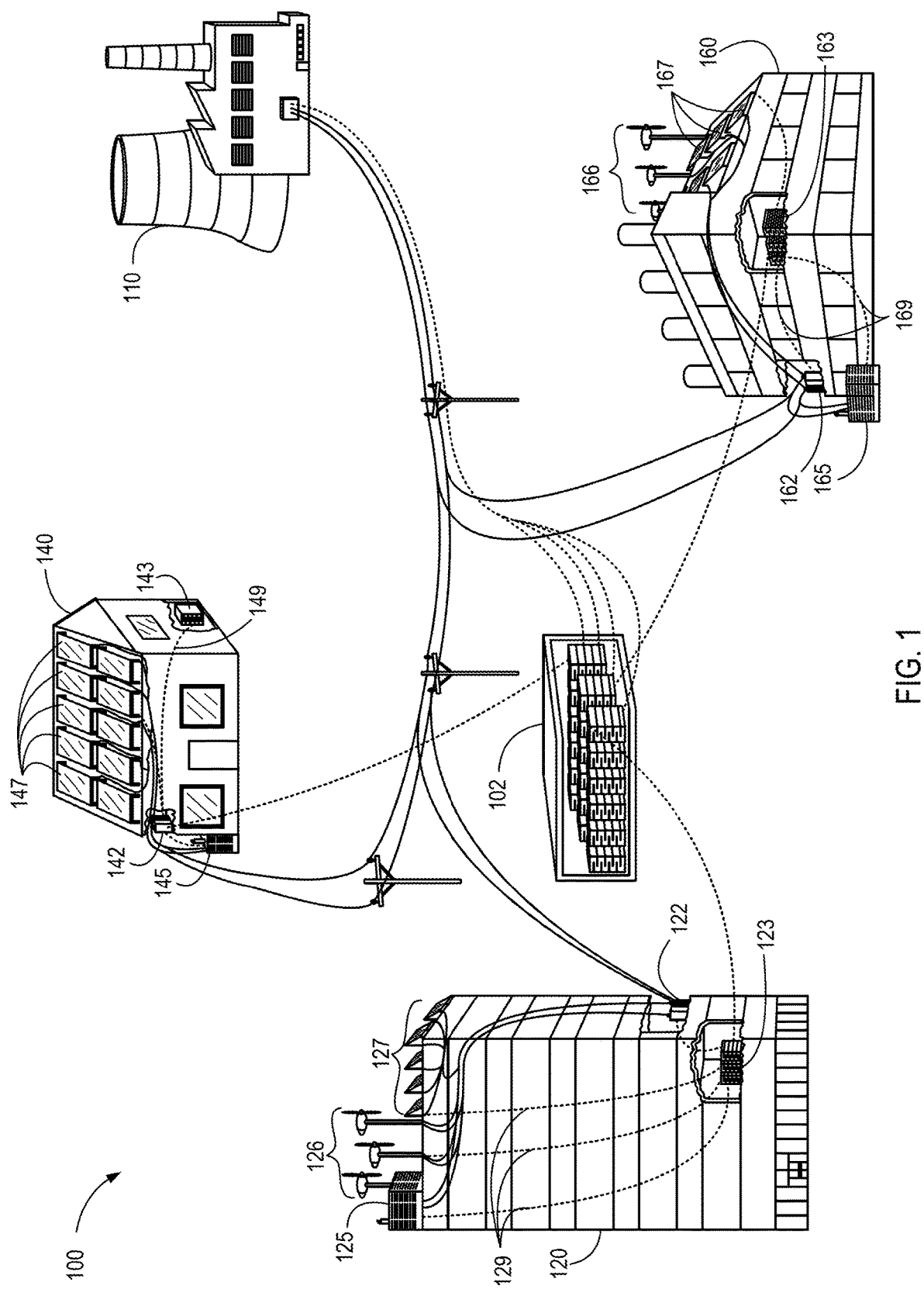
FIG. 1 is a diagrammatic representation of a system of aggregating distributed energy resources (DERs), according to one embodiment of the present disclosure.

As electricity supply and delivery costs increase, especially in remote or congested areas, distributed energy resources (DERs) are increasingly seen as a viable means for reducing those costs. DERs are fast becoming more prevalent as more and more consumers are installing local generation and/or energy storage systems.

The reasons for the proliferation of DERs are numerous, but primarily because of programs and products that enable an energy storage system (ESS) to provide consumers an ability to control net consumption and delivery of electrical energy, which can provide value in multiple ways.

A DER may include an ESS that can enable a consumer of energy to reduce or otherwise control a net consumption from an energy supplier. For example, if electricity supply and/or delivery costs are high at a particular time of day, an ESS, which may include one or more batteries or other storage devices, can generate/discharge electrical energy at that time when costs are high in order to reduce the net consumption from the supplier. Likewise, when electricity rates are low, the ESS may charge so as to have reserve energy to be utilized in a later scenario as above when supply and/or delivery costs are high.

The approach of charging the ESS (an example of a DER) when rates are low and discharging when rates are high can provide value by reducing time-of-use (ToU) supply charges, reducing demand charges, improving utilization of local generation, and leveraging incentive maneuvers.

ToU supply charges are typically pre-defined in a utility's tariff document by one or more supply rates and associated time windows. ToU supply charges may be calculated as the supply rate multiplied by the total energy consumed during the time window. An ESS can be discharged to reduce ToU supply charges.

Demand charges are electric utility charges that are based on the rate of electrical energy consumption (also called "demand") during particular time windows (which we will call "demand windows"). An ESS can be discharged to lower peak demand and thereby reduce demand charges.

Improved utilization of local generation can be achieved with an ESS by: (a) aiding to maximize self-consumption of renewable energy, and (b) reducing fluctuations of a renewable generator such as during cloud passage on solar PV arrays.

An ESS can also be charged and discharged in a manner to leverage programs that offer benefits (e.g., a statement credit) or other incentives for consumers to cooperate with the local utility(ies) by taking actions (e.g., reducing consumption or discharging power onto the grid) that may enhance grid stability, reduce peak loads, or the like.

A DER may also include a generation system that can be activated to produce energy for consumption by the load center, for storage by the ESS for later consumption, and/or for providing power back to the grid. For example, any of a PV system, a wind farm, or a fuel powered generator may generate electrical energy to be supplied to the load, stored by the ESS, or provided back to the grid.

A DER may further include an energy consuming technology, such as a load, that may be deactivated during peak demand periods to alleviate the demand on the grid. For example, an air conditioning system may be deactivated during a particular demand period to alleviate the net consumption of electrical power from the grid at a site. In this example, an element of energy storage could also be leveraged. Specifically, prior to the demand period it may be possible to run the air conditioning system to cool a space to below a target temperature, which would reduce a peak temperature that the space would rise to during the peak demand period when the air conditioning system is deactivated. It will be apparent that anything that consumes electrical power could be used as a DER, but not all of these things would involve an energy storage element as discussed with reference to the air conditioning system.

An individual DER can provide a consumer of energy significant ability to control costs. However, this ability to control costs eludes the electricity provider or distributor (e.g., utility) on the grid side of electrical distribution. An electricity provider or distributor can offer incentives and other encouragement to consumers to use DERs, but remains at the mercy of consumers to deploy a DER and to use the DER in a manner to provide behavior that supports cost reduction for the electricity provider or distributor. For example, during a "demand peak," the grid may remain unimpacted by a plurality of DERs that are not put into a state for the consumer to provide electricity to or reduce consumption of electricity from the grid. Electricity providers simply cannot rely upon independent DERs to deliver power in a coordinated manner on short notice to maintain grid stability.

Attempts to leverage the cost savings enabled by DERs for the benefit of an electricity provider have included efforts to aggregate DERs in a coordinated manner to provide a response to a demand on the grid. A plurality of DERs can be linked together by an electronic network and remotely controlled at a centralized system to operate as a virtual power plant (VPP), to reduce customer energy demand at peak hours, and provide reliable energy generation for electricity providers to offset some of the needs for more conventional sources of electricity to meet consumer demands. Electricity providers in the U.S. and Europe are increasingly experimenting with VPPs to help manage and harness the value of DERs scattered across the grid.

To illustrate, on any given day, an individual site may have a DER that is controlled by an optimal controller. For this site, the optimal controller has scheduled the DER to optimize the total energy-related costs for a particular building or site. Now, consider a group of such sites, all using optimal controllers to manage electricity-related costs using DERs at each site. If this group of sites is part of a VPP group, a VPP orchestrator may request a specific energy delivery profile from each site in the VPP group to achieve an aggregate goal. For example, if the goal is 1 MWh of energy delivery between 6 pm and 7 pm of a given day, and the group includes five sites, each site may be requested to deliver 2 kWh from 6:00 p.m. to 7:00 p.m. This would achieve the VPP goal. This approach, however, does not consider each site's planned activities, DER size, and expected operating costs on that particular day. For example, a site in a VPP group may have already committed a DER to another service or maneuver and may therefore have a high cost of participation in the additional service or maneuver of the VPP group. In addition, a site in a VPP group may have a relatively large DER and therefore may have a relatively large capacity available, as compared to the other sites, and can therefore participate at a lower cost than the other sites.

A better approach than that of a VPP would be to achieve an aggregate goal at minimum total electricity-related cost. Such an approach is disclosed herein.

The present embodiments provide aggregation systems, controllers, and methods that can function to economically optimize aggregation of DERs by enabling intelligent actions to be taken in order to more effectively utilize DERs. The present disclosure includes systems and methods directed to aggregating distributed energy resources, and more particularly to systems and methods for intelligent and/or automated aggregation of automatically controlled self-optimizing distributed energy resources.

FIG. 1 is a diagrammatic representation of a system 100 to aggregate DERs, including an aggregation engine 102 (or other similar system or aggregation controller) to aggregate (and therefore in communication with) a plurality of site controllers 122, 142, 162 configured to control operation a plurality of DERs at a plurality of sites 120, 140, 160, according to one embodiment of the present disclosure. The system 100 may operate as, or similar to, a VPP to provide a power level for a period of time of an aggregation opportunity (e.g., to participate in a response event). In FIG. 1, a centralized aggregation engine 102 may be networked with the plurality of site controllers 122, 142, 162, each of which controls one or more DERs at one of the sites 120, 140, 160, respectively. The sites 120, 140, 160 include a plurality of disparate locations, including, for example, a high-rise building 120, a single-family residence 140, and a factory 160 or other industrial location or operation. Each of these sites 120, 140, 160 includes one or more DERs, which in turn include storage, power generation, and/or load resources. As can be appreciated, any variation of DER and quantity or combination of DERs can be controlled by a site controller 122, 142, 162 that is in communication with the aggregation engine 102 to participate in one or more maneuvers (e.g., a demand response maneuver) to provide a net change in power (e.g., provide power generation, provide stored power, reduce power consumption by throttling or deactivating a load, etc.). The aggregation engine 102 may further be in communication with a local electrical utility 110 to receive requests for maneuvers and to communicate the ability to respond to such requests. The aggregation engine 102 may, in response to a utility request, coordinate the plurality of site controllers 122, 142, 162 to control the DERs at the sites 120, 140, 160 to provide a change in net power (e.g., generate power that can be provided to the grid of the utility 110).

The aggregation engine 102 may include circuitry, one or more processors, and/or other computing devices to perform operations for aggregating the optimal control of the DERs at the plurality of sites 120, 140, 160. The aggregation engine 102 may further include one or more communication interfaces to facilitate communications with the site controllers 122, 142, 162 and with the utility 110. The aggregation engine 102 may receive an aggregation opportunity to participate in a response event. The aggregation opportunity may be received from the utility 110. The aggregation opportunity may specify a requested net change in power over a period of time of the response event and an upshot for providing the requested net change in power for the period of time. As used herein the term "net change in power" refers to a total change of power consumed at the sites 120, 140, 160, and may include electrical power production or provision (e.g., by generators and/or ESSs), reduction or cessation in electrical power consumption (e.g., by loads), or combinations thereof. The upshot specified by the aggregation opportunity may be a benefit (e.g., a monetary or other economic incentive) to be received for providing the requested net change in power over the period of time of the response event and/or a penalty (e.g., a monetary or other economic penalty) to be received for failing to provide the requested net change in power over the period of time.

The aggregation engine 102 may, based on the aggregation opportunity, determine whether to aggregate the specified net change in power from the DERs at one or more of the sites 120, 140, 160 or otherwise perform a maneuver to fulfill the aggregation opportunity in order to receive the specified benefit and/or avert any specified penalty. The aggregation engine 102 may determine the response that is economically optimized for the sites 120, 140, 160.

As part of determining whether to perform a maneuver to fulfill an aggregation opportunity, the aggregation engine 102 may determine how to apportion the burden of the maneuver among the sites 120, 140, 160 in an economically efficient way.

The aggregation engine 102 may provide, via the communication interface, a proposed set of engagement rules (e.g., apportionment values ($P_r$)) to the site controllers 122, 142, 162 that control the operation of the plurality of DERs at the sites 120, 140, 160. As used herein the term "engagement rule set" refers to information that defines, to a site controller (e.g., the site controllers 216), how a maneuver should be performed on a site basis. One specific non-limiting example of an engagement rule set is an apportionment value. As used herein, an apportionment value refers to a quantity related to a site's performance of a portion of a maneuver. It will be apparent to those of ordinary skill that although an "apportionment value" includes a quantity, other examples of engagement rule sets may not include quantities (e.g., an instruction to turn off equipment such as an air conditioning unit or other maneuver). A non-limiting example of an apportionment value is a site change in power. As used herein the term "site change in power" refers to a provision, by a site, of electrical power (e.g., from a generator and/or an ESS), a reduction, by the site, of consumption of electrical power from the grid (e.g., by one or more loads), or combinations thereof. Each proposed apportionment value of the set $P_p$ may be intended for a single site controller of one of the sites 120, 140, 160. Each proposed apportionment value may indicate the corresponding site 120, 140, 160 participation in the response event to provide the requested net change in power for the period of time. In some embodiments, an apportionment value may be a change in power (e.g., power production, reduction in consumption, or combinations thereof) value (e.g., 100 kWh), which may be a discrete amount of power the site is requested to provide during a period of an aggregation response period. An apportionment value may also be an energy production value (e.g., 100 kWh). In other embodiments, an apportionment value may also be communicated as a ratio and production pair (e.g., 0.3, 600 kWh), where the production value is the net change in power of the aggregation request, and the ratio is a portion requested of the given site. As can be appreciated, other combinations of the foregoing elements of an apportionment value may be utilized (e.g., an apportionment set including a ratio, a change rate, and a duration).

The aggregation engine 102 may receive from each of the site controllers 122, 142, 162 a local impact (e.g., a site impact) on the corresponding sites 120, 140, 160 of participating in the aggregation opportunity event according to the set $P_p$, versus not participating in the aggregation opportunity event. The local impact may be optimized by the site controllers 122, 142, 162, as will be discussed more fully below. Based on the set of received local impacts, the aggregation engine 102 may determine a final set of apportionment values ($P_f$), each for a site controller 122, 142, 162 and corresponding to one of the sites 120, 140, 160. The aggregation engine 102 may determine the set $P_f$ by the one or more processors utilizing an optimization algorithm. The aggregation engine 102 may repeatedly poll each given site controller 122, 142, 162 according to the optimization algorithm to determine the set $P_f$. The local impacts for each of the sites 120, 140, 160 may be received, calculated, or otherwise obtained based on the set of apportionment values ($P_p$ and $P_f$). In other words, during the repetitions of the polling, intermediate local impacts are totaled into intermediate total impacts until an optimal total impact is identified, at which point final optimal local and total impacts have been identified.

The aggregation engine 102 may utilize an aggregate cost function to optimize apportionment of site changes in power to the sites 120, 140, 160. By way of non-limiting example, the aggregation engine 102 may generate an aggregate cost function as a sum of the local impacts to obtain a total participation impact and then determine whether to participate in the aggregation opportunity by comparing the total participation impact with the upshot specified by the aggregation opportunity. In this example the cost function may be:

$$C_{agg} = \sum_i C_i$$

where $C_{agg}$ is the aggregate cost function and $C_i$ is local impact (e.g., a predicted cost of performing the apportioned site change in power, or a change or delta in cost of providing the site change in power vs. not providing the site change in power) of a site. Also by way of non-limiting example, the aggregation engine 102 may generate an aggregate cost function as a sum of the local impacts minus the upshot specified by the aggregation opportunity. In this example the cost function may be:

$$C_{agg} = -B_{upshot} + \sum_i C_i$$

where $B_{upshot}$ is the upshot specified by the aggregation opportunity. As a further non-limiting example, the aggregation engine 102 may generate an aggregate cost function as a sum of the local impacts minus the upshot and minus payments to the sites 120, 140, 160 to perform their apportioned performances. In this example the cost function may be:

$$C_{agg} = -B_{upshot} + \sum_i (C_{payment,i} + C_i)$$

where $C_{payment,i}$ is the payment that is made to a site to perform the apportioned site change in power. The aggregation engine 102 may optimize (e.g., minimize) the aggregate cost function. In some embodiments the aggregation engine 102 may treat the total net change in power provided by the sites 120, 140, 160 as a continuous variable that is determined as the sum of the apportionment values. As a result, the aggregation engine 102 may use the above formulas for aggregate cost functions $C_{agg}$ to optimize how to apportion the net change in power, and also how much of the aggregation opportunity to perform (e.g., 5 MW or 10 MW) based on the total cost and benefit and the programs terms.

If the aggregation engine 102 determines to have the system 100 participate in the aggregation opportunity (e.g., have one or more of the sites 120, 140, 160 provide a site changes in power), then the aggregation engine 102 may provide, via the communication interface, the set $P_f$ and instructions to the plurality of site controllers 122, 142, 162 to schedule the sites 120, 140, 160 for participation in the aggregation opportunity.

The aggregation engine 102 of FIG. 1 is a centralized and/or dedicated entity, according to one embodiment. In other embodiments, the aggregation engine 102 may be a virtual machine (e.g., on a cloud computing system), operative on a plurality of distributed resources, and/or integrated with or otherwise included on one or more site controllers of the sites 120, 140, 160.

The site controllers 122, 142, 162 of FIG. 1 are local controllers located at the sites 120, 140, 160, respectively, according to one embodiment. In other embodiments, one or more of the site controllers 122, 142, 162 may be remotely located from their corresponding sites and communicate with electrical components of their corresponding sites 120, 140, 160 through one or more communication networks (e.g., the Internet). In some embodiments, a single site controller may be configured to operate as the site controller for more than one site, each site having one or more DERs that can be leveraged to provide a portion of a net change of power (e.g., store, generate, or refrain from consuming electrical power) to participate in an aggregation opportunity.

The high-rise building 120 may be an office building, an apartment building, or another multiple-unit facility. The type of the building may be unimportant. The high-rise building 120 may include a local electrical system that includes the site controller 122 and DERs including an energy storage system (ESS) 123, and one or more electricity production devices (e.g., generators), such as a combustion engine generator 125, wind turbines 126, and photovoltaic (PV) cells 127 (e.g., solar panels). The high-rise building 120 may also include communication lines 129 to interconnect the site controller 122 with other components (e.g., the ESS 123, the generator 125, the wind turbines 126, and the PV cells 127). The electrical system of the high-rise building 120 naturally includes one or more electrical loads. Stated differently, the electrical system of the high-rise building 120 may include loads, generators, and/or ESSs, in varying numbers and combinations of these components. For example, an electrical system may have loads and an ESS, but no local generators (e.g., photovoltaic, wind). The electrical system may or may not be connected to an electrical utility distribution system (or "grid"). If not connected to an electrical utility distribution system, it may be termed "off-grid."

The ESS 123 of the electrical system of the high-rise building 120 may include one or more energy storage devices and any number of power conversion devices. The power conversion devices are able to transfer energy between an energy storage device and the main electrical power connections that in turn connect to the electrical system loads and, in some embodiments, to the grid. The energy storage devices may be different in various implementations of the ESS 123. A battery is a familiar example of a chemical energy storage device. For example, in one embodiment of the present disclosure, one or more electric vehicles with batteries may be connected to the electrical system (e.g., in a parking garage) and may be used to store energy for later use by the electrical system. A flywheel is an example of a mechanical energy storage device.

The electrical system of the high-rise building 120 may provide to the site controller 122, over the communication lines 129, inputs in the form of information, or feedback, as to a status of the building electrical system and/or one or more components (e.g., loads, generators, ESSs) therein.

The site controller 122 may determine from the inputs one or more outputs (e.g., control variables) to send to one or more components of the electrical system to accomplish one or more site objectives (e.g., minimize demand (kW) over a prescribed time interval; minimize demand charges ($) over a prescribed time interval; minimize total electricity charges ($) from the grid; reduce demand (kW) from the grid by a prescribed amount during a prescribed time window; maximize the life of the energy storage device(s)). The site controller 122 may also receive as inputs a configuration of the electrical system (e.g., a set of configuration elements), which may specify one or more constraints of the electrical system. The site controller 122 may also receive external inputs (e.g., weather reports, changing tariffs, fuel costs, event data), which may inform the determination of the values of the control variables. A set of external inputs may be received by the site controller 122. The set of external inputs may provide indication of one or more conditions that are external to the site controller 122, the high-rise building 120, and/or the electrical system.

The site controller 122 may receive from the aggregation engine 102 an apportionment value and/or production requirement for an aggregation opportunity, which may be processed as a configuration and/or constraint on the electrical system of the high-rise building 120. The site controller 122 may determine outputs for efficient operation of the electrical system, taking into consideration the apportionment value and/or production requirement for an aggregation opportunity as one or more constraint(s) on the electrical system. The site controller 122 may then provide to the aggregation engine 102 a differential value indicating a delta (i.e., a change) of a local impact (or site impact) on the high-rise building 120 of participating in the response event versus not participating in the response event. The site controller 122, according to one embodiment, may provide a delta value indicating a difference in cost of participating in the response event versus not participating in the response event. The site controller 122, according to another embodiment, may provide a participation cost and a nonparticipation cost, such that a calculation can determine a difference in cost of participating in the response event versus not participating in the response event.

The single-family residence 140 may be analogous to the high-rise building 120, with a similar or different mix of components as part of the electrical system of the residence 140. The residence 140 may include a local electrical system that includes a site controller 142, an ESS 143, and one or more electricity production devices (e.g., generators), such as a combustion engine generator 145, and photovoltaic (PV) cells 147 (e.g., solar panels). The residence 140 may also include communication lines 149 to interconnect the site controller 142 with other components (e.g., the ESS 143, the generator 145, and the PV cells 147).

The electrical system of the residence 140 may provide to the site controller 142, over the communication lines 149, inputs in the form of information, or feedback, as to a status of the electrical system and/or one or more components (e.g., loads, generators, ESSs) thereof. The site controller 142 may determine from the inputs one or more outputs (e.g., control variables) to send to one or more components of the electrical system to accomplish one or more objectives, similar to the site controller 122 of the high-rise building 120. The site controller 142 may also receive as inputs a configuration of the electrical system (e.g., a set of configuration elements), which may specify one or more constraints of the electrical system. The site controller 142 may also receive external inputs (e.g., weather reports, changing tariffs, fuel costs, event data), which may inform the determination of the values of the control variables. A set of external inputs may be received by the site controller 142. The set of external inputs may provide indication of one or more conditions that are external to the site controller 142 and the electrical system of the residence 140.

The site controller 142 may receive from the aggregation engine 102 an apportionment value and/or production requirement for an aggregation opportunity, which may be processed as a configuration and/or constraint on the electrical system of the residence 140. The site controller 142 may determine outputs for efficient operation of the electrical system, taking into consideration the apportionment value and/or production requirement for an aggregation opportunity as one or more constraint(s) on the electrical system. The site controller 142 may then provide to the aggregation engine 102 a differential value indicating a delta of a local impact (or site impact) on the residence 140 of participating in the aggregation opportunity versus not participating in the aggregation opportunity. The site controller 142, according to one embodiment, may provide a delta value indicating a difference in cost of participating in the aggregation opportunity versus not participating in the aggregation opportunity. The site controller 142, according to another embodiment, may provide a participation cost and a nonparticipation cost, such that a calculation can determine a difference in cost of participating in the aggregation opportunity versus not participating in the aggregation opportunity.

The factory 160 may be analogous to the high-rise building 120 and/or the residence 140, with a similar or different mix of components as part of the electrical system. The factory 160 may include a local electrical system that includes a site controller 162, an ESS 163, and one or more electricity production devices (e.g., generators), such as a combustion engine generator 165, wind turbines 166, photovoltaic (PV) cells 167 (e.g., solar panels). The factory 160 may also include communication lines 169 to interconnect the site controller 162 with other components (e.g., the ESS 163, the generator 165, the wind turbines 166, and the PV cells 167).

The electrical system of the factory 160 may provide to the site controller 162, over the communication lines 169, inputs in the form of information, or feedback, as to a status of the electrical system and/or one or more components (e.g., DERs including loads, generators, ESSs) thereof. The site controller 162 may determine from the inputs one or more outputs (e.g., control variables) to send to one or more components of the electrical system to accomplish one or more objectives. The site controller 162 may also receive as inputs a configuration of the electrical system (e.g., a set of configuration elements), which may specify one or more constraints of the electrical system. The site controller 162 may also receive external inputs (e.g., weather reports, changing tariffs, fuel costs, event data), which may inform the determination of the values of the control variables. A set of external inputs may be received by the site controller 162. The set of external inputs may provide indication of one or more conditions that are external to the site controller 162 and the electrical system of the factory 160.

The site controller 162 may receive from the aggregation engine 102 an apportionment value and/or production requirement for an aggregation opportunity, which may be processed as a configuration and/or constraint on the electrical system of the factory 160. The site controller 162 may determine outputs for efficient operation of the electrical system, taking into consideration the apportionment value and/or production requirement for an aggregation opportunity as one or more constraint(s). The site controller 162 may then provide to the aggregation engine 102 a differential value indicating a delta of a local impact (or site impact) on the factory 160 of participating in the aggregation opportunity versus not participating in the aggregation opportunity. The site controller 162, according to one embodiment, may provide a delta value indicating a difference in cost of participating in the aggregation opportunity versus not participating in the aggregation opportunity. The site controller 162, according to another embodiment, may provide a participation cost and a nonparticipation cost, such that a calculation can determine a difference in cost of participating in the aggregation opportunity versus not participating in the aggregation opportunity.

Figure 2:
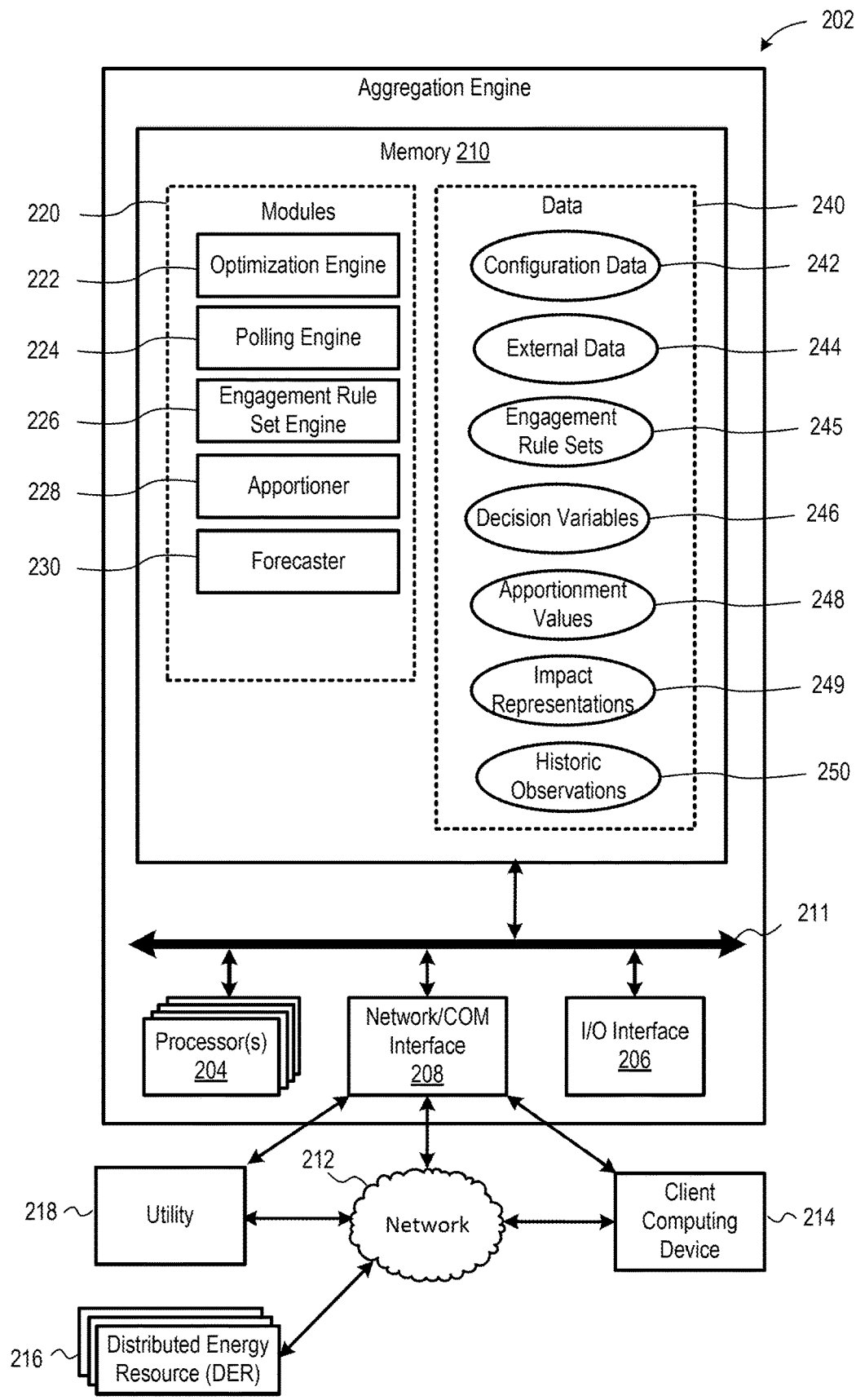
FIG. 2 is a block diagram of an aggregation engine (e.g., a centralized optimization engine, an aggregation controller), according to one embodiment of the present disclosure.

FIG. 2 is a block diagram of an aggregation engine 202 (e.g., a centralized optimization engine), according to one embodiment of the present disclosure. The aggregation engine 202 may be the same or similar to the aggregation engine 102 of FIG. 1 and perform similar operations and/or provide similar functionality. For example, the aggregation engine 202 may perform operations for aggregating a plurality of site controllers 216, such as to provide demand response. The aggregation engine 202 may receive (e.g., from a utility 218) an aggregation opportunity to participate in a response event. The aggregation engine 202 may, based on the aggregation opportunity and impact values received from the plurality of site controllers 216, determine whether to aggregate net change in power (e.g., power generation) from the plurality of site controllers 216 or otherwise perform a maneuver (e.g., apportion all of the net change of power to fulfill the aggregation opportunity to one of the sites) to fulfill the aggregation opportunity, in order to receive a specified benefit and/or avert any specified penalty. The aggregation engine 202 may determine the response (e.g., maneuver) that is economically optimized for the plurality of site controllers 216 and communicate commands, instructions, and/or other data to the plurality of site controllers 216 over a communication network 212. The aggregation engine 202 of FIG. 2 includes one or more processors 204, an input/output interface 206, a network or other communication (COM) interface 208, memory 210 and/or other computer readable storage medium, and a system bus 211.

The one or more processors 204 may include one or more general purpose devices, such as an Intel®, AMD®, or other standard microprocessor. The one or more processors 204 may include a special purpose processing device, such as ASIC, SoC, SiP, FPGA, PAL, PLA, FPLA, PLD, or other customized or programmable device. The one or more processors 204 perform distributed (e.g., parallel) processing to execute or otherwise implement functionalities of the present embodiments. The one or more processors 204 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The input/output interface 206 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 208 may facilitate communication with other computing devices 214 and/or networks 212, such as the Internet and/or other computing and/or communications networks. The network/COM interface 208 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 208 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 211 may facilitate communication and/or interaction between the other components of the system, including the one or more processors 204, the memory 210, the input/output interface 206, and the network/COM interface 208.

The memory 210 may include, but is not limited to, static RAM, dynamic RAM, flash memory, one or more flip-flops, ROM, CD-ROM, DVD, disk, tape, or magnetic, optical, or other computer storage medium. The memory 210 may include a plurality of program modules 220 and program data 240.

The program modules 220 may include all or portions of other elements of the aggregation engine 202. The program modules 220 may run multiple operations concurrently or in parallel by or on the one or more processors 204. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, causes a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The system memory 210 may also include data 240. Data generated by the aggregation engine 202, such as by the program modules 220 or other modules, may be stored on the system memory 210, for example, as stored program data 240. The stored program data 240 may be organized as one or more databases.

The modules 220 may include an optimization engine 222, a polling engine 224, an engagement rule set engine 226, and an apportioner 228.

The optimization engine 222 may utilize an optimization algorithm to determine if and how to participate in an aggregation opportunity. The aggregation opportunity may be an opportunity to participate in a demand response event. Stated otherwise, the aggregation engine 202 may determine if and how to perform a maneuver to aggregate the plurality of site controllers 216 to provide a requested change net power or energy (e.g., a requested power or energy level production) according to the aggregation opportunity. In one embodiment, the requested power level production may be an amount relative to a baseline (e.g., non-participation) level. In another embodiment, the requested power level production may be an amount relative to an expected level.

To determine if and how to participate in the aggregation opportunity, the optimization engine 222 may determine an engagement rule set with proposed performance values for each of the plurality of site controllers 216 to participate in the aggregation opportunity and then in essence test the engagement rule set and proposed performance values with the plurality of site controllers 216 to learn an impact of participating versus not participating in the aggregation opportunity. The engagement rule set defines to the site controllers 216 how the maneuver should be performed on a local basis. The engagement rule set may or may not have numerical values associated therewith. For a first example, the engagement rule set may specify delivery of a certain amount of minimum power for a specified time period. Or, as a second example, the engagement rule set may specify delivery of a certain energy over a specified time period. Or, as a third example, the engagement rule set may specify a reduction in consumed energy from a baseline (e.g., non-participation) value over a specified time period. The engagement rule set may also specify multiple time periods. Each engagement rule set may have some number of parameterized values associated with it. In the first example, the amount of minimum power delivery may be a parameterized value. In the second example above, the amount of energy may be a parameterized value. In the third example, the amount of power reduction may be a parameterized value. Engagement rules may also have multiple parameterized values. For example, an engagement rule may specify two different energy reductions in a building's power consumption to be accomplished during two upcoming time periods. In general, the engagement rule set may provide parameters, constraints, rules, or the like, for guiding participation of a site controller in the aggregation opportunity. The engagement rule set is a set of instructions that specifies how each site must participate in the aggregation opportunity, and the parameterized values specify how much each site should participate. As an, the engagement rule set for an aggregation opportunity may be a reduction in power consumption compared to a baseline (e.g., non-participation) for a specific upcoming period of time. The parameterized value may be the amount of power reduction in kW. In this example, the optimization engine 222 may determine a set of parameterized values for each of the plurality of site controllers 216 to participate in the aggregation opportunity and then in essence test the set of parameters with the plurality of site controllers 216 to inquire or otherwise learn an impact (e.g., a cost differential) of participating versus not participating in the aggregation opportunity. Determining the engagement rule set may include determining values for a set of decision variables for each site controller of the plurality of site controllers 216. In the demand response example, the optimization engine 222 may define a set of decision variables that indicates one or more of an amount of performance of power reduction and a period of time for each corresponding site controller to participate in the aggregation opportunity. Other engagement rule sets are possible. For example another engagement rule set may specify that a site controller must follow a specific consumption or production profile for a given time period. This type of engagement rule set could be valuable for renewables firming for example where a utility prefers predictable power generation, or where there is the potential for significant intermittency in a load, a utility may prefer a more predictable or guaranteed load profile.

The values for the decision variables may be determined by polling the site controllers 216 with candidate values. The optimization engine 222 may employ the polling engine 224 to provide or otherwise perform the polling function. According to an optimization algorithm, the optimization engine 222 may repeatedly poll the site controllers 216 to find an optimized set of values. The optimization engine 222 may utilize the polling engine 224 to repeatedly poll each given site controller for an impact (e.g., a cost differential) based on a permutation or other variation of values (e.g., proposed or candidate values) for the corresponding set of decision variables. An impact representation (which may include optimized cost differential information) may be received from each of the plurality of site controllers 216, and the optimization engine 222 may determine whether an optimized set of values (within a threshold level) has been achieved. The optimized set of values for the set of decision variables may be a set of values that minimizes a cost and/or maximizes a benefit (e.g., optimizes a result) of participating in the aggregation opportunity, within a threshold level of optimization.

The impact representation (e.g., cost differential) returned by each of the site controllers 216 may include or otherwise consider any incentives, award payments, or other incentives applicable to the given site controller apart from an incentive of the aggregation opportunity.

The set of values for the decision variables may include apportionment values, each indicating a portion of the requested change in power to be provided by a corresponding site controller 216. The optimization engine 222 may utilize the apportioner 228 to provide apportionment values. During repeated polling, proposed apportionment values may be provided to the site controllers 216 until committed apportionment values can be determined through the optimizing algorithm of the optimization engine 222. A similar result to that of repeated polling may be obtained by providing a set of multiple apportionment values to the site controllers 216 and receiving a set of multiple impact values corresponding to the multiple apportionment values back from the site controllers 216.

Table 1 below illustrates a specific, non-limiting example of repeated polling or provision of multiple apportionment values for impact representations (e.g., site change in cost) with a total change in power of 6 megawatts (MW).

In this example of Table 1 three different sites (Site A, Site B, and Site C) are polled. As shown in the table, apportionment values for six different scenarios of apportionment between the sites were polled. As previously discussed, in some embodiments, an aggregate cost function may be given by:

$$C_{agg} = \sum_i C_i$$

The minimum-cost polled scenario in this specific example of the Table 1 apportions 1 MW to Site A, 5 MW to Site B, and 0 MW to site C. In this example, the minimum polled $C_{agg}$ is $12,000. In some embodiments, the apportionment values corresponding to this minimum polled $C_{agg}$ may be used as committed apportionment values to implement the lowest-cost apportionment scenario. In some embodiments, however, functions of the impact (e.g., change in cost) versus proposed apportionment values may be estimated for each site (e.g., using least squares regressions or interpolations). For example, changes in cost for the sites based on various proposed apportionment values may be given by $f_A(\Delta Power_A)$, $f_B(\Delta Power_B)$, and $f_C(\Delta Power_C)$, where $\Delta Power_A$, $\Delta Power_B$, and $\Delta Power_C$ are proposed site changes in power for the sites. In some embodiments, the apportionment may be optimized by taking a minimum of the sum of these estimated functions:

$$\min(f_A(\Delta Power_A) + f_B(\Delta Power_B) + f_C(\Delta Power_C)),$$

where $\Delta Power_A + \Delta Power_B + \Delta Power_C = \Delta Power_{total}$, and $\Delta Power_{total}$ is the net change in power requested in the aggregation opportunity. In the example illustrated by the table, $\Delta Power_{total}$ is 6 MW. This approach of using estimated site change functions for the site may enable optimization of the total cost of apportioning the net change in power among the sites without polling the site controllers 216 for every possible apportionment value. In some instances it may be possible to construct estimated functions for the changes in cost for the sites using relatively few polled engagement rule set/impact representation pairs (e.g., two, three, four, or five apportionment value/change in cost pairs).

Using impact representations received from the plurality of DERs 216, as derived from or based on the optimized set of values for the set of decision variables, the optimization engine 222 may determine whether to participate (or not participate) in the aggregation opportunity. The optimization engine 222 may determine whether to participate in the aggregation opportunity by comparing a total impact with an upshot for participation. The total impact may be a total change in cost, which can be a sum of cost differentials received from the plurality of DERs 216 for participation in the maneuver to respond to the aggregation opportunity. The

TABLE 1

| Site A | | Site B | | Site C | | Total |
|---|---|---|---|---|---|---|
| Apportionment Value | Change in cost | Apportionment Value | Change in cost | Apportionment Value | Change in cost | Change in cost |
| 2 MW | $5,000 | 2 MW | $ 4,000 | 2 MW | $6,500 | $15,500 |
| 2 MW | $5,000 | 3 MW | $ 6,000 | 1 MW | $3,000 | $14,000 |
| 1 MW | $2,000 | 4 MW | $ 8,000 | 1 MW | $3,000 | $13,000 |
| 0 MW | $    0 | 6 MW | $13,500 | 0 MW | $    0 | $13,500 |
| ½ MW | $  800 | 5 MW | $11,000 | ½ MW | $1,000 | $12,800 |
| 1 MW | $2,000 | 5 MW | $11,000 | 0 MW | $    0 | $12,000 | upshot for participation may be specified according to the aggregation opportunity. The upshot may include one or both of a benefit (e.g., an economic benefit) for participating in the aggregation opportunity and/or a penalty (e.g., an economic penalty) for not participating in the aggregation opportunity. For example, the upshot may be a rate reduction, a statement credit, or even a payment or other tangible benefit. The upshot may also be a function of power level production (e.g., actual power level production) above one of a baseline (e.g., participation) level and/or an expected level. The upshot can be a function of the requested power level production (e.g., as requested by the aggregation opportunity). The upshot may also consider any incentives, award payments, or other incentives applicable to individual sites beyond an incentive specified by the aggregation opportunity.

The optimization engine 222 may also determine, based on the impact representations, which of the plurality of DERs 216 to include in participation of a maneuver in response to an aggregation opportunity. Participation of a site in a maneuver to meet an aggregation opportunity may include providing at least a portion of requested change in power for at least a portion of the period of time of the aggregation opportunity. Producing or otherwise providing a portion of the requested change in power can comprise a reduction in consumed power (e.g., through control of loads, generators, batteries). Alternatively or in addition, producing or otherwise providing a portion of the requested change in power can comprise original generation of electricity (e.g., via generator, photovoltaic panel).

Upon determining whether to participate in the aggregation opportunity and/or determining which of the plurality of site controllers 216 to include in participation, the optimization engine 222 may provide instructions to the plurality of site controllers 216. For example, the optimization engine 222 may transmit, via the network/COM interface 208, a command to selected controllers 216 to schedule participation in the aggregation opportunity. As another example, the optimization engine 222 may transmit, via the network/COM interface 208, a committed parameter set (e.g. a set of decision variables, which may include committed apportionment values), which the site controllers 216 may incorporate to control operation of their DERs during the period of an event responding to the aggregation opportunity.

Participation in the event comprises producing a portion of the requested power level reduction for at least a portion of the period of time of the aggregation opportunity. For example, the optimization engine 222 may provide, via the network/COM interface 208, committed apportionment values and instructions to the plurality of site controllers 216 to schedule participation in the aggregation opportunity. Each so instructed site controller 216 may then respond to the instruction to participate in the aggregation opportunity, such as by reducing power consumption or generating excess power to provide a portion of the change in power according to the corresponding committed apportionment value of the site controller 216.

As can be appreciated, in other embodiments, some or all of the functionality of the optimization engine 222 may be provided by additional modules 220 or sub-modules of the aggregation engine 202. The optimization engine 222 may orchestrate other modules 220 to perform operations for aggregating power of from a plurality of site controllers 216.

The polling engine 224 may poll, via the network/COM interface 208, each of the plurality of site controllers 216 to inquire a cost differential of the given site controller 216 participating in the aggregation opportunity versus not participating. In some embodiments, polling each site controller 216 may include providing an engagement rule set and associated apportionment value(s) for participating in an aggregation opportunity and then receiving an impact representation (e.g., a differential value) from the site controller 216 that is derived based on if the site controller 216 were to operate according to the engagement rule set. For example, polling each site controller 216 may include providing proposed apportionment values for participating in an aggregation opportunity to provide a corresponding change in power over a period of time, and then receiving a differential value (e.g., a cost differential value) from the site controller 216. Each differential value received may indicate a delta of a cost on the corresponding site controller 216 of participating in the aggregation opportunity versus not participating in the aggregation opportunity. The cost on the corresponding site controller 216 may also consider any incentives, award payments, or other incentives applicable to individual site controllers 216 beyond an incentive specified by the aggregation opportunity.

In some embodiments, polling an individual site controller 216 may include requesting a participation cost for the site controller 216 to participate in the aggregation opportunity and requesting a baseline (e.g., non-participation) cost for the site controller 216 without participation in the aggregation opportunity. Accordingly, receiving the cost differential may comprise receiving the participation cost and the baseline (e.g., non-participation) cost and then calculating the cost differential. The polling engine 224 may calculate the cost differential based on the received participation cost and the received baseline (e.g., non-participation) cost.

The polling engine 224 may poll the plurality of site controllers 216 by polling corresponding site controllers 216 for a plurality of sites. Each site may include a site controller 216 that may perform optimization of operation of one or more DERs of the corresponding site. Accordingly, the site controller 216 of a given site can generate and provide cost differential information back to the polling engine 224 in response to an inquiry for a cost differential based on an apportionment value and/or values of decision variables. The polling engine 224 polls a site controller 216 to inquire a cost differential of the corresponding site participating in the aggregation opportunity versus not participating. A site controller 216 for a site may be onsite (e.g., located proximate to the site), or may be located remote from the site, such as in a cloud-based computing environment or other remote server for servicing or otherwise controlling the DERs of the site.

The engagement rule set engine 226 may determine rules, parameters, control variables, or the like for preparing an engagement rule set to indicate to a site controller 216 an amount of power production or reduction and a period of time for the site controller 216 to participate in the aggregation opportunity. The period may be all or a portion of a time period of an aggregation opportunity. In other words, the period indicated in an engagement rule set may be a fractional portion of the total period for an aggregation opportunity. The engagement rule set engine 226 may determine that a given site controller 216 is needed for only a portion of the entire period of the aggregation opportunity, because other site controllers 216 of the plurality of site controllers 216 can handle power production or reduction during other portions of the period of the aggregation opportunity. An indication of an amount of power production or reduction may be an apportionment value, such as an apportionment in units of power (e.g., kW) or units of energy (e.g., kWh). An indication of an amount of power production or reduction may be an apportionment value, such as in terms of a fraction or a ratio of a total requested power production or reduction. An indication of an amount of power production may be in terms of a participation benefit, such as a unit value per unit power (e.g., value in dollars ($) per unit power—$/kW). Stated otherwise, the engagement rule set may indicate an amount of power production in terms of offering a participation benefit ("I [the utility company] will pay you [the aggregation of DERs] $40 for every kW generated [produced, saved, or otherwise provided back to the grid] during the period of the aggregation opportunity."). In another example, an aggregation engine's optimization engine 222 may consider, as part of the total cost of participation, any payments to be made by the aggregator to each site for the proposed apportioned participation, even if the payment rates are different for each site. In this example, the optimization engine 222 can correctly consider sites to be paid by the aggregator for participation, even if each site's benefit or cost of participation is different from that of other sites. This may be useful in cases where an aggregator has different compensation contracts with each site. For example, one site may be paid $0.50 per kWh for participation, and another may be paid $0.30 per kWh for participation. Another way to consider payments to be made by the aggregator to the sites is for each site to include payments to be made by the aggregator to the site as part of its cost when polled for the cost of participation. Combinations of these two approaches are also possible.

The apportioner 228 may determine proposed and/or committed apportionment values for each given site controller 216. The determination of the apportioner 228 may be made based on a total quantity of the plurality of site controllers 216. The determination of the apportioner 228 may be made based on a capacity of a battery of an energy storage system of the given site controller relative to a capacity of all batteries of the energy storage systems of the plurality of site controllers 216. The determination of the apportioner 228 may be made based on a power output of a battery of the energy storage system of the given site controller relative to a total power output of all batteries of the energy storage systems of the plurality of site controllers 216. The determination of the apportioner 228 may be made based on assigning the total requested power level production as the proposed apportionment value. The apportioner 228 may consider a configuration (e.g., configuration data 242) of each site controller 216 of the plurality of site controllers 216. The apportioner 228 may consider external conditions (e.g., external data 244). The apportioner 228 may also consider previously determined and proposed apportionment values (e.g., apportionment values 248) and/or values of decision variables (e.g., decision variables 246). The apportioner 228 may consider historical data (e.g., historic observations 250), so as to consider a totality of circumstances and the apportionment value(s) that were determined to be effective toward optimization. In some embodiments, the engagement rule set engine 226 may utilize the apportioner 228 to determine proposed apportionment values of an engagement rule set.

The data 240 stored on the memory 210 may include configuration data 242, external data 244, engagement rule sets 245, decision variables 246, apportionment values 248, impact representations 249, and/or historic observations 250.

The configuration data 242 may be received from each site controller 216 to communicate constraints and characteristics of the site controller 216. For example, the configuration data 242 may communicate a size or other capacity information of one or more batteries of an energy storage system of the site controller 216. The configuration data 242 may include tariff information for a given site controller 216, which may provide time of use rate and/or demand rate for any given day and/or time. In some embodiments the configuration data 242 may include market data (e.g., data associated with changes in the benefit for participation). In some embodiments the configuration data 242 includes information indicating a historic distribution system load to help the optimizer determine when an aggregation opportunity event may be called in advance of the call. The modules 220 may, in turn, include a forecaster 230 configured to forecast and begin planning an aggregation opportunity before it is even called.

The external data 244 may include information such as weather forecasts, changing tariffs, fuel costs, event data, and market value of resources (e.g., costs of site components such as a battery), which may inform or otherwise impact determination of an optimal set of apportionment values and/or values for the decision variables.

The engagement rule sets 245, decision variables 246, apportionment values 248, and impact representations 249 may be a record of previously proposed and/or final values as determined by the optimization engine 222, the polling engine 224, the engagement rule set engine 226, and/or the apportioner 228 and recorded in the memory 210.

The impact representations 249 may be values returned to the aggregation engine 202 by site controllers 216. The impact representations 249 may include information indicating an impact on a site controller 216 of that site participating in an event to respond to an aggregation opportunity. For example, the impact representations 249 may include cost information, differential values (e.g., cost differentials), or the like. The impact representations 249 may be referenced or otherwise utilized by one or more of the optimization engine 222, the polling engine 224, the engagement rule set engine 226, and/or the apportioner 228.

The historic observations 250 may be continuously recorded and stored in memory 210 to inform future optimizations and/or determinations of engagement rule sets 245 and values for decision variables 246 and/or apportionment values 248.

As can be appreciated, the aggregation engine 202 may store other types of data 240 in memory 210. The other types of data 240 may be generated by and/or utilized by the optimization engine 222, the polling engine 224, the engagement rule set engine 226, and/or the apportioner 228.

The aggregation engine 202, or the components of the aggregation engine 202 in combination, can receive an aggregation opportunity (e.g., a demand response call to participate in an aggregation opportunity), for example, from the utility 218. The aggregation opportunity may specify a requested power level production over a period of time (in the future). The aggregation opportunity may also specify an upshot for providing the requested net change in power for the period of time. The aggregation engine 202 can poll each of a plurality of site controllers 216 to inquire an impact of a corresponding site participating in the aggregation opportunity versus not participating. The aggregation engine 202 receives, via the network/COM interface 208, impact representations 249 (e.g., a cost differential) from the plurality of site controllers 216. The aggregation engine 202 can determine, based on the impact representations 249 (and potentially the upshot specified by the aggregation opportunity), whether to participate in the aggregation opportunity. The aggregation engine 202 can determine which of the plurality of site controllers 216 will participate in the aggregation opportunity. Then the aggregation engine 202 can transmit, via the network/COM interface 208, a command, instructions, and/or control variables to selected site controllers 216 of the plurality of site controllers 216 to schedule participation in the aggregation opportunity by producing a portion of the requested power level production for at least a portion of the period of time of the aggregation opportunity.

The aggregation engine 202 may also determine whether and how an upshot of participation in the aggregation opportunity may be divided or otherwise distributed among the different site controllers 216 in exchange for the participation of the site controllers 216. The aggregation engine 202 may, according to one embodiment, allocate the upshot according to a proportion of power to be produced by the site relative to the total power requested.

Figure 3:
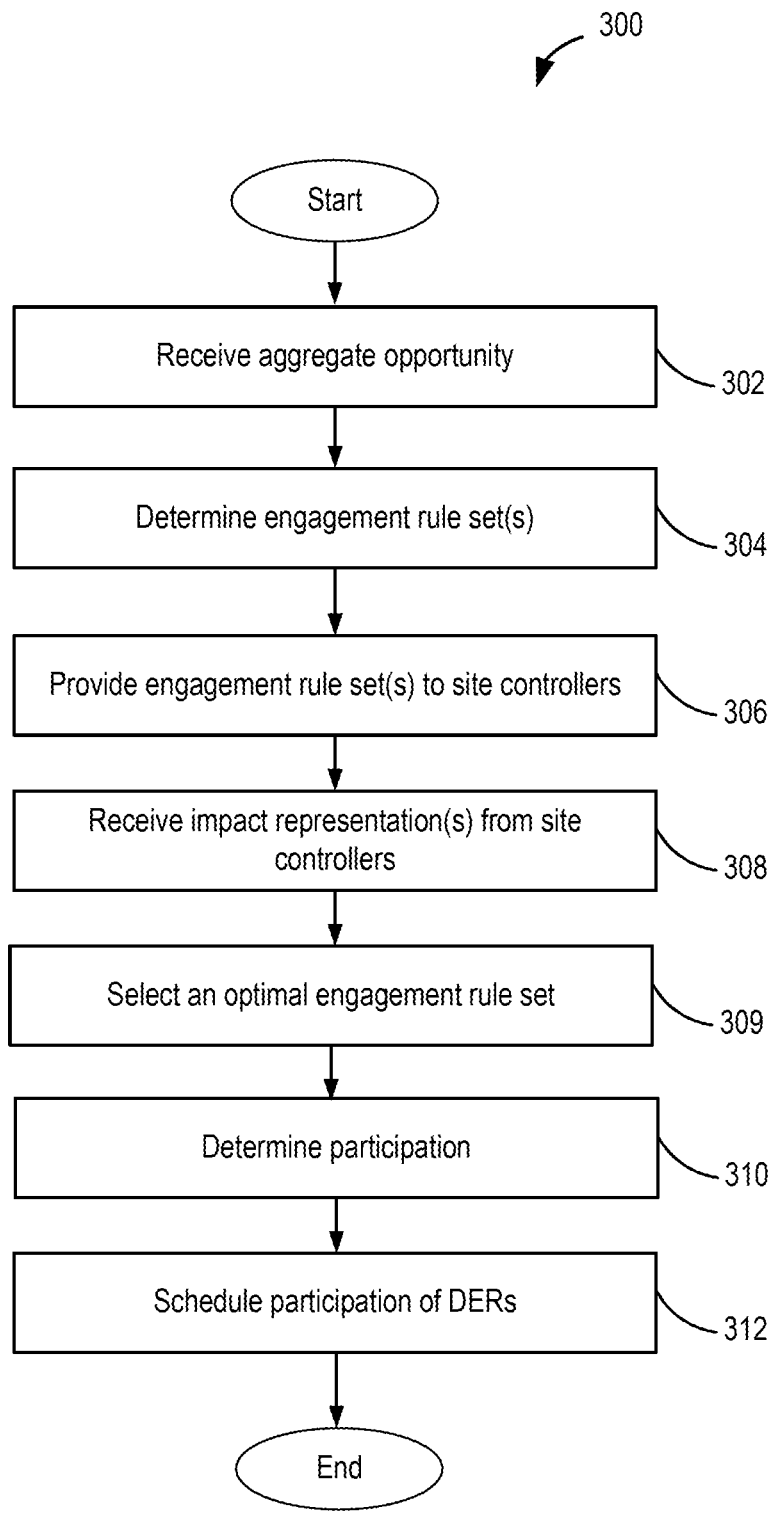
FIG. 3 is a flow diagram of a method of aggregating power of DERs, according to one embodiment of the present disclosure.

FIG. 3 is a flow diagram of a method 300 of aggregating power of sites including DERs, according to one embodiment of the present disclosure. The method 300 may be performed by an aggregation engine, such as the aggregation engine 102 of FIG. 1 or the aggregation engine 202 of FIG. 2. The method 300 includes operations for aggregating power of a plurality of sites including DERs to produce a requested or otherwise desired power level for a period of time.

An aggregation opportunity (e.g., a demand response call) is received 302. The aggregation opportunity may be received 302 from a utility, or from some other entity that may be aware of a need for additional power or reduction in power consumption. The aggregation opportunity may provide a request or other opportunity for a recipient to participate in an aggregation opportunity by providing a requested net change in power for a period of time. The aggregation opportunity specifies a requested net change in power over a period of time. The net change in power and/or the period of time may be such that a single energy resource may have considerable difficulty participating. By contrast, an aggregation engine with the ability to aggregate participation of a plurality of sites, each having one or more DERs, in a maneuver may be able to meet the request of an aggregation opportunity. The received 302 aggregation opportunity may also provide or otherwise specify an upshot for providing a requested net change in power for the period of time. The upshot may be a benefit (e.g., a monetary or other economic incentive, such as a statement credit, a payment, or the like) to be received for providing the requested net change in power over the period of time of the aggregation opportunity, and/or a penalty (e.g., a monetary or other economic penalty, such as a fine, increase rate, or the like) to be received for failing to provide the requested net change in power over the period of time of the aggregation opportunity. The upshot of the aggregation opportunity may be a function of actual power level production above one of a baseline (e.g., non-participation) level and/or an expected level. The upshot of the aggregation opportunity may be a function of the requested net change in power.

One or more proposed engagement rule sets are determined 304 for a plurality of sites. An engagement rule set may be determined 304 for each of the plurality of site controllers to provide parameters, guidelines, or the like for the sites to participate in an event that is responsive to the aggregation opportunity. The engagement rule set(s) may include indication of an amount of a site change in power and a period over which the indicated amount of the site change in power is to be provided.

For example, an engagement rule set may include a proposed apportionment value that indicates a portion of the requested net change in power to be provided by a corresponding site for participation in an event responsive to the aggregation opportunity. The proposed apportionment value of each given site may be determined based on a total quantity of available DERs at each site. The proposed apportionment value of each given site may be determined based on a capacity of a battery of the energy storage system of the given site relative to a capacity of all batteries of the energy storage systems of the plurality of sites. The proposed apportionment value of each given site may be determined based on a power output of a battery of the energy storage system of the given site relative to a total power output of all batteries of the energy storage systems of the plurality of sites. The proposed apportionment value of each given site may be an assignment of the total requested net change in power as the proposed apportionment value. An apportionment value may be expressed in units of power (e.g., kW) or units of energy (e.g., kWh). An apportionment value may be expressed in terms of a fraction or a ratio of a total requested net change in power.

In other embodiments, the indicated amount of site change in power (of an engagement rule set) may be provided in terms of a participation benefit, such as a unit value per unit power (e.g., value in dollars ($) per unit power—$/kW). Stated otherwise, the engagement rule set may indicate an amount of site change in power in terms of offering a participation benefit ("I [the utility company] will pay you [the aggregation of sites] $40 for every kW generated [produced, saved, or otherwise provided back to the grid] during the period of the aggregation opportunity."). In one example, a demand response (DR) program may enlist an aggregator to commit to reducing aggregate power consumption compared to a baseline (e.g., a non-participation level) when called upon to do so a limited number of times per year. In this scenario, the aggregator may be pre-paid for the participation and penalized if the performance does not meet agreed-upon levels. In this case the upshot is the negative penalty cost as determined by the contract between the utility and the aggregator.

The period of an engagement rule set may be all or a portion of a time period of an aggregation opportunity. In other words, the period indicated in an engagement rule set may be a fractional portion of the total period for an aggregation opportunity. The engagement rule set may indicate that a given site is needed for only a portion of the entire period of the aggregation opportunity, because other sites of the plurality of sites can handle the requested net change in power during other portions of the period of the aggregation opportunity.

The engagement rule sets and apportioned participation levels are transmitted or otherwise provided 306 to the plurality of site controllers. For example, an aggregation engine may communicate engagement rule set(s) and apportioned participation levels to the plurality of site controllers via a communication network. Each of the individual site controllers can utilize the engagement rule set(s) and apportioned participation levels to determine an impact for the site to participate in the aggregation opportunity.

An impact representation is received 308 from each of the plurality of site controllers. The impact representation indicates an impact on the site of participating in the aggregation opportunity versus not participating in the aggregation opportunity. For example, the impact representation may include cost information, such as a cost differential or information for determining a cost differential. A cost differential indicates a difference in cost of participating (e.g., participating optimally) in the aggregation opportunity versus not participating (e.g., participating optimally) in the aggregation opportunity. The individual site controllers may directly communicate a cost differential, or may communicate both a cost of participation and a cost of nonparticipation, which can be used to determine a cost differential. In other words, a cost differential may be received 308 from a site controller in various ways including at least: 1) directly as a differential value (resulting from the site controller comparing an anticipated cost of participating in a maneuver versus a cost of not participating in a maneuver) and 2) as a pair of cost values, namely a participation cost and a non-participation cost, from which a comparison can be made to derive a differential value.

In other embodiments, an impact representation may include an optimized participation, such as in units of power (kW). The optimized participation would indicate a quantity of participation (e.g., an amount of site change in power) the site controller can optimally provide or reduce, within a threshold level of optimization. For example, a given site controller may be able to easily (e.g., efficiently, or optimally) provide a site change in power of 50 kW from stored power in a battery charged to store 80 kW. However, discharging the battery below 30 kW may significantly degrade the battery, such that providing additional power production beyond the 50 kW may prove to increase the cost significantly. Accordingly, an impact representation can indicate both the cost information and the optimized participation. Optimized participation may be included in an impact representation that is derived based on an engagement rule set that includes a participation benefit. The optimized participation is determined based at least in part on the participation benefit.

In still other embodiments, an impact representation may include a marginal cost of participation, such as in units of value per units of power (e.g., dollars per kW). The marginal cost of participation may indicate additional cost incurred in the production or reduction of consumption of one or more additional units of power. An impact representation that includes a marginal cost of participation may be derived based on an engagement rule set that includes a participation benefit. The marginal cost of participation can be determined based at least in part on the participation benefit.

In still other embodiments, an impact representation may include a nominal cost of participation and a first derivative of the cost of participation with respect to the level of participation. The advantage of this form of impact representation may be to provide useful information to the aggregate optimization engine 222 (FIG. 2) to accelerate finding the optimal aggregate apportionment. This is because many numerical optimizers benefit from having the first derivative of the cost function with respect to each decision variable. This may also result in determination of the optimal aggregate apportionment with a smaller number of iterations and less communication traffic. In these examples, the cost and derivative may be based on the optimal optimized cost or unoptimized cost. In still other embodiments, an impact representation may include a nominal cost of participation for a set of participation parameter values. The advantage of this form of impact representation may be to further accelerate convergence to a minimum-cost apportionment of the total aggregate maneuver. As can be appreciated, other embodiments of impact representations are possible.

In some embodiments, providing 306 the engagement rule set(s), and receiving 308 impact representations from the plurality of site controllers may be an example of polling for an impact representation (e.g., a cost differential). In some embodiments, providing 306 the engagement rule set(s) and receiving 308 impact representations from the plurality of site controllers may be repeated using a plurality of different engagement rule sets. This repetition enables the aggregation engine to obtain impact representations from the plurality of site controllers for multiple variations on apportioning the requirements of the aggregation opportunity among the various sites. In some embodiments, rather than repeat the providing 306 and the receiving 308 for a plurality of different engagement rule sets, the plurality of engagement rule sets may all be provided at once at the providing 306 operation. By extension, the site controllers may provide multiple impact representations corresponding to the multiple engagement rule sets, and the aggregation engine receives 308 these multiple engagement rule sets.

Based on the impact representations received 308 from the site controllers, the aggregation engine selects 309 an optimal engagement rule set. In embodiments where the aggregation engine has received 308 multiple impact representations corresponding to multiple variations of the apportionment (e.g., repetition of 306 and 308, providing a plurality of engagement rule sets, etc.), the aggregation engine may select the engagement rule set that corresponds to the lowest total impact representation. In some embodiments, the aggregation engine may interpolate between the multiple impact representations and engagement rule sets to attempt to further optimize the aggregation (e.g., to reduce the computation performed by the local controllers to determine a large number of optimal impact responses to a large number of engagement rule sets). For example, the aggregation engine may deviate from the engagement rule set that corresponds to the lowest total impact representation based on the interpolations between the multiple impact representations.

Based on a total impact of all the sites corresponding to a selected engagement rule set, participation in the aggregation opportunity is determined 310. This determination 310 is made in embodiments where participation in the aggregation opportunity is optional. Some programs offer optional participation, but some programs require mandatory participation with a penalty for non-performance. The determination 310 of participation may include determining whether to participate in the aggregation opportunity. It will be apparent that the selected engagement rule set may, in some instances, include participation of some of the plurality of sites in and exclude others of the sites from participation in meeting the aggregation opportunity. Determining 310 whether to participate may include comparing the upshot of the aggregation opportunity to a total impact (e.g., a total cost differential) of the selected engagement rule set, which may be a summation (or other compilation) of the selected impact representations (e.g., cost differentials) received 308 from the site controllers. For example, if the upshot is a benefit (e.g., a monetary incentive) that exceeds the total impact (e.g., a total cost differential) of the selected engagement rule set, the determination 310 may be to participate in the aggregation opportunity. By contrast, if the benefit (e.g., including compensation and avoidance of penalties) is less than the total impact (e.g., a total cost differential) of the selected engagement rule set, the determination 310 may be to not participate. As another example, if the upshot of participation is an avoidance of a penalty and the avoided penalty is greater than a total impact (e.g., a total cost differential) of the selected engagement rule set, the determination 310 may be to participate in the aggregation opportunity. However, if the avoided penalty is less than the total impact (e.g., a total cost differential) of the selected engagement rule set, the determination 310 may be to not participate in the aggregation opportunity (i.e., to suffer the penalty rather than the additional cost for participating to respond to the aggregation opportunity). As yet another example, the upshot may include a benefit and an avoidance of a penalty. If the combined benefit and avoided penalty is greater than the total impact, the determination 310 may be to participate in the aggregation opportunity. Otherwise, the determination 310 may be to not participate in the aggregation opportunity. The upshot of the aggregation opportunity may be a function of actual net change in power above one of a baseline (e.g., non-participation) level and/or an expected level. The upshot of the aggregation opportunity may be a function of the requested net change in power.

As previously discussed, it will be apparent that the selected engagement rule set may, in some instances, include participation of some of the sites and exclusion of others of the sites from participation. For example, if a first site could provide a site change in power of 50 kWh toward an aggregation opportunity for a cost differential valued at or equivalent to $50, and a second site could also provide a site change in power of 50 kWh toward the same aggregation opportunity for a cost differential valued at or equivalent to $40, selecting 309 an optimal engagement rule set may include selecting the second site for participation and deselecting the first DER based on the optimal engagement rule set. As can be appreciated, the selected engagement rule set may, in some instances, include participation of all the plurality of sites to contribute net change in power to the aggregation opportunity.

In some embodiments the aggregation engine has different compensation contracts with each site. For example, one site may be paid $0.50 per kWh for participation, and another may be paid $0.30 per kWh for participation. Another way to consider payments to be made by the aggregator to the sites is for each site to include payments to be made by the aggregator to the site as part of its cost when polled for the cost of participation. Combinations of these two approaches are also possible.

If the determination 310 is to participate, then participation of selected sites is scheduled 312 for performing a maneuver to meet the net change in power requested by the aggregation opportunity. The selected sites may be scheduled 312 by transmitting, via the communication network, a command, signal, or the like to the selected site controllers of the plurality of sites to schedule participation in the aggregation opportunity. The command, signal, or the like may schedule 312 the selected sites to provide a portion of the requested net change in power for at least a portion of the period of time of the aggregation opportunity. The command may include a committed apportionment value and timing for applying the committed apportionment value to provide a corresponding portion of the overall requested net change in power for at least a portion of the period of time of the aggregation opportunity. The requested net change in power may be an amount relative to a baseline (e.g., non-participation) level. The requested net change in power may be an amount relative to an expected level. The site controllers may in turn provide a portion of the requested net change in power by a reduction in consumed power, such as through control of loads, generators, and batteries. The site controllers may produce a portion of the requested net change in power through original generation of electricity, such as by photovoltaic generation, wind generation, fuel cells, and/or other electricity generation mechanisms.

In some cases, the site controllers may not be able to fulfill their requested site change in power. For this possibility, the total net change in power for the aggregate maneuver may be increased over the amount requested by the utility. With this approach, the likelihood of penalty due to non-performance can be reduced. Furthermore, during execution of the aggregate maneuver, if some sites under-produce compared to the requested production Pf or if the total production falls below the required level, the scheduling participation may dynamically increase the requested amount of site change in power from some or all of the site controllers to compensate. Again, this can help minimize the possibility of under-delivering the contracted aggregate maneuver and associated penalties.

As previously mentioned, in some embodiments the polling the plurality of site controllers, such as through determining 304 engagement rule set(s), providing 306 engagement rule set(s) to the site controllers, and receiving 308 impact representations from the site controllers, may be repeatedly performed according to an optimization algorithm to, in essence, repeatedly test the apportionment values and determine an optimized final set of apportionment values. The optimization algorithm may be a continuous optimization algorithm. The optimization algorithm may be a constrained optimization algorithm. The optimization algorithm may be a generalized optimization algorithm. The optimization algorithm may be a multivariable optimization algorithm.

Distributed Energy Resources and Local Control Thereof

Figure 4:
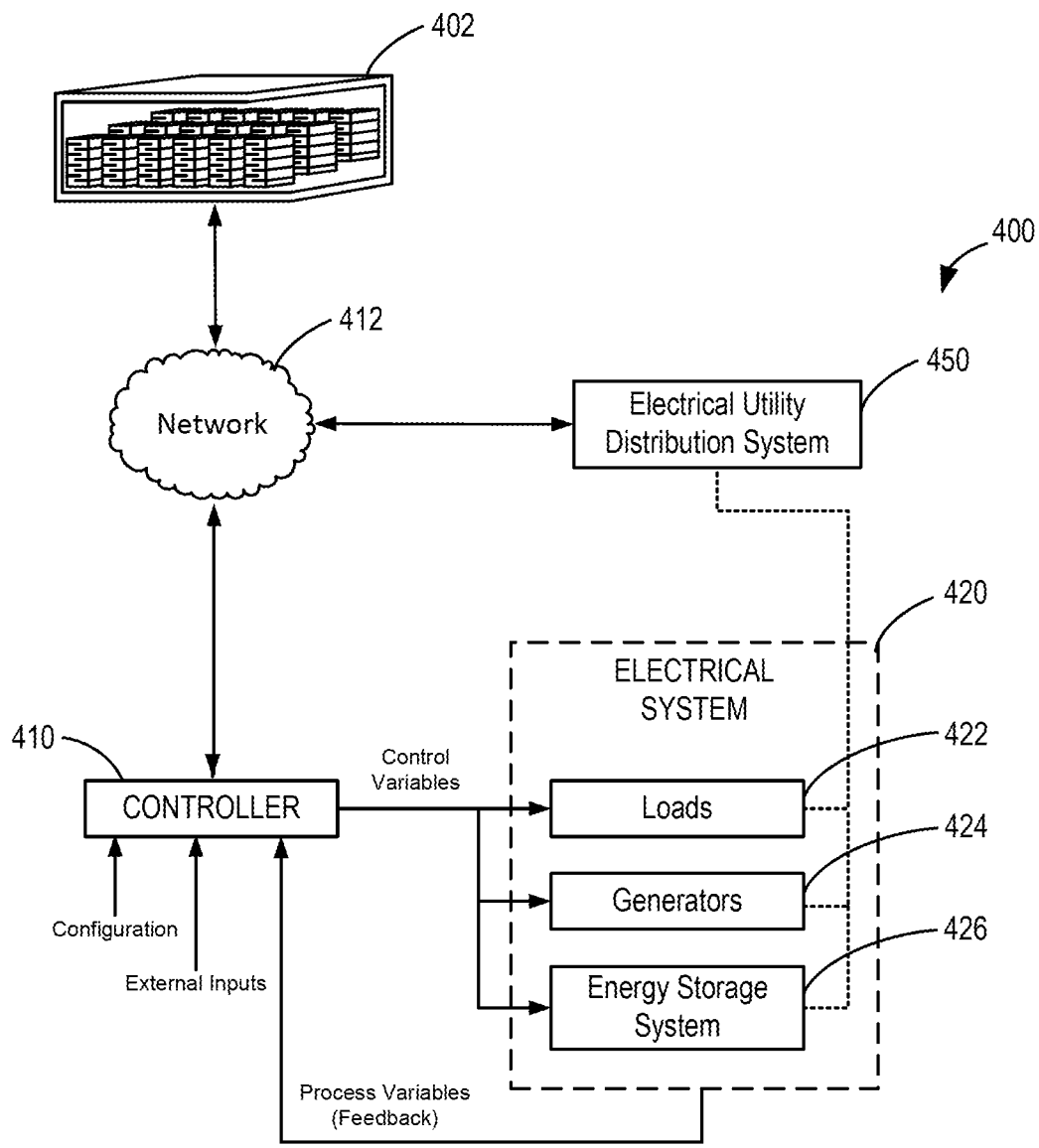
FIG. 4 is block diagram illustrating a system architecture of a DER, according to one embodiment of the present disclosure.

FIG. 4 is block diagram illustrating a system architecture of a site 400, according to one embodiment of the present disclosure. FIG. 4 also provides a control diagram of site 400, according to one embodiment of the present disclosure. Stated otherwise, FIG. 4 is a representative diagram of a system architecture of a site 400 including a controller 410, according to one embodiment. The site 400 comprises an electrical system 420 that is controlled by the controller 410. The electrical system 420 includes DERs including one or more loads 422, one or more generators 424, and an energy storage system (ESS) 426. The electrical system 420 is coupled to an electrical utility distribution system 450, and therefore may be considered on-grid. Similar electrical systems exist for other applications, such as a photovoltaic generator plant, an off-grid building, etc.

In the diagram of FIG. 4, the controller 410 is shown on the left-hand side and the electrical system 420, sometimes called the "plant," is shown on the right-hand side. An aggregation engine 402 interconnects with the controller 410 (e.g., a site controller) of the site 400 and the electrical utility distribution system 450, such that the aggregation engine 402 can receive aggregation opportunities from the electrical utility distribution system 450 and can communicate with the site controller 410 of the site 400 to coordinate a maneuver of an aggregation opportunity. The aggregation engine 402 may interconnect with controllers of a plurality of sites.

The controller 410 may be a site controller of the site 400 and can include electronic hardware and software in one embodiment. In one example arrangement, the controller 410 includes one or more processors and suitable storage media, which stores programming in the form of executable instructions which are executed by the processors to implement the control processes. The controller 410 is in communication over a network 412 with the aggregation engine 402, which may be similar to the aggregation engine 102 of FIG. 1 or the aggregation engine 202 of FIG. 2.

The electrical system 420 includes a combination of all local loads 422, local generators 424, and the ESS 426 of the site 400. The electrical system 420 may provide local energy distribution or connectivity from the electrical utility distribution system 450 to or between the local loads 422, the local generators 424, and/or the ESS 426 of the site 400.

Loads are consumers of electrical energy within an electrical system. Examples of loads are air conditioning systems, motors, electric heaters, etc. The sum of the loads' electricity consumption rates can be measured in units of power (e.g. kW) and simply called "load" (e.g., a building load).

Generators may be devices, apparatuses, or other means for generating electrical energy within an electrical system. Examples are solar photovoltaic systems, wind generators, combined heat and power (CHP) systems, and diesel generators or "gen-sets." The sum of electric energy generation rates of the generators 424 can be measured in units of power (e.g., kW) and simply referred to as "generation."

As can be appreciated, loads may also generate at certain times. An example may be an elevator system that is capable of regenerative operation when the carriage travels down. Accordingly, this load may, at times, serve as a DER similar to a generator. Distributed Energy Resource (DER) in this context is any device that can produce or consume energy and are often controllable in some way. In one embodiment, electrically connected DERs (simplified to DERs here) can generate or consume electrical energy. Almost all DERs are controllable to some extent. PV generators, wind turbines, and diesel gensets are DERs, as are energy storage systems (ESSs). Even loads are DERs, and most of them (such as lights) can be controlled in limited ways by turning them off or using other means such as changing the setting on a thermostat. The net load of a DER or collection of DERs is the load (power consumption) minus generation (power generation). Net load may be positive or negative.

Unadjusted net power or unadjusted net load may refer herein to net load in the absence of active control by the site controller 410. For example, if at a given moment a building has loads consuming 100 kW, and a solar photovoltaic system generating at 25 kW, the unadjusted net power is 75 kW. Similarly, if at a given moment a building has loads consuming 70 kW, and a solar photovoltaic system generating at 100 kW, the unadjusted net power is −30 kW. As a result, the unadjusted net power is positive when the load energy consumption exceeds generation, and negative when the generation exceeds the load energy consumption.

ESS power refers herein to a sum of a rate of electric energy consumption of an ESS. If ESS power is positive, an ESS is charging (consuming energy). If ESS power is negative, an ESS is generating (delivering energy).

Adjusted net power refers herein to unadjusted net power plus the power contribution of any controllable elements such as an ESS. Adjusted net power is therefore the net rate of consumption of electrical energy of the electrical system considering all loads, generators, and ESSs in the system, as controlled by a controller described herein.

Unadjusted demand is electricity demand as defined by the locally applicable tariff, but only based on the unadjusted net power. In other words, unadjusted demand does not consider the contribution of any ESS.

Adjusted demand or simply "demand" is demand as defined by the locally applicable tariff, based on the adjusted net power, which includes the contribution from any and all controllable elements such as ESSs. Adjusted demand is the demand that can be monitored by the utility and used in the demand charge calculation.

Referring again to FIG. 4, the electrical system 420 may provide information to the controller 410, such as by providing process variables. The process variables may provide information, or feedback, as to a status of the electrical system 420 and/or one or more components (e.g., loads, generators, ESSs) therein. For example, the process variable may provide one or more measurements of a state of the electrical system 420. The controller 410 receives the process variables for determining values for control variables to be communicated to the electrical system 420 to effectuate a change to the electrical system 420 toward meeting a controller objective for the electrical system 420. For example, the controller 410 may provide a control variable to adjust the load 422, to increase or decrease generation by the generator 424, and to utilize (e.g., charge or discharge) the ESS 426.

The controller 410 may receive a configuration (e.g., a set of configuration elements), which may specify one or more constraints of the electrical system 420. The configuration may inform the determination of the values of the control variables.

The controller 410 may also receive external inputs (e.g., weather reports, changing tariffs, fuel costs, event data), which may inform the determination of the values of the control variables. A set of external inputs may be received by the controller 410. The set of external inputs may provide indication of one or more conditions that are external to the controller 410 and the electrical system 420.

The controller 410 may receive (e.g., from the aggregation engine 402) an engagement rule set, which may provide to the site 400 an amount of power production and a period of time for the site 400 to participate in an aggregation opportunity. For example, the engagement rule set may provide one or more apportionment values, constraints, rules, instructions, and/or commands from the aggregation engine 402 for participating in a maneuver (e.g., an aggregation opportunity) for an aggregation opportunity. The controller 410 may utilize the engagement rule set to inform determination of the values of the control variables.

An engagement rule set may be utilized to evaluate a hypothetical scenario, such that the site controller 410 and/or the aggregation engine 402 can determine an impact of participation in an aggregation opportunity. In some embodiments, engagement rule sets provide proposed values. In some embodiments, engagement rule sets provide committed values (e.g., values to which the site 400 is committed to abide). In some embodiments, a committed value such as an apportionment value may be communicated separately from an engagement rule set.

As can be appreciated, proposed apportionment values may be provided to a site controller 410 of a site 400 in an engagement rule set, a configuration, external inputs, or any suitable input and/or communication. Similarly, committed apportionment values may be provided to a site controller 410 of a site 400 in an engagement rule set, a configuration, external inputs, or any suitable input and/or communication.

As noted, the controller 410 may attempt to meet certain objectives by changing a value associated with one or more control variables, if necessary. The objectives may be predefined, and may also be dependent on time, any external inputs, any engagement rule sets, any process variables that are obtained from the electrical system 420, and/or the control variables themselves. Some examples of controller objectives for different applications are:

Provide a level of power proportional to a received apportionment value over a prescribed period of time;

Reduce consumption of power proportionally to a received apportionment value over a prescribed period of time;

Minimize demand (kW) over a prescribed time interval;

Minimize demand charges ($) over a prescribed time interval;

Minimize total electricity charges ($) from the grid;

Reduce demand (kW) from the grid by a prescribed amount during a prescribed time window; and Maximize the life of the energy storage device.

Objectives can also be compound—i.e., a controller objective can comprise multiple individual objectives. One example of a compound objective is to minimize demand charges while maximizing the life of the energy storage device. Another example of a compound objective is providing a level of power for at least a portion of a maneuver of an aggregation opportunity while minimizing demand charges. Other compound objectives including different combinations of the individual objectives are possible.

The inputs that the controller 410 may use to determine (or otherwise inform a determination of) the control variables can include configuration, external inputs, engagement rule sets, apportionment values, and process variables.

Process variables may typically be measurements of the state of the electrical system 420 and are used by the controller 410 to, among other things, determine how well its objectives are being met. These process variables may be read and used by the site controller 410 of the site 400 to generate new control variable values. The rate at which process variables are read and used by the controller 410 depends upon the application, and may typically range from once per millisecond to once per hour. For battery energy storage system applications, the rate is often between 10 times per second and once per 15 minutes. Examples of process variables may include:

Unadjusted net power
Unadjusted demand
Adjusted net power
Demand
Load (e.g., load energy consumption for one or more loads)
Generation for one or more loads
Actual ESS charge or generation rate for one or more ESSs
Frequency
Energy storage device state of charge (SoC) (%) for one or more ESSs
Energy storage device temperature (deg. C.) for one or more ESSs
Electrical meter outputs such as kilowatt-hours (kWh) or demand A configuration received by the controller 410 (or input to the controller 410) may include or be received as one or more configuration elements (e.g., a set of configuration elements). The configuration elements may specify one or more constraints associated with operation of the electrical system 420. The configuration elements may define one or more cost elements associated with operation of the electrical system 420. Each configuration element may set a status, state, constant or other aspect of the operation of the electrical system 420. The configuration elements may be values that are typically constant during the operation of the controller 410 and the electrical system 420 of the site 400. The configuration elements may specify one or more constraints of the electrical system and/or specify one or more cost elements associated with operation of the electrical system.

Examples of configuration elements may include:

ESS type (for example if a battery: chemistry, manufacturer, and cell model)

ESS configuration (for example, if a battery: number of cells in series and parallel) and constraints (such as maximum charge and discharge powers)

ESS efficiency properties

ESS degradation properties (as a function of SoC, discharge or charge rate, and time)

Electricity supply tariff (including ToU supply rates and associated time windows)

Electricity demand tariff (including demand rates and associated time windows)

Electrical system constraints such as minimum power import

ESS constraints such as SoC limits or power limits

Historic data such as unadjusted net power or unadjusted demand, weather data, and occupancy Operational constraints such as a requirement for an ESS to have a specified minimum amount of energy at a specified time of day External inputs are variables that may be used by the controller 410 and that may change during operation of the controller 410. Examples are weather forecasts (e.g., irradiance for solar generation and wind speeds for wind generation) and event data (e.g., occupancy predictions). In some embodiments, tariffs (e.g., demand rates defined therein) may change during the operation of the controller 410, and may therefore be treated as an external input. In some embodiments, the engagement rule set (e.g., an apportionment value) may be received by the controller 410.

The outputs of the site controller 410 include the control variables that can affect the electrical system behavior. Examples of control variables are:

ESS power command (kW or %). For example, an ESS power command of 50 kW would command the ESS to charge at a rate of 50 kW per unit time, and an ESS power command of −20 kW would command the ESS to discharge at a rate of 20 kW per unit time.

Building or subsystem net power increase or reduction (kW or %).

Renewable energy increase or curtailment (kW or %). For example, a photovoltaic (PV) system curtailment command of −100 kW would command a PV system to limit generation to no less than −100 kW. Again, the negative sign is indicative of the fact that the value is generative (non-consumptive).

In some embodiments, control variables that represent power levels may be signed, e.g., positive for consumptive or negative for generative.

The outputs of the site controller 410 may also include an impact representation, which may indicate or otherwise represent an impact on the site 400 of participating in an aggregation opportunity versus not participating in the aggregation opportunity.

In some embodiments, the impact representation may include a cost differential, which indicates or otherwise represents a difference in cost of participation in the aggregation opportunity versus not participating in the aggregation opportunity. The impact representation and/or the outputs of the site controller 410 may also include a baseline (e.g., non-participation) cost and a participation cost, from which a cost differential may be calculated or otherwise derived.

In one illustrative example, consider that an objective of the controller 410 may be to reduce demand charges while preserving battery life. In this example, only the ESS may be controlled. To accomplish this objective, the controller 410 should have knowledge of a configuration of the electrical system 420, such as the demand rates and associated time windows, the battery capacity, the battery type and arrangement, etc. Other external inputs may also be used to help the controller 410 meet its objectives, such as a forecast of upcoming load and/or forecast of upcoming weather (e.g., temperature, expected solar irradiance, wind). Process variables from the electrical system 420 that may be used may provide information concerning a net electrical system power or energy consumption, demand, a battery SoC, an unadjusted building load, and an actual battery charge or discharge power. In this one illustrative example, the control variable may be a commanded ESS's charge or discharge power (e.g., a charge or discharge power for a battery of the ESS). In order to more effectively meet the objective, the controller 410 may continuously track the peak net building demand (kW) over each applicable time window, and use the battery to charge or generate at appropriate times to limit the demand charges. In one specific example scenario, the ESS may be utilized to attempt to achieve substantially flat (or constant) demand from the electrical utility distribution system 450 (e.g., the grid) during an applicable time window when a demand charge applies.

The objective of the site controller 410 may be compounded by receiving an engagement rule set from the aggregation engine 402, which may include an inquiry as to the impact (e.g., cost) to the site 400 of providing a proposed portion of the net change in power for a period of time. The power level may be a portion of a requested net change in power of an aggregation opportunity, and may be based on an apportionment value provided by the aggregation engine 402. The site controller 410 would then determine the control variable value(s) to provide the power level, and maintain the objectives of reducing demand charges while preserving battery life.

As will be described more fully below, the site controller 410 may utilize an optimization algorithm and may determine the control variables in advance of a time period of using those control variables. Advance determination of the control variables may enable repeated inquiry or polling of the site by the aggregation engine 402 to test different engagement rule sets to determine an optimized set of apportionment values, and thereby minimize a cost of participation in an aggregation opportunity. In certain embodiments, the different engagement rule sets may include proposed apportionment values.

Figure 5B:
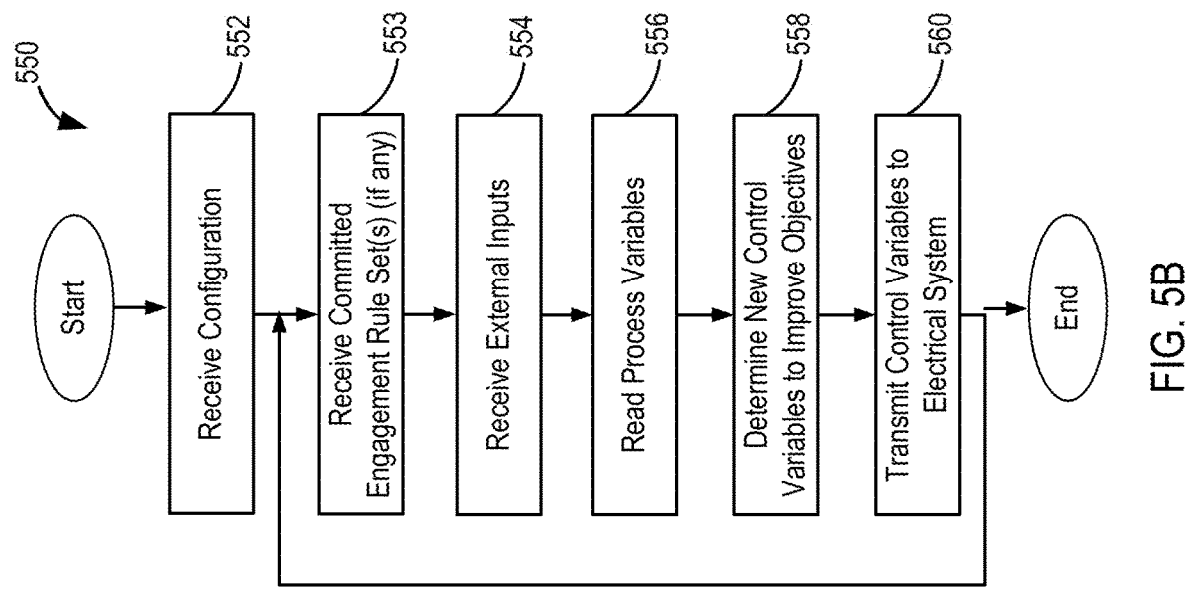
FIG. 5B is a flow diagram of a method or process of controlling a DER, according to another embodiment of the present disclosure.
Figure 5A:
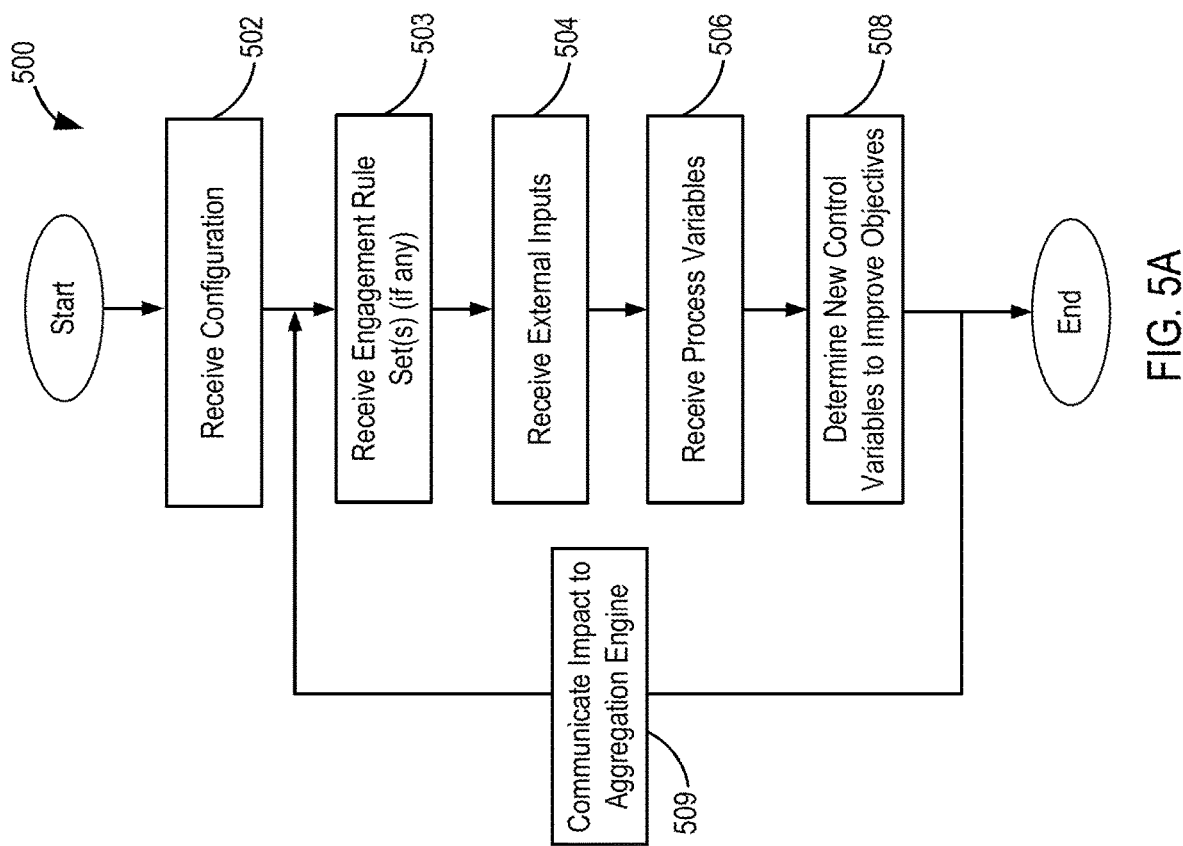
FIG. 5A is a flow diagram of a method or process of controlling a DER, according to one embodiment of the present disclosure.

FIG. 5A is a flow diagram of a method 500 or process of controlling a site (e.g., the site 400 of FIG. 4), according to one embodiment of the present disclosure. The method 500 may be implemented by a controller of an electrical system, such as the controller 410 that is controlling the electrical system 420 of the site 400 of FIG. 4. The controller may read or otherwise receive 502 a configuration (e.g., a set of configuration elements) of the electrical system of the site. As previously described, the configuration elements may provide information as to the configuration of the electrical system.

The controller may also read or otherwise receive 503 one or more engagement rule sets from a remote aggregation engine (e.g., the aggregation engine 402 of FIG. 4). The engagement rule set(s) may be received in connection with an aggregation opportunity promulgated to the remote aggregation engine by a utility, or other entity desiring to obtain additional net change in power. For example, a utility or other entity may desire to obtain additional power resources and may seek power from an aggregation of power provided through use of DERs of a plurality of sites. The one or more engagement rule set(s) may indicate a portion of a total requested power level of an aggregation request, the portion indicating an amount that the aggregation engine can expect the site to provide toward meeting the aggregation opportunity. The portion of power may be indicated by an apportionment value. Multiple apportionment values may be included in an engagement rule set in some situations, such as where an amount of power requested changes during a time period. For example, the aggregation request may specify a total requested power level of 100 MW for 60 minutes of a 90-minute total time period and 75 MW for a remaining 30 minutes of the 90-minute total time period. Accordingly, the engagement rule set(s) may provide multiple apportionment values, such that the apportionment allocated to the site may change or be adjusted to accommodate the changes to the total requested power level. Further, or alternatively, apportionment values may include or otherwise be accompanied by an amount of time corresponding to a given apportionment value. Stated otherwise, apportionment values may be included in a "quantity" and "timing" pair, with a quantity apportionment value specifying a change in power (e.g., production level or reduction of power consumption), and a timing value specifying a duration or period over which that quantity apportionment value is to be provided. When an aggregation opportunity is not available, engagement rule set(s) may not be available and/or read 503.

The controller may also read or otherwise receive 504 external inputs, such as weather reports (e.g., temperature, solar irradiance, wind speed), changing tariffs, event data (e.g., occupancy prediction, sizeable gathering of people at a location or venue), and the like.

The controller may also read or otherwise receive 506 process variables, which may include measurements of a state of the electrical system and indicate, among other things, how well objectives of the controller are being met. The process variables provide feedback to the controller from the electrical system of the site as part of a feedback loop.

Using the configuration, any available engagement rule set(s), the external inputs, and/or the process variables, the controller determines 508 new control variables that can be used to improve achievement of objectives of the controller, including meeting the aggregation opportunity. Stated differently, the controller determines 508 new values for each control variable that would effectuate a change to the electrical system toward meeting one or more controller objectives for the electrical system, and the one or more controller objectives may include participation in a maneuver (providing a portion of power in an aggregation opportunity) to respond to the aggregation opportunity. In the method 500, the new values may be used in simulation (rather than by the actual electrical system) as part of determining the impact or as part of an optimization algorithm. Stated otherwise, the new values determined 508 for each control variable may not be communicated to the electrical system.

If the optimization is continuing, the engagement rule set(s) may have been proposed engagement rule set(s), and an impact may be communicated 509 to the aggregation engine. The impact may be communicated 509 as an impact representation, which may comprise, for example, a participation cost or other mechanism to communicate a cost differential of participation versus non-participation in the aggregation opportunity. The aggregation engine may then provide new or otherwise revised engagement rule set(s) to the site controller and other site controllers being aggregated by the aggregation engine.

An optimization algorithm of the aggregation engine may include repeated polling of the DER, such that the method 500 is executed repeatedly by a site controller of the DER as the aggregation engine seeks to optimize participation of a plurality of DERs (including the instant DER) in an aggregation opportunity.

FIG. 5B is a flow diagram of a method 550 or process of controlling a site, according to one embodiment of the present disclosure. The method 550 is closely similar to the method 500 of FIG. 5A described above, but handles committed apportionment values (e.g., a finalized engagement rule set) to implement participation in an aggregation opportunity. Stated otherwise, the method 550 of FIG. 5B may be executed alternatively to the method 500 of FIG. 5A. The methods 500 and 550 may also be executed as separate processes working in parallel. The site controller may detect whether the engagement rule sets are at a proposal stage or at a final stage and trigger 500 or 550 accordingly (e.g., 500 if at the proposal stage, 550 if at the final stage). The method 550 may be implemented by a controller of an electrical system, such as the controller 410 that is controlling the electrical system 420 of the site 400 of FIG. 4.

The controller may read or otherwise receive 552 a configuration (e.g., a set of configuration elements) of the electrical system of the site. As previously described, the configuration elements may provide information as to the configuration of the electrical system.

The controller may also read or otherwise receive 553 one or more committed engagement rule sets from a remote aggregation engine (e.g., the aggregation engine 402 of FIG. 4). The committed engagement rule sets relate to aggregation opportunity and may indicate a portion of a total requested net change in power of an aggregation request that the site is committed to provide. Stated differently, the portion indicates an amount of site change in power that the aggregation engine can expect the site to provide toward meeting or responding to the aggregation opportunity. The committed engagement rule set may comprise, or otherwise indicate the portion of power by, one or more committed apportionment values. Multiple apportionment values may be included in an engagement rule set in some situations, such as where an amount of site change in power requested changes during a time period. When an aggregation opportunity is not available, engagement rule set(s) may not be available and/or received 553.

The controller may also read or otherwise receive 554 external inputs, such as weather reports (e.g., temperature, solar irradiance, wind speed), changing tariffs, event data (e.g., occupancy prediction, sizeable gathering of people at a location or venue), and the like.

The controller may also read or otherwise receive 556 process variables, which may include measurements of a state of the electrical system and indicate, among other things, how well objectives of the controller are being met. The process variables provide feedback to the controller from the electrical system of the site as part of a feedback loop.

Using the configuration, any available committed engagement rule set(s), the external inputs, and/or the process variables, the controller determines 558 new control variables to improve achievement of objectives of the controller, including meeting the aggregation opportunity. Stated differently, the controller determines 558 new values for each control variable to effectuate a change to the electrical system toward meeting one or more controller objectives for the electrical system, and the one or more controller objectives may include participation in a maneuver (providing a portion of power in an aggregation opportunity) to respond to the aggregation opportunity.

The new values determined 558 for each control variable are transmitted 560 or otherwise communicated to the electrical system. The control variables may be transmitted 560 as part of implementing site participation in a maneuver to respond to an aggregation response request. The transmission 560 of the control variables to the electrical system allows the electrical system to process the control variables to adjust and change states, thereby effectuating the objective(s) of the controller for the electrical system.

Optimization

In some embodiments, a site controller of a site uses an algorithm (e.g., an optimization algorithm) to determine control variables, for example, to improve performance of the electrical system of the site. Optimization can be a process of finding a variable or variables at which a function f(x) is minimized or maximized. An optimization may be made with reference to such global extrema (e.g., global maximums and/or minimums). Given that an algorithm that finds a minimum of a function can generally also find a maximum of the same function by negating it, the present disclosure may sometimes use the terms "minimization," "maximization," and "optimization," interchangeably.

An objective of optimization by a site controller of an electrical system of a DER may be economic optimization, or determining economically optimal control variables to effectuate one or more changes to the electrical system to achieve economic efficiency (e.g., to operate the electrical system at as low a cost as may be possible, given the circumstances). A more complex objective of optimization may be economic optimization while also providing a requested portion of a requested net change in power level production of an aggregation opportunity. In some embodiments, an apportionment value may be an input to and/or a consideration of the optimization, such that economic optimization is aspired to with a constraint of providing the requested site change in power of an aggregation opportunity. As can be appreciated, other objectives may be possible as well (e.g., prolonging equipment life, system reliability, system availability, fuel consumption, etc.).

The present disclosure includes embodiments of site controllers of sites that optimize a single parameterized cost function (or objective function) for effectively utilizing controllable components of an electrical system of the site in an economically optimized manner. In certain embodiments and/or scenarios, the cost function may include or otherwise account for an apportionment value or other request to provide a portion of a total requested net change in power of an aggregation opportunity. Various forms of optimization may be utilized to economically optimize an electrical system of a site.

Continuous Optimization

A site controller of a DER, according to some embodiments of the present disclosure, may use continuous optimization to determine the control variables. More specifically, the site controller may utilize a continuous optimization algorithm, for example, to find economically optimal control variables to effectuate one or more changes to the electrical system of the site to achieve economic efficiency (e.g., to operate the electrical system at as low a cost as may be possible, given the circumstances). The controller, in one embodiment, may operate on a single objective: optimize overall system economics. Since this approach has only one objective, there can be no conflict between objectives. And by specifying system economics appropriately in a cost function (or objective function), all objectives and value streams can be considered simultaneously based on their relative impact on a single value metric. The cost function may include or otherwise account for an apportionment value or other request to provide a portion of a total requested power level production of an aggregation opportunity. The cost function may be continuous in its independent variables x, and optimization can be executed with a continuous optimization algorithm that is effective for continuous functions. Continuous optimization differs from discrete optimization, which involves finding the optimum value from a finite set of possible values or from a finite set of functions.

As can be appreciated, in another embodiment, the cost function may be discontinuous in x (e.g., discrete or finite) or piecewise continuous in x, and optimization can be executed with an optimization algorithm that is effective for discontinuous or piecewise continuous functions.

Constrained Optimization

In some embodiments, the site controller of an electrical system of a site utilizes a constrained optimization to determine the control variables. In certain embodiments, the controller may utilize a constrained continuous optimization to find a variable or set of variables $x_{opt}$ at which a continuous function f(x) is minimized or maximized subject to constraints on the allowable x. Possible constraints may be an equation or inequality. An apportionment value may impose a possible constraint.

As an example, consider an equation:

$$f(x)=100(x_2-x_1^2)^2+(1-x_1)^2.$$

The set x includes the independent variables $x_1$, $x_2$. Constraints may be defined by the equation:

$$x_2^2+x_1^2 \leq 1.$$

A curve of ln (1+f(x)) vs. $x_1$ and $x_2$ would reflect the constraint within an outlined unit disk and a minimum at (0.7864, 0.6177).

Constrained continuous optimization algorithms are useful in many areas of science and engineering to find a "best" or "optimal" set of values that affect a governing of a process. They are particularly useful in cases where a single metric is to be optimized, but the relationship between that metric and the independent (x) variables is so complex that a "best" set of x values cannot easily be found symbolically in closed form. For example, consider a malignant tumor whose growth rate over time is dependent upon pH and on the concentration of a particular drug during various phases of growth. The equation describing growth rate as a function of the pH and drug concentration is known and can be written down but may be complex and nonlinear. It might be very difficult or impossible to solve the equation in closed form for the best pH and drug concentration at various stages of growth. It may also depend on external factors such as temperature. To solve this problem, pH and drug concentration at each stage of growth can be combined into an x vector with two elements. Since the drug concentration and pH may have practical limits, constraints on x can be defined. Then the function can be minimized using constrained continuous optimization. The resulting x, where the growth rate is minimized, contains the "best" pH and drug concentration to minimize growth rate. Notably, this approach can find an optimum pH and drug concentration (to machine precision; i.e. within a threshold) from a continuum of infinite possibilities of pH and drug concentration, not just from a predefined finite set of possibilities.

Generalized Optimization

A site controller according to some embodiments of the present disclosure may use generalized optimization to determine the control variables. More specifically, the controller may utilize a generalized optimization algorithm, for example, to find economically optimal control variables to effectuate one or more changes to the electrical system to achieve economic efficiency (e.g., to operate the electrical system at as low a cost as may be possible, given the circumstances).

An algorithm that can perform optimization for an arbitrary or general real function f(x) of any form may be called a generalized optimization algorithm. An algorithm that can perform optimization for a general continuous real function f(x) of a wide range of possible forms may be called a generalized continuous optimization algorithm. Some generalized optimization algorithms may be able to find optimums for functions that may not be continuous everywhere, or may not be differentiable everywhere. Some generalized optimization algorithm may also account for constraints, and therefore be a generalized constrained optimization algorithm.

Nonlinear Optimization

A controller according to some embodiments of the present disclosure may use nonlinear optimization to determine the control variables. More specifically, the controller may utilize a nonlinear optimization algorithm, for example, to find economically optimal control variables to effectuate one or more changes to the electrical system to achieve economic efficiency (e.g., to operate the electrical system at as low a cost as may be possible, given the circumstances).

Nonlinear continuous optimization or nonlinear programming is similar to generalized continuous optimization and describes methods for optimizing continuous functions that may be nonlinear, or where the constraints may be nonlinear.

Multi-Variable Optimization

A controller according to some embodiments of the present disclosure may use multi-variable optimization to determine the control variables. More specifically, the controller may utilize a multivariable optimization algorithm, for example, to find economically optimal control variables to effectuate one or more changes to the electrical system to achieve economic efficiency (e.g., to operate the electrical system at as low a cost as may be possible, given the circumstances, including an apportionment value to designate a portion of a net change in power requested by the aggregation opportunity).

Again, consider the equation $$f(x)=100(x_2-x_1^2)^2+(1-x_1)^2,$$

which is a multi-variable equation. In other words, x is a set comprised of more than one element. Therefore, the optimization algorithm is "multivariable." A subclass of optimization algorithms is the multivariable optimization algorithm that can find the minimum of f(x) when x has more than one element. Thus, a generalized constrained continuous multi-variable optimization may be an approach, according to some embodiments.

Economically Optimizing Electrical System Controller

A site controller of an electrical system of a site, according to one embodiment of the present disclosure, is now described to provide an example of using optimization to control an electrical system of a site. An objective of using optimization may be to minimize the total electrical system operating cost during a period of time, taking into account providing a site change in power according to an apportionment value indicating a portion of a net change in power requested by an aggregation opportunity.

For example, the approach of the site controller may be to minimize the operating cost during an upcoming time domain, or future time domain, which may extend from the present time by some number of hours (e.g., integer numbers of hours, fractions of hours, or combinations thereof). As another example, the upcoming time domain, or future time domain, may extend from a future time by some number of hours. Costs included in the total electrical system operating cost may include electricity supply charges, electricity demand charges, a battery degradation cost, equipment degradation cost, efficiency losses, etc. Benefits, such as incentive payments, which may reduce the electrical system operating cost, may be incorporated (e.g., as negative numbers or values) or otherwise considered. Other costs may be associated with a change in energy in the ESS such that adding energy between the beginning and the end of the future time domain is valued. Other costs may be related to reserve energy in an ESS such as for backup power purposes. Other costs may arise according to any engagement rule set(s), which may be handled as imposing a constraint of providing a site change in power that is a portion of a total net change in power requested by the aggregation opportunity. For example, costs or penalties related to not providing a net change in power may be incorporated. In some embodiments, some fraction of the upshot may be incorporated. All of the costs and benefits can be summed into a net cost function, which may be referred to as simply the "cost function."

In certain embodiments, a control parameter set X can be defined (in conjunction with a control law) that is to be applied to the electrical system, how they should behave, and at what times in the future time domain they should be applied. In some embodiments, the cost function can be evaluated by performing a simulation of electrical system operation with a provided set X of control parameters. The control laws specify how to use X and the process variables to determine the control variables. The cost function can then be prepared or otherwise developed to consider the control parameter set X.

For example, a cost $f_c(X)$ may consider the control parameter values in X and return the scalar net cost of operating the electrical system with those control parameter values. All or part of the control parameter set X can be treated as a variable set $X_x$ (e.g., x as described above) in an optimization problem. The remaining part of X, $X_{logic}$, may be determined by other means such as logic (for example, logic based on constraints, inputs, other control parameters, mathematical formulas, etc.). Any constraints involving $X_x$ can be defined, if so desired. Then, an optimization algorithm can be executed to solve for the optimal $X_x$. We can denote $X_{opt}$ as the combined $X_x$ and $X_{logic}$ values that minimize the cost function subject to the constraints, if any. Since $X_{opt}$ represents the control parameters, this example process fully specifies the control that will provide minimum cost (e.g., optimal) operation during the future time domain. Furthermore, to the limits of computing capability, this optimization can consider the continuous domain of possible $X_x$ values, not just a finite set of discrete possibilities. This example method continuously can "tune" possible control sets until an optimal set is found. We may refer to these certain example embodiments of a controller as an economically optimizing electrical system controller (EOESC).

Some of the many advantages of using an EOESC, according to certain embodiments, compared to other electrical system controllers are significant:

1) Any number of value streams may be represented in the cost function, giving the EOESC an ability to optimize on all possible value streams and costs simultaneously. As an example, generalized continuous optimization can be used to effectively determine the best control given both ToU supply charge reduction and demand charge reduction simultaneously, all while still considering battery degradation cost.

2) With a sufficiently robust optimization algorithm, only the cost function, control law, and control parameter definitions need be developed. Once these three components are developed, they can be relatively easily maintained and expanded upon.

3) An EOESC can yield a true economically optimum control solution to machine or processor precision limited only by the cost function, control laws, and control parameter definitions.

4) An EOESC may yield not only a control to be applied at the present time, but also the planned sequence of future controls. This means one execution of an EOESC can generate a lasting set of controls that can be used into the future rather than a single control to be applied at the present. This can be useful in case a) the optimization algorithm takes a significant amount of time to execute, or b) there is a communication interruption between the processor calculating the control parameter values and the processor interpreting the control parameters and sending control variables to the electrical system.

Figure 6:
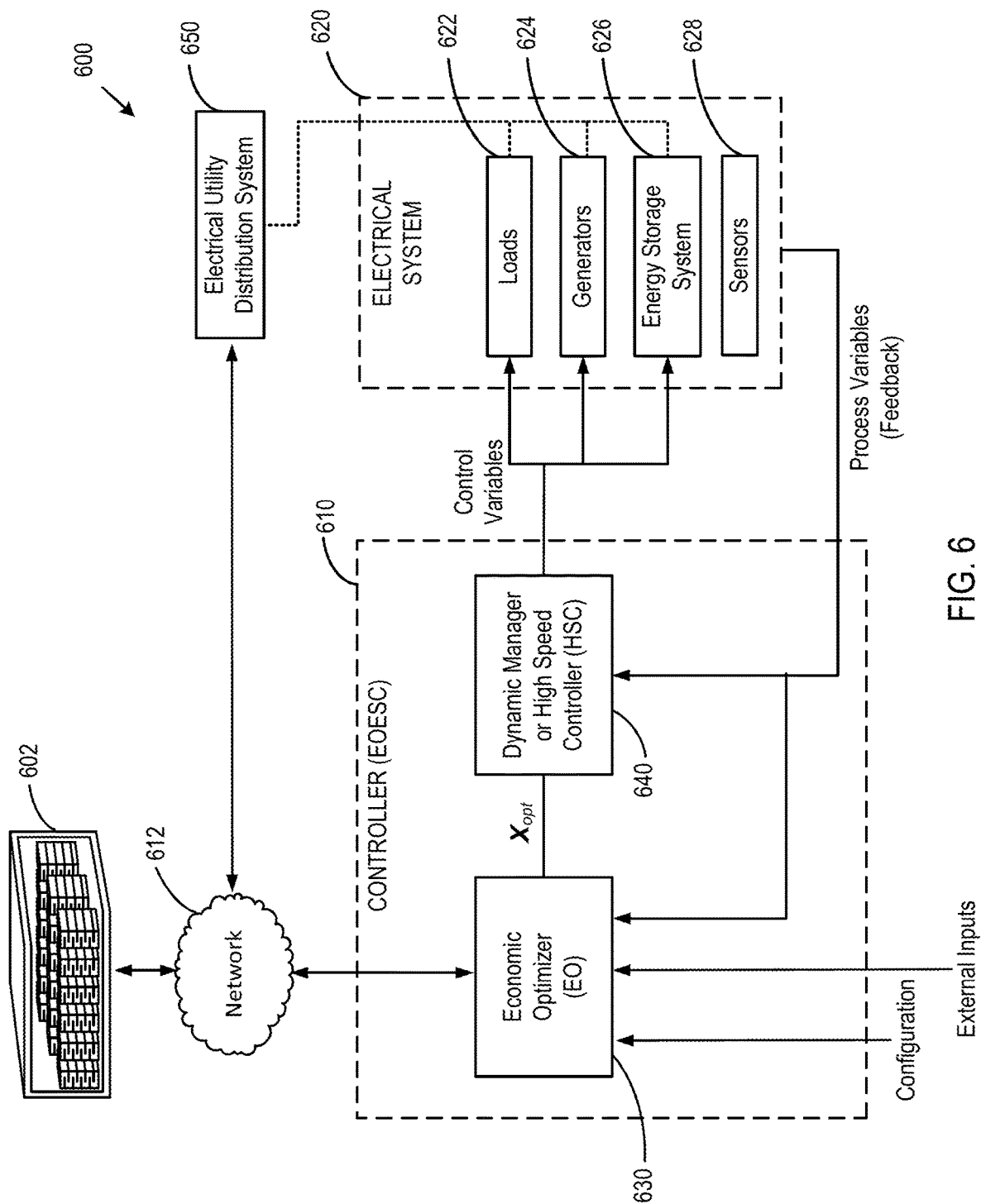
FIG. 6 is a block diagram illustrating a system architecture of a DER, according to another embodiment of the present disclosure.

FIG. 6 is a control diagram illustrating a system architecture of a site 600, according to one embodiment of the present disclosure. The site 600 includes an EOESC 610. The site 600 comprises an electrical system 620 that is controlled by the EOESC 610. The electrical system 620 of the site 600 can include any of one or more loads 622, one or more generators 624, an energy storage system (ESS) 626, and one or more sensors 628 (e.g., meters) to provide measurements or other indication(s) of a state of the electrical system 620 of the DER 600. The electrical system 620 of the site 600 is coupled to an electrical utility distribution system 650, and therefore may be considered on-grid. Similar diagrams can be drawn for other applications, such as a photovoltaic generator plant and an off-grid building.

An aggregation engine 602 interconnects with the EOESC 610 and the electrical utility distribution system 650. Through this interconnection, the aggregation engine 602 can receive aggregation opportunities from the electrical utility distribution system 650 and can communicate with the EOESC 610 of the DER 600 to coordinate an aggregation maneuver (for responding to an aggregation opportunity). The aggregation engine 602 may provide apportionment values as inputs to the EOESC 610.

The EOESC 610 receives or otherwise obtains a configuration of the electrical system 620, external inputs, engagement rule sets, apportionment values, and/or process variables, and produces control variables to be sent to the electrical system 620 of the site 600. The control variables are sent to the electrical system 620 to effectuate a change to the electrical system 620 toward meeting a controller objective for economical optimization of the electrical system 620, for example during an upcoming time domain. The control variables may effectuate a change to the electrical system 620 to provide a site change in power that corresponds to an apportionment value requested by an aggregation opportunity. The EOESC 610 may include electronic hardware and software to process the inputs to determine values for each of the control variables. The EOESC 610 may include one or more processors and suitable storage media which store programming in the form of executable instructions, which are executed by the processors to implement control processes.

In the embodiment of FIG. 6, the EOESC 610 includes an economic optimizer (EO) 630 and a dynamic manager 640 (or high speed controller (HSC)). The EO 630 according to some embodiments is presumed to have an ability to measure or obtain a current date and time. The EO 630 may determine a set of values for a control parameter set X and provide the set of values and/or the control parameter set X to the HSC 640. The EO 630 uses a generalized optimization algorithm to determine an optimal set of values for the control parameter set $X_{opt}$. The HSC 640 utilizes the set of values for the control parameter set X (e.g., an optimal control parameter set $X_{opt}$) to determine the control variables to communicate to the electrical system 620 of the DER 600. The HSC 640 in some embodiments is also presumed to have an ability to measure or obtain a current date and time. The two-part approach of the EOESC 610—namely the EO 630 determining control parameters and then the HSC 640 determining the control variables—enables generation of a lasting set of controls, or a control solution (or plan) that can be used into the future, rather than a single control to be applied at the present. Preparing a lasting control solution can be useful if the optimization algorithm takes a significant amount of time to execute. Preparing a lasting control solution can also be useful if there is a communication interruption between calculating the control parameter values and the processor interpreting the control parameters and sending control variables to the electrical system 620 of the site 600. The two-part approach of the EOESC 610 also enables the EO 630 to be disposed or positioned at a different location from the HSC 640. In this way, intensive computing operations that optimization may require can be performed by resources with higher processing capability that may be located remote from the electrical system 620 of the site 600. These intensive computing operations may be performed, for example, at a data center or server center (e.g., in the cloud).

In some embodiments, a future time domain begins at the time the EO 630 executes and can extend any amount of time. In certain embodiments, analysis and experimentation suggest that a future time domain extent of 24 to 48 hours generates sufficiently optimal solutions in most cases.

As can be appreciated, the EOESC 610 of FIG. 6 may be arranged and configured differently from the example shown in FIG. 6, in other embodiments. For example, instead of the EO 630 passing the control parameter set $X_{opt}$ (the full set of control parameters found by a generalized optimization algorithm of the EO 630) to the HSC 640, the EO 630 can pass a subset of $X_{opt}$ to the HSC 640. Similarly, the EO 630 can pass $X_{opt}$ and additional control parameters to the HSC 640 that are not contained in $X_{opt}$. Likewise, the EO 630 can pass modified elements of $X_{opt}$ to the HSC 640. In one embodiment, the EO 630 finds a subset $X_x$ of the optimal X, but then determines additional control parameters $X_{logic}$, and passes $X_{logic}$ together with $X_x$ to the HSC 640. In other words, in this example, the $X_x$ values are to be determined through an optimization process of the EO 630, and the $X_{logic}$ values can be determined from logic. An objective of the EO 630 is to determine the values for each control parameter whether using optimization and/or logic.

For brevity in this disclosure, keeping in mind embodiments where X consists of independent ($X_x$) parameters and dependent ($X_{logic}$) parameters, when describing optimization of a cost function versus X, what is meant is variation of the independent variables $X_x$ until an optimum (e.g., minimum) cost function value is determined. In this case, the resulting $X_{opt}$ will include the combined optimum $X_x$ parameters and associated $X_{logic}$ parameters.

In one embodiment, the EOESC 610 and one or more of its components are executed as software or firmware (for example, stored on non-transitory media, such as appropriate memory) by one or more processors. For example, the EO 630 may comprise one or more processors to process the inputs and generate the set of values for the control parameter set X. Similarly, the HSC 640 may comprise one or more processors to process the control parameter set X and the process variables and generate the control variables. The processors may be computers, microcontrollers, CPUs, logic devices, or any other digital or analog device that can operate on pre-programmed instructions. If more than one processor is used, they can be connected electrically, wirelessly, or optically to pass signals between one another. In addition, the control variables can be communicated to the electrical system components electrically, wirelessly, or optically or by any other means. The processor has the ability to store or remember values, arrays, and matrices, which can be viewed as multi-dimensional arrays, in some embodiments. This storage may be performed using one or more memory devices, such as read access memory (RAM, disk drives, etc.).

Figure 7A:
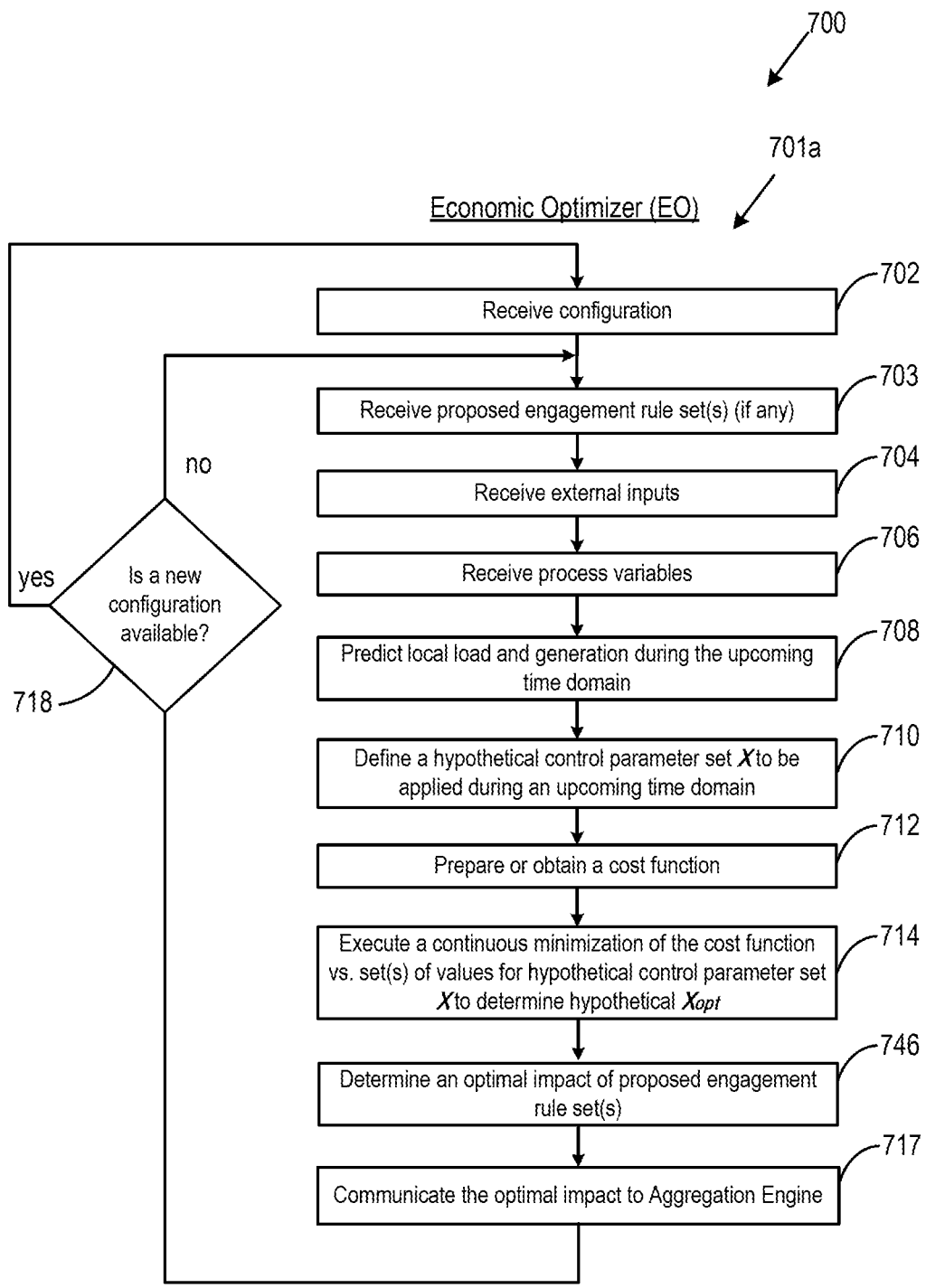
FIGS. 7A-7C are flow diagrams of a method or process of controlling an electrical system (e.g., a site including one or more DERs), according to one embodiment of the present disclosure.
Figure 7B:
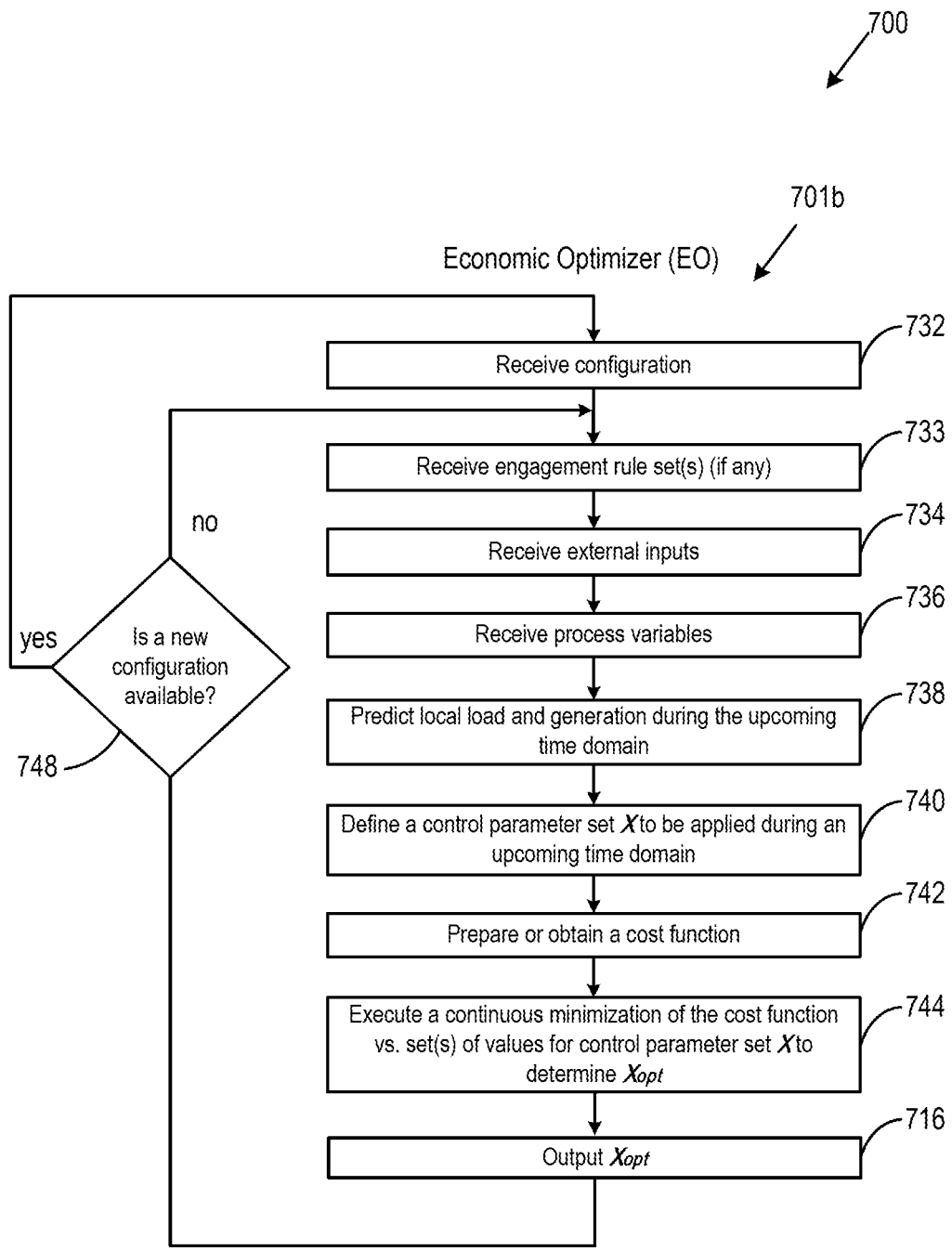
Figure 7C:
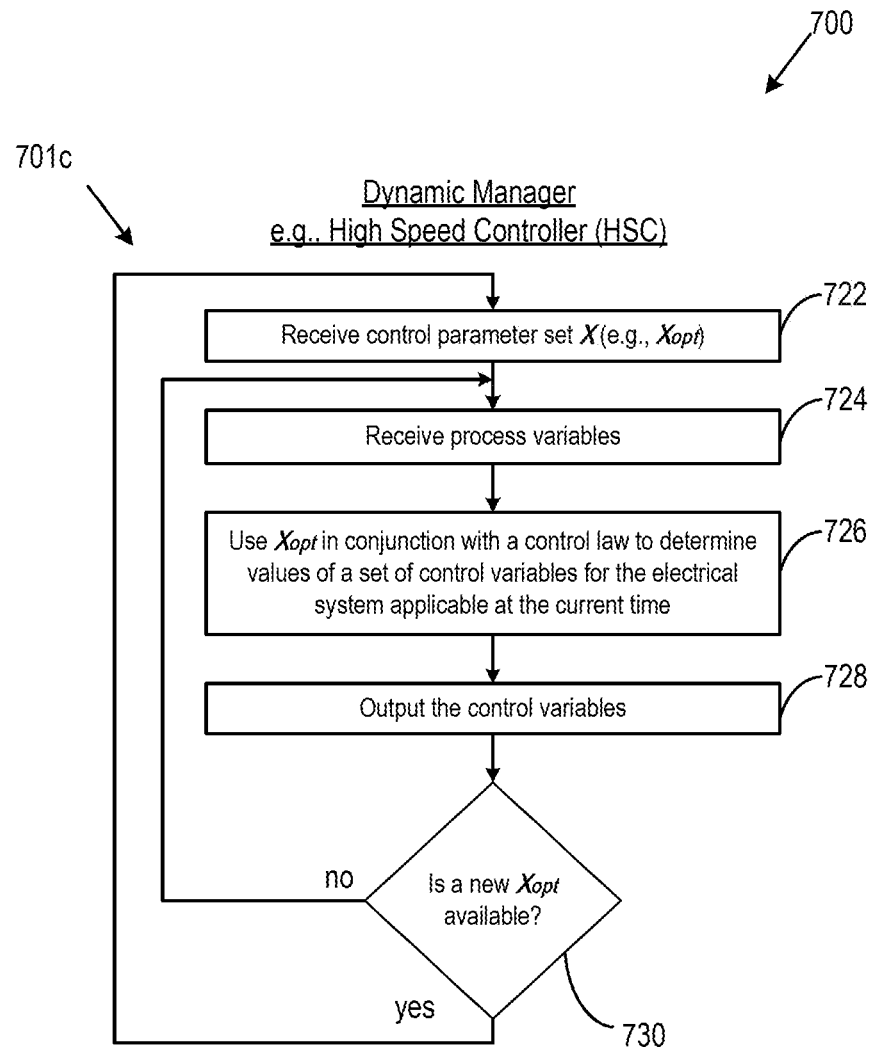

FIGS. 7A-7C are flow diagrams of a method 700 of controlling an electrical system of a site, according to one embodiment of the present disclosure. The method 700 may be implemented by a controller of an electrical system, such as the EOESC 610 of FIG. 6 controlling the electrical system 620 of the site 600 of FIG. 6. The method 700 includes three separate processes, namely an economic optimizer (EO) process 701a for proposed engagement rule sets (FIG. 7A), an EO process 701b for committed engagement rule sets (FIG. 7B), and a high speed controller (HSC) process 701c (FIG. 7C). The HSC process 701c of FIG. 7C may also be referred to herein as a dynamic manager process 701c. The HSC process 701c may utilize a control parameter set X determined by the EO process 701b. Nevertheless, the HSC process 701c may execute separate from, or even independent from, the EO processes 701a, 701b, based on a control parameter set X determined at an earlier time (e.g., by the EO process 701a, 701b). Because the EO processes 701a, 701b can run separate and distinctly from the HSC process 701c, the execution of these processes 701a, 701b, 701c may be co-located on a single system or isolated on remote systems.

The EO processes 701a, 701b may be computer-implemented processes executed by one or more computing devices, such as the EO 630 of FIG. 6. The EO process 701a is used to determine optimal impact of proposed engagement rule sets, and the process 701b is used to optimally implement committed engagement rule sets. Turning to the EO process 701a of FIG. 7A, the EO process 701a includes receiving 702 a configuration, or a set of configuration elements, of the electrical system. The configuration may specify one or more constants of the electrical system. The configuration may specify one or more cost elements associated with operation of the electrical system. The cost elements may include one or more of an electricity cost (e.g., an electricity supply charge, an electricity demand charge), a battery degradation cost, an equipment degradation cost, a tariff definition (e.g., an electricity supply tariff providing ToU supply rates and associated time windows, or an electricity demand tariff providing demand rates and associated time windows), a cost of local generation, penalties associated with deviation from an operating plan (e.g., a prescribed operating plan, a contracted operating plan), costs or benefits associated with a change in energy in the ESS such that adding energy between the beginning and the end of the future time domain is valued, costs or benefits (e.g., a payment) for contracted maneuvers, costs or benefits associated with the amount of energy stored in an ESS as a function of time, costs or benefits associated with reducing electrical power consumption of one or more loads, and a value of comfort that may be a function of other process variables such as building temperature.

In certain embodiments, the set of configuration elements define the one or more cost elements by specifying how to calculate an amount for each of the one or more cost elements. For example, the definition of a cost element may include a formula for calculating the cost element.

In certain embodiments, the cost elements specified by the configuration elements may include one or more incentives associated with operation of the electrical system. An incentive may be considered as a negative cost. The one or more incentives may include one or more of an incentive revenue, a demand response revenue, a value of reserve energy or battery capacity (e.g., for backup power as a function of time), a contracted maneuver, revenue for demand response opportunities, revenue for ancillary services, and revenue associated with deviation from an operating plan (e.g., a prescribed operating plan, a contracted operating plan).

In other embodiments, the configuration elements may specify how to calculate an amount for one or more of the cost elements. For example, a formula may be provided that indicates how to calculate a given cost element.

One or more proposed engagement rule sets may also be received 703, such as from an aggregation engine (e.g., the aggregation engine 602 of FIG. 6). A proposed engagement rule set is an engagement rule set that the aggregation engine is merely proposing in order to receive information regarding an impact expected from implementation of the proposed engagement rule set, which enables the aggregation engine to determine whether to commit to an aggregation opportunity and/or how to apportion site changes in power between various sites. The aggregation engine may later provide a committed engagement rule set, which will be implemented, as discussed below with reference to the EO process 701b of FIG. 7B.

The one or more proposed engagement rule sets may be received 703 in connection with an aggregation opportunity promulgated to the remote aggregation engine by a utility or other entity desiring to obtain a net change in power (e.g., additional power or reduction in consumption of power). For example, a utility or other entity may desire to obtain additional power resources or reduction in power consumption and may seek power from an aggregation of power provided or reduced by a plurality of sites. The proposed engagement rule sets may include one or more apportionment values, which may indicate a portion of a total requested power level or reduction of power consumption of an aggregation request, the portion indicating an amount that the aggregation engine can expect the site to provide or reduce toward meeting the aggregation opportunity. When an aggregation opportunity is not available, proposed engagement rule sets may not be available and/or received 703.

In certain embodiments, proposed engagement rule sets and/or apportionment values may be received as part of the configuration. Stated otherwise, in certain embodiments, receiving 702 a configuration may include receiving one or more apportionment values, if any, for participating in a corresponding aggregation opportunity. The EO process 701a could, accordingly, consider the engagement rule sets and/or apportionment values in a similar manner as other configuration elements received 702 as a configuration.

External inputs may also be received 704. The external inputs may provide indication of one or more conditions that are external to the controller and/or the electrical system. For example, the external inputs may provide indication of the temperature, weather conditions (e.g., patterns, forecasts), and the like.

Process variables are received 706. The process variables provide one or more measurements of a current state of the electrical system. The set of process variables can be used to determine progress toward meeting an objective for economical optimization of the electrical system. The process variables may be feedback in a control loop for controlling the electrical system.

The EO process 701a may include predicting 708 a local load and/or generation during an upcoming time domain. The predicted local load and/or local generation may be stored for later consideration. For example, the predicted load and/or generation may be used in a later process of evaluating the cost function during a minimization of the cost function.

A hypothetical control parameter set X may be defined 710 to be applied during an upcoming time domain. In defining the control parameter set X, the meaning of each element of X is established. A first aspect in defining 710 the hypothetical control parameter set X may include selecting a control law. Then, for example, X may be defined 710 as a matrix of values such that each column of X represents a set of control parameters for the selected control law to be applied during a particular time segment of the future time domain. In this example, the rows of X represent individual control parameters to be used by the control law. Further to this example, the first row of X can represent the nominal ESS power during a specific time segment of the future time domain. Likewise, X may be further defined 710 such that the second row of X is the maximum demand limit (e.g., a maximum demand setpoint). A second aspect in defining 710 the control parameter set X may include splitting the upcoming time domain into sensible segments and selecting the meaning of the control parameters to use during each segment. The upcoming future time domain may be split into different numbers of segments depending on what events are coming up during the future time domain. For example, if there are no supply charges, and there is only one demand period, the upcoming time domain may be split into a few segments. But if there is a complicated scenario with many changing rates and constraints, the upcoming time domain may be split into many segments. (The engagement rule sets and/or apportionment values may be adjusted, both in number of values and in the magnitude of the values, based on the splitting of the time domain into segments.) Lastly, in defining 710 the control parameters X, some control parameters $X_x$ may be marked for determination using optimization, and others $X_{logic}$ may be marked for determination using logic (for example logic based on constraints, inputs, other control parameters, mathematical formulas, etc.).

The EO process 701a may also prepare 712 or obtain a cost function. Preparing 712 the cost function may be optional and can increase execution efficiency by pre-calculating certain values that will be needed each time the cost function is evaluated. The cost function may be prepared 712 (or configured) to include or account for any constraints on the electrical system. In certain embodiments, the constraints may include the one or more apportionment values (if any) that may correspond to an aggregation opportunity.

With the hypothetical control parameter set X defined 710 and the cost function prepared 712, the EO process 701a can execute 714 a minimization or optimization of the cost function resulting in the hypothetical optimal control parameter set $X_{opt}$. For example, a continuous optimization algorithm may be used to identify an optimal set of values for the hypothetical control parameter set $X_{opt}$ (e.g., to minimize the cost function) in accordance with the one or more constraints, the one or more cost elements, and any apportionment values. The continuous optimization algorithm may be one of many types. For example, it may be a generalized continuous optimization algorithm. The continuous optimization algorithm may be a multivariable continuous optimization algorithm. The continuous optimization algorithm may be a constrained continuous optimization algorithm. The continuous optimization algorithm may be a Newton-type algorithm. It may be a stochastic-type algorithm such as Covariance Matrix Adaption Evolution Strategy (CMAES). Other algorithms that can be used are BOBYQA (Bound Optimization by Quadratic Approximation) and COBYLA (Constrained Optimization by Linear Approximation).

To execute the optimization of the cost function, the cost function may be evaluated many times. Each time, the evaluation may include performing a simulation of the electrical system operating during the future time domain with a provided control parameter set X, and then calculating the cost associated with that resulting simulated operation. The cost function may include or otherwise account for the one or more cost elements received 702 in the configuration. For example, the cost function may be a summation of the one or more cost elements (including any negative costs, such as incentives, revenues, and the like). In this example, the optimization step 714 would find a hypothetical $X_{opt}$ that minimizes the cost function. The cost function may also include or otherwise account for the one or more constraints on the electrical system. The cost function may include or otherwise account for any values associated with the electrical system that may be received 702 in the configuration.

The cost function may also evaluate another economic metric such as payback period, internal rate of return (IRR), return on investment (ROI), net present value (NPV), or carbon emission. In these examples, the function to minimize or maximize would be more appropriately termed an "objective function." In case the objective function represents a value that should be maximized, such as IRR, ROI, or NPV, the optimizer should be set up to maximize the objective function when executing 714, or the objective function could be multiplied by −1 before minimization. Therefore, as can be appreciated, elsewhere in this disclosure, "minimizing" the "cost function" may also be more generally considered for other embodiments as "optimizing" an "objective function."

The continuous optimization algorithm may execute the cost function (e.g., simulate the upcoming time domain) a plurality of times with various hypothetical control parameter sets X to identify an optimal set of values for the hypothetical control parameter set $X_{opt}$ to minimize the cost function. The cost function may include a summation of the one or more cost elements, and evaluating the cost function may include returning a summation of the one or more cost elements incurred during the simulated operation of the control system over the upcoming time domain.

Since the hypothetical control parameter set $X_{opt}$ is optimal to minimize/optimize the cost function, an impact of the proposed engagement rule set(s) is also minimized/optimized. Accordingly, an optimal impact of the proposed engagement rule set(s) may be determined 746 based on the hypothetical control parameter set $X_{opt}$. The optimal impact of operating according to the control parameter set $X_{opt}$ may also be communicated 717 to the aggregation engine. An optimal impact of participating in an aggregation opportunity, in accordance with one or more received 703 engagement rule sets, likely will be different than not participating. For example, the optimized impact may be evaluated as a cost, or a cost differential. The cost may be communicated 717 as a baseline cost (e.g., a cost if not participating in the aggregation opportunity) and a participation cost (e.g., a cost if participating in the aggregation opportunity). Alternatively or in addition, the cost may be communicated 717 as a cost differential, which may be a delta of the cost of not participating versus the cost of participating. The cost is communicated 717 to the aggregation engine such that the aggregation engine can determine an optimal aggregation of sites, and specifically an optimal set of sites to participate in a maneuver and at what proportion of the requested net change in power of the aggregation opportunity each individual participating site will provide a site change in power.

The EO process 701a repeats for a next upcoming time domain (a new upcoming time domain). A determination 718 is made whether a new configuration is available. If yes, then the EO process 701a receives 702 the new configuration. If no, then the EO process 701a may skip receiving 702 the configuration and simply receive 704 the external inputs.

As can be appreciated, in other embodiments an EO process may be configured differently, to perform operations in a differing order, or to perform additional and/or different operations. In certain embodiments, an EO process may determine values for a set of control variables to provide to the electrical system to effectuate a change to the electrical system toward meeting the controller objective for economical optimization of the electrical system during an upcoming time domain, rather than determining values for a set of control parameters to be communicated to a HSC process. The EO process may provide the control variables directly to the electrical system, or to an HSC process for timely communication to the electrical system at, before, or during the upcoming time domain.

As previously discussed, the EO process 701b of FIG. 7B is used to optimally implement committed engagement rule sets. The EO process 701b may operate at the same time or at different times as the EO process 701a. Also, separate portions of a controller or the same portions of the controller may be used to implement EO processes 701a and 701b.

Turning now to the EO process 701b of FIG. 7B, the EO process 701b includes receiving 732 a configuration, or a set of configuration elements, of the electrical system. The configuration or set of configuration elements may be similar to those discussed above with reference to operation 702 of FIG. 7A.

One or more committed engagement rule sets may also be received 703, such as from an aggregation engine (e.g., the aggregation engine 602 of FIG. 6). A committed engagement rule set is an engagement rule set that the aggregation engine is assigning the site to execute. The aggregation engine may use impact representations from various sites to determine that the committed engagement rule sets are optimal. In other words, the aggregation engine optimally apportions committed engagement rule sets based on the impact representations to participate in an aggregation opportunity.

Similar to the proposed engagement rule sets and/or apportionment values, the committed engagement rule sets may be received as part of the configuration. Stated otherwise, in certain embodiments, receiving 732 a configuration may include receiving one or more apportionment values, if any, for participating in a corresponding aggregation opportunity. The EO process 701b could, accordingly, consider the committed engagement rule sets and/or apportionment values in a similar manner as other configuration elements received 732 as a configuration.

External inputs may also be received 734. The external inputs may provide indication of one or more conditions that are external to the controller and/or the electrical system. For example, the external inputs may provide indication of the temperature, weather conditions (e.g., patterns, forecasts), and the like.

Process variables are received 736. The process variables provide one or more measurements of a current state of the electrical system. The set of process variables can be used to determine progress toward meeting an objective for economical optimization of the electrical system. The process variables may be feedback in a control loop for controlling the electrical system.

The EO process 701b may include predicting 738 a local load and/or generation during an upcoming time domain. The predicted local load and/or local generation may be stored for later consideration. For example, the predicted load and/or generation may be used in a later process of evaluating the cost function during a minimization of the cost function.

A control parameter set X may be defined 740 to be applied during an upcoming time domain. The control parameter set X may be define similarly to the hypothetical control parameter set X (discussed above with reference to operation 710 of FIG. 7A).

The EO process 701b may also prepare 742 or obtain a cost function. Preparing 742 the cost function may be optional and can increase execution efficiency by pre-calculating certain values that will be needed each time the cost function is evaluated. The cost function may be prepared 742 (or configured) to include or account for any constraints on the electrical system. In certain embodiments, the constraints may include the one or more apportionment values (if any) that may correspond to an aggregation opportunity.

With the control parameter set X defined 740 and the cost function prepared 742, the EO process 701b can execute 744 a minimization or optimization of the cost function resulting in the optimal control parameter set $X_{opt}$. The executing 744 of the minimization or optimization of the cost function may be performed in a similar manner to that discussed above with reference to operation 714 of FIG. 7A.

The optimal control parameter set $X_{opt}$ is then output 716. In some embodiments, the output 716 of the optimal control parameter set $X_{opt}$ may be stored locally, such as to memory, storage, circuitry, and/or a processor disposed local to the EO process 701a. In some embodiments, the outputting 716 may include transmission of the optimal control parameter set $X_{opt}$ over a communication network to a remote computing device, such as the HSC 640 of FIG. 6. For example, if the engagement rule set received 703 previously is a committed engagement rule set, then the optimal control parameter set $X_{opt}$ may be transmitted to the HSC process 701b.

The HSC process 701c may be a computer-implemented process executed by one or more computing devices, such as the HSC 640 of FIG. 6. The HSC process 701c may receive 722 a control parameter set X, such as the optimal control parameter set $X_{opt}$ output 716 by the EO process 701b. Process variables are also received 724 from the electrical system. The process variables include information, or feedback, about a current state or status of the electrical system and/or one or more components therein.

The HSC process 701c determines 726 values for a set of control variables for controlling one or more components of the electrical system at the current time. The HSC process 701c determines 726 the values for the control variables by using the optimal control parameter set $X_{opt}$ in conjunction with a control law. The control laws specify how to determine the control variables from X (or $x_{opt}$) and the process variables. Stated another way, the control law enforces the definition of X. For example, for a control parameter set X defined such that a particular element, $X_i$, is an upper bound on demand to be applied at the present time, the control law may compare process variables such as the unadjusted demand to $X_i$. If unadjusted building demand exceeds $X_i$, the control law may respond with a command (in the form of a control variable) to instruct the ESS to discharge at a rate that will make the adjusted demand equal to or less than $X_i$.

The control variables (including any newly determined values) are then output 728 from the HSC process 701c. The control variables are communicated to the electrical system and/or one or more components therein. Outputting 728 the control variables may include timely delivery of the control variables to the electrical system at, before, or during the upcoming time domain and/or applicable time segment thereof. The timely delivery of the control variables may include an objective to effectuate a desired change or adjustment to the electrical system during the upcoming time domain.

A determination 730 is then made whether a new control parameter set X (and/or values thereof), such as a new optimal control parameter set $X_{opt}$, is available. If yes, then the new control parameter set X (or simply the values thereof) is received 722 and HSC process 701c repeats. If no, then the HSC process 701c repeats without receiving 722 a new control parameter set X, such as a new optimal control parameter set $X_{opt}$.

As can be appreciated, in other embodiments an HSC process may be configured differently, to perform operations in a differing order, or to perform additional and/or different operations. For example, in certain embodiments, an HSC process may simply receive values for the set of control variables and coordinate timely delivery of appropriate control variables to effectuate a change to the electrical system at a corresponding time segment of the upcoming time domain.

The example embodiment of a controller 610 in FIG. 6 and an embodiment of a control method 700 in FIGS. 7A-7C illustrate a two-piece or staged controller, which splits a control problem into two pieces (e.g., a low speed optimizer and a high speed dynamic manager (or high speed controller (HSC)). The two stages or pieces of the controller, namely an optimizer and a dynamic manager, are described more fully in the sections below. Nevertheless, as can be appreciated, in certain embodiments a single-stage approach to a control problem may be utilized to determine optimal control values to command an electrical system.

Economic Optimizer (EO)

Greater detail will now be provided about some elements of an EO, according to some embodiments of the present disclosure.

Predicting a Load/Generation of an Upcoming Time Domain

In many electrical system control applications, a load of the electrical system (e.g., a building load) changes over time. Load can be measured as power or as energy change over some specified time period, and is often measured in units of kW. As noted above with reference to FIG. 7, an EO process 701a may predict 708 a local load and/or generation during an upcoming time domain.

Figure 8:
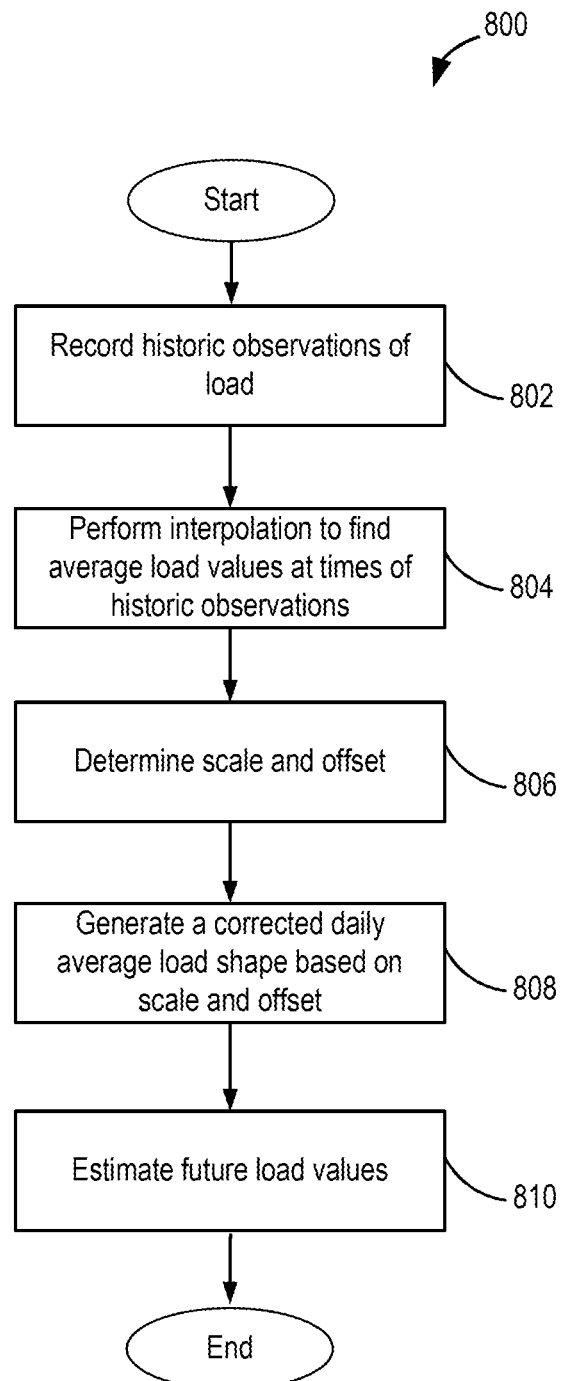
FIG. 8 is a flow diagram of a method of predicting load and/or generation of an electrical system during an upcoming time domain, according to one embodiment of the present disclosure.

FIG. 8 is a flow diagram of a method 800 of predicting load and/or generation of an electrical system during an upcoming time domain. A controller, according to some embodiments of the present disclosure, may have the ability to predict the changing load that may be realized during an upcoming time domain. These load and generation predictions may be used when the cost function is evaluated. To account for and reap a benefit from some types of value streams such as demand charge reduction, an accurate estimate of the upcoming load can be important. An accurate projection of a load during an upcoming time domain enables an EO to make better control decisions to capitalize on value streams such as demand charge reduction.

A method of predicting load, according to one embodiment of the present disclosure, may perform a load prediction considering historic periodic trends or shapes such as a daily trend or shape. The load prediction can execute every time an EO executes an EO process, or it can execute more or less frequently. The load prediction may be executed by performing a regression of a parameterized historic load shape against historic load data (typically less than or equal to 24 hours) in one embodiment. Regression algorithms such as least squares may be used. A compilation of historic trends may be recorded as a historic average (or typical) profile or an average load shape. The historic average profile or average load shape may be a daily (24-hour) historic average profile that represents a typical day. The compilation of historic observations and/or historic average profile may be received from another system, or may be gathered and compiled (or learned) as part of the method of predicting load, as will be explained below with reference to FIG. 8.

Referring to FIG. 8, historic observations of load are recorded 802. For example, the last h hours of historic observations of load may be continuously recorded and stored in memory, each measurement having a corresponding time of day at which time it was measured in an array pair historic_load_observed and historic_load_observed_time_of_day. The last h hours can be any amount of time, and in one embodiment, it is between 3 and 18 hours.

Assume for now a daily average load shape array or vector is in memory named avg_load_shape, each with a corresponding array avg_load_shape_time_of_day of the same length. The avg_load_shape and avg_load_shape_time_of_day represents a historic average profile and/or historic trends. The time domain of avg_load shape_time_of_day is 24 hours, and the time interval of discretization of avg_load_shape_time_of_day could be any value. Between 5 and 120 minutes may be used, depending on the application, in some embodiments. As an example, if the interval of discretization is chosen to be 30 minutes, there will be 48 values comprising avg_load_shape and 48 values comprising avg_load_shape_time_of_day.

An interpolation is performed 804 to find the avg_load_shape values at each of the times in historic_load_observed_time_of_day. Call this new interpolated array avg_load_shape_interpolated. Consider mathematically avg_load_shape_interpolated with a scale and offset defined as: average_load_shape_interpolated_p=avg_load_shape_interpolated*scale+offset. In some embodiments, the interpolation is a linear interpolation. In other embodiments, the interpolation is a nonlinear interpolation.

A scale and offset are determined 806. For example, the method 800 may perform a least squares regression to determine 806 scale and offset that minimize the sum of the squares of the error between average_load_shape_interpolated_p and historic_load_observed resulting in a scale value scale fit and an offset value offset fit. In some embodiments, the determining 806 of scale and offset can utilize weighted least squares techniques that favor more recent observations.

A corrected daily average load shape is generated 808 based on the scale and/or offset. For example a corrected load shape may be generated 808 for a full day as avg_load_shape_fit=avg_load_shape*scale_fit+offset_fit.

The future load values can then be estimated 810, such as by interpolating. A future load value at any time of day in the future time domain can now be estimated by interpolating 810 to that time of day from the pair of arrays avg_load_shape_fit and avg_load_shape_time_of_day.

Define the Control Parameter Set X

Defining the Control Parameter Set X involves defining or otherwise specifying times at which each control parameter is to be applied during a future time domain, and the control law(s) that are to be applied at each time in the future time domain.

An EO, according to certain embodiments of the present disclosure, is configured to define the control parameter set X. While there are many ways to define a control parameter set X, three possible approaches are:
1. a single set of parameters of a control law to be applied during the entire upcoming time domain;
2. a sequence of parameter sets that are each to be applied to a single control law at different contiguous sequential time intervals throughout the upcoming time domain; and
3. a sequence of parameters that specifies different control laws to be applied at different contiguous sequential time intervals throughout the future time domain.

An example of Approach 1 above of a single set of parameters of the control parameter set X (and example values) for a four-parameter control law is shown in Table 2 below.

TABLE 2

| Parameter | Description | Example Value |
|---|---|---|
| $P_{nom}$ | Nominal ESS power (or discharge power if negative) to be applied in the absence of other constraints or rules (such as those related to UB, $UB_0$, or LB below). | −40 W |
| UB | Upper bound on adjusted demand (e.g., an upper setpoint). Not to be exceeded unless the ESS is incapable of discharging at sufficient power. | 100 kW |
| $UB_0$ | Upper bound on electrical system adjusted demand (e.g., an upper setpoint) not to be actively exceeded (e.g., electrical system adjusted demand may exceed this value only with ESS power less than or equal to 0). | 80 kW |
| LB | Lower bound on adjusted net power (e.g., a lower setpoint). Sometimes referred to as "minimum import," or, if 0, "zero export." Adjusted net power will be kept above this value unless the ESS is incapable of charging at sufficient power and generators cannot be throttled sufficiently. | 0 kW |

Approaches 2 and 3 above utilize segmentation of the future time domain.

Figure 9:
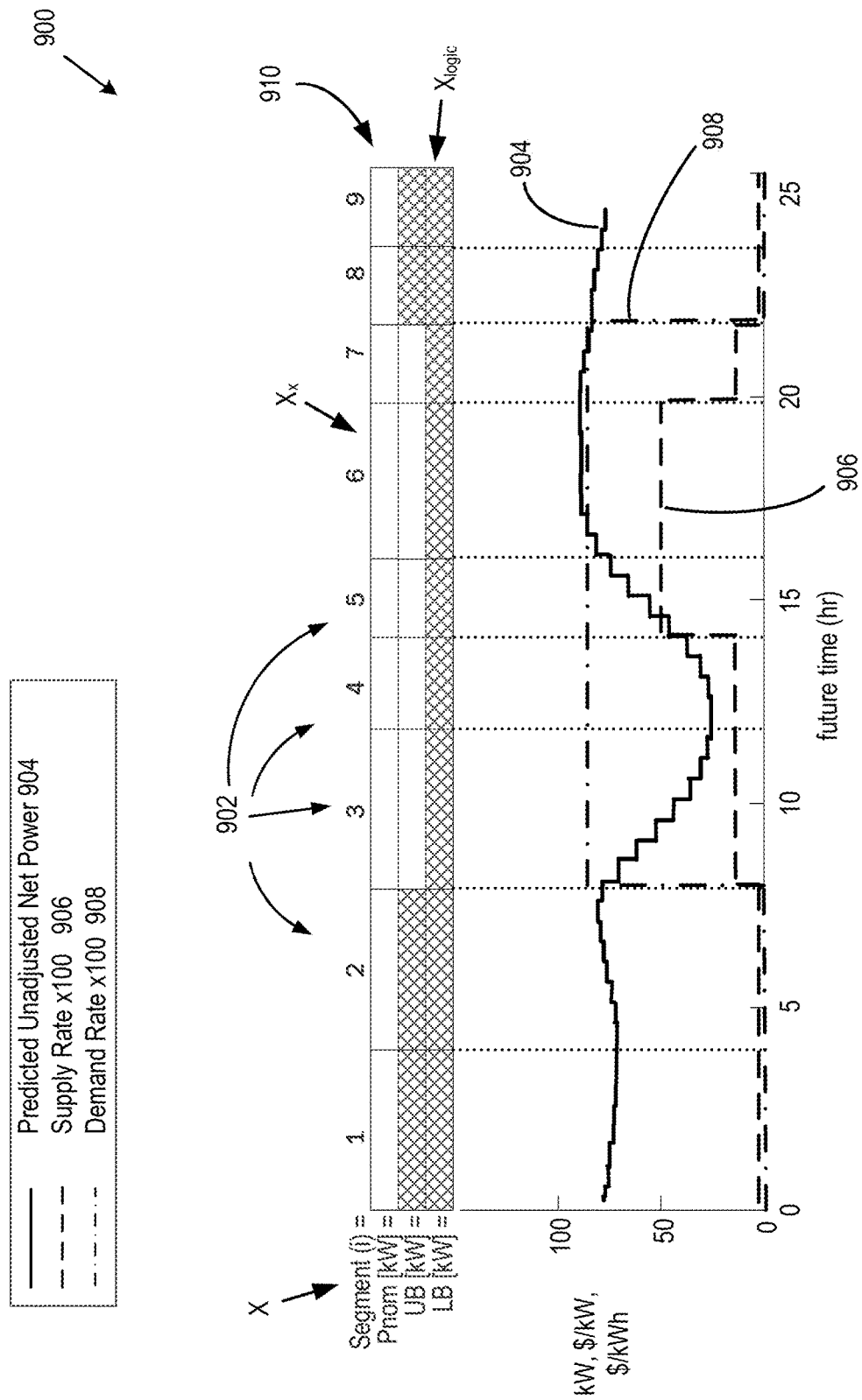
FIG. 9 is a graph illustrating one example of segmenting an upcoming time domain into multiple time segments.

FIG. 9 is a graph 900 illustrating one example of segmenting an upcoming time domain into a plurality of time segments 902. A plot 904 of predicted unadjusted net power (kW) versus future time (e.g., of an upcoming time domain) is provided. A plot 906 of energy supply rate ($/kWh) versus future time is also provided. A plot 908 of a demand rate ($/kW) versus future time is also provided. A 25-hour future time domain is segmented into nine discrete sequential time segments 902 (e.g., i=1, 2, 3, 4, 5, 6, 8, 8, 9). Each segment 902 will be assigned a single set of one or more parameters from the control parameter set X to be applied during that time segment.

Segmentation of the future time domain can be done in many ways. In one embodiment, segmentation is performed such that:
 i. the electric rates (both supply and demand) are constant within each time segment,
 ii. the number of segments is minimized but large enough to provide a different segment for each region of the future time domain that is expected to have significantly different operating behavior or conditions, and
 iii. the segment length does not exceed a prescribed maximum segment length.

In cases where rates are changing very frequently (every hour for example), some minimum time segment length can be specified (every four hours for example) to reduce the number of time segments while still maintaining acceptable computational fidelity. Likewise, a maximum segment length (for example six hours) may also be prescribed to increase computational fidelity.

Smaller numbers of segments are less burdensome on the EO processor computationally, while large numbers of segments provide higher fidelity in the final optimized solution. A desirable segment length of between 0.5 and 6 hours in some embodiments has been found to provide a good balance between these criteria.

The time segments of the upcoming time domain may be defined such that one or more of supply rate cost elements and delivery rate cost elements are constant during each time segment. The time segments of the upcoming time domain may be defined such that one or more of contracted maneuvers, demand response maneuvers, and ancillary service maneuvers are continuous during each time segment.

FIG. 9 also illustrates a representation 910 of an example of control parameter set X that includes multiple sets of parameters. The control parameter set X is for a three-parameter control law, which may be defined similar to the set illustrated above in Table 2, but without $UB_0$. The values for the parameters are not initialized, but the cells of the table X in FIG. 9 represent a parameter for which a value may be associated. In this example, the un-shaded values ($X_x$) are to be determined through an optimization process of the EO and the shaded values ($X_{logic}$) can be determined from logic. An objective of the EO is to fill in the values for each control parameter that minimizes the cost of operating the electrical system of the site during the future time domain. As can be appreciated, different values may for control parameters may result depending on whether the site is participating in providing a portion of a requested net change in power of an aggregation opportunity.

In some instances, it may make sense for an EO (or an EOESC) to operate with a single control parameter (e.g., a single set with a single element in X, such as $P_{nom}$) or with multiple control parameters (a single set of multiple elements in X, such as $P_{nom}$, UB, and LB) to be applied during the entire future time domain. In these two cases, the future time domain would be segmented into only one time segment 902. Correspondingly, the EO would only consider control parameters that are constant over the whole future time domain in this example.

Prepare the Cost Function

An EO, according to certain embodiments of the present disclosure, prepares or otherwise obtains a cost function. As already mentioned, the cost function $f_c(X)$ is a function that considers particular control parameters (e.g., control parameter set X) and returns the scalar net cost of operating the electrical system with X during the future time domain. This scalar net cost of operating the electrical system can be provided to an aggregation engine for optimization of apportionment among multiple sites for generation of a requested net change in power of an aggregation opportunity.

Figure 10:
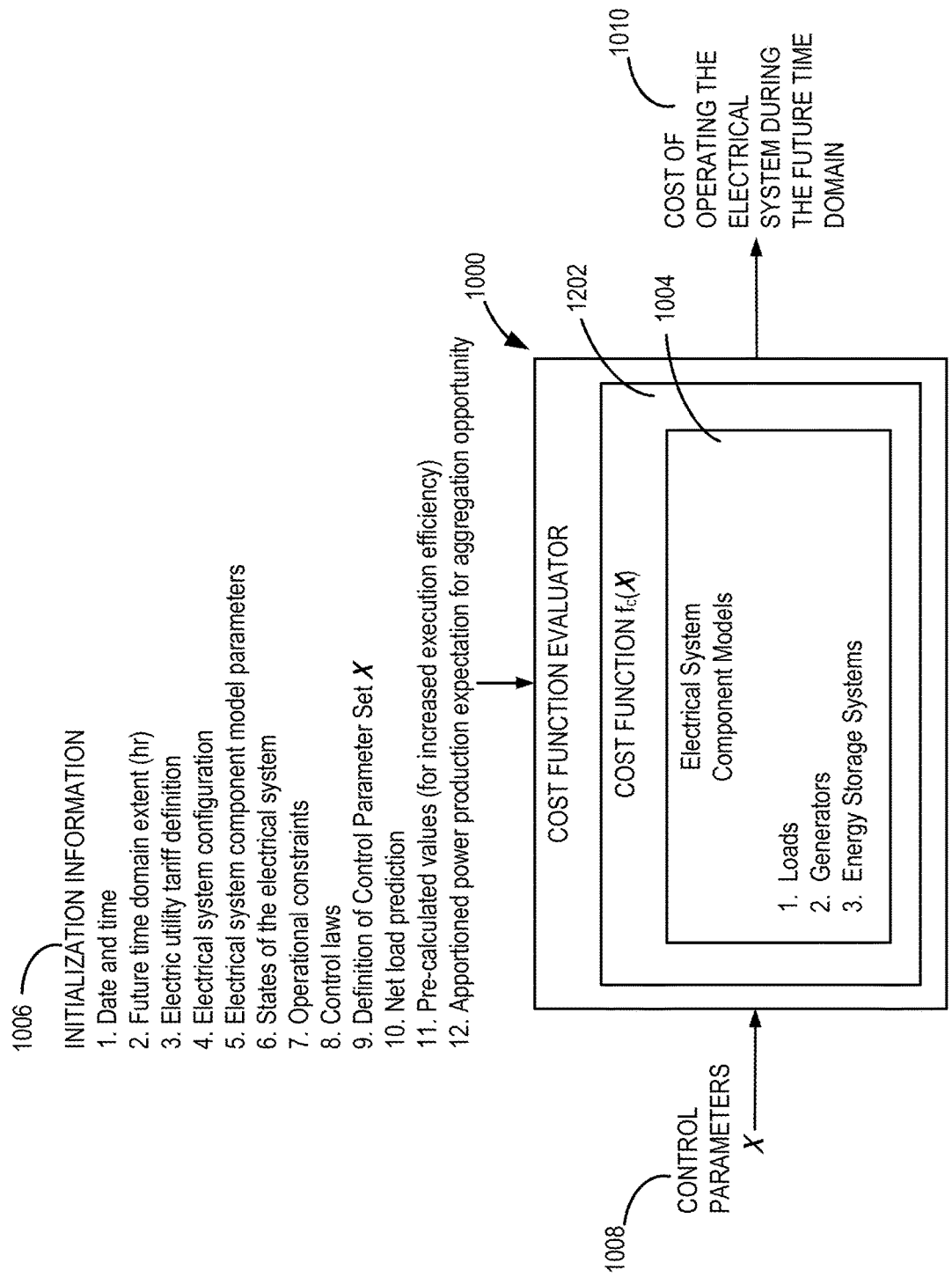
FIG. 10 is a diagrammatic representation of a cost function evaluation module of a DER, according to one embodiment of the present disclosure.

FIG. 10 is a diagrammatic representation of a cost function evaluation module 1000 (or cost function evaluator) that implements a cost function $f_c(X)$ 1002 that includes models 1004 for one or more electrical system components (e.g., loads, generators, ESSs). The cost function evaluation module 1000 may be included in a controller of an electrical system of a site. The cost function $f_c(X)$ 1002 receives as inputs initialization information 1006 and control parameters 1008 (e.g., a control parameter set X). The cost function $f_c(X)$ 1002 provides as an output a scalar value 1010 representing a cost of operating the electrical system during the future time domain.

The scalar value 1010 representing the cost, which is the output of the cost function $f_c(X)$ 1002, can have a variety of different units in different examples. For example, it can have units of any currency. Alternately, the cost can have units of anything with an associated cost or value such as electrical energy or energy credits. The cost can also be an absolute cost, cost per future time domain, or a cost per unit time such as cost per day. In one embodiment, the units of cost are U.S. dollars per day.

Prior to using the cost function, several elements of it can be initialized. The initialization information that is provided, according to one embodiment, can include:

Date and time, which can be used for determining the applicable electric utility rates.

Future time domain extent, which can be used for defining the time extent of the cost calculation.

Electric utility tariff definition, which is a set of parameters that can define how the electrical utility calculates charges.

Electrical system configuration, which includes configuration elements that specify configuration (e.g., size, capacity, tolerances, thresholds, etc.) of the components of the electrical system. An example for a battery energy storage system is the energy capacity of the energy storage device.

Electrical system component model parameters, which include model parameters that can work in conjunction with analytic or numerical models to describe the physical and electrical behavior and relationships governing the operation of electrical components in the electrical system. For battery energy storage systems, a "battery model" is a component, and these parameters specify the properties of the battery such as its Ohmic efficiency, Coulombic efficiency, and degradation rate as a function of its usage.

States of the electrical system, which includes information that specifies the state of components in the electrical system that are important to the economic optimization. For battery energy storage systems, one example state is the SoC of the energy storage device.

Operational constraints, which can specify any additional operational constraints on the electrical system such as minimum import power. In some embodiments, the operational constraints may also include an indication of a portion of a total requested net change in power of an aggregation opportunity that the site is to provide in a maneuver of an aggregation opportunity in response to an aggregation request.

Control law(s), which include the control law(s) associated with the definition of X.

Definition of control parameter set X, which can indicate the times at which each control parameter is to be applied during a future time domain. The definition of the control parameter set X may indicate which control law(s) are to be applied at each time in the future time domain.

Net load (or power) prediction, which can provide the predicted unadjusted net load (or predicted unadjusted net power) during the future time domain.

Pre-calculated values. While segments are defined, many values may be calculated that the cost function can use to increase execution efficiency (help it "evaluate" faster). Pre-calculation of these values may be a desirable aspect of preparing the cost function $f_c(X)$ 1002 to enable the cost function to be evaluated more efficiently (e.g., faster, with fewer resources).

Apportioned power production expectation for an aggregation opportunity. The apportioned power production may include a committed apportionment value, or other indication of a portion of a total requested net change in power of an aggregation opportunity that the site is to provide in a maneuver of an aggregation opportunity. In some embodiments, the apportioned power production expectation may be determined according to an engagement rule set.

Preparing the cost function $f_c(X)$ 1002 can increase execution efficiency of the EO because values that would otherwise be re-calculated each time the cost function is evaluated (possibly thousands of times per EO iteration) are pre-calculated a single time.

Figure 11:
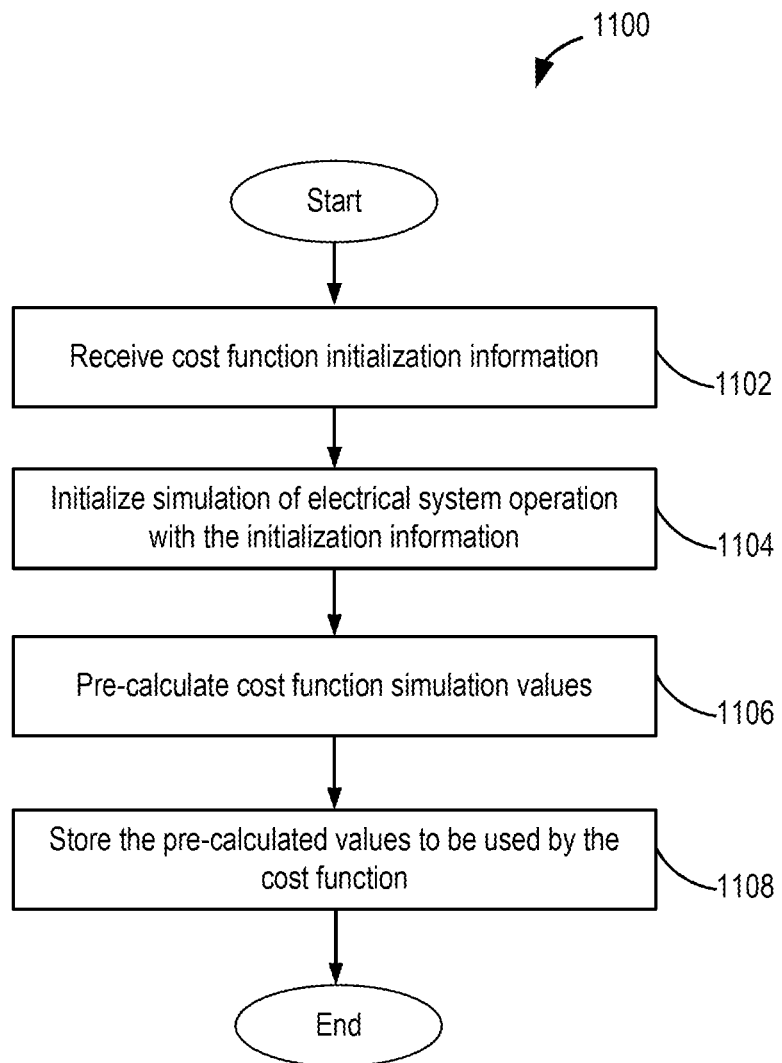
FIG. 11 is a flow diagram of a method of preparing a cost function $f_c(X)$, according to one embodiment of the present disclosure.

FIG. 11 is a flow diagram of a process 1100 of preparing a cost function $f_c(X)$, according to one embodiment of the present disclosure. Cost function initialization information may be received 1102. A simulation of electrical system operation is initialized 1104 with the received 1102 cost function initialization information. Cost function values may be pre-calculated 1106. The pre-calculated values may be stored 1108 for later use during evaluation of the cost function.

In certain embodiments, defining a control parameter set X and preparing a cost function $f_c(X)$ may be accomplished in parallel.

Evaluation of the Cost Function

During execution of an EO, according to some embodiments of the present disclosure, the cost function is evaluated. During evaluation of the cost function, operation of the electrical system with the control parameter set X is simulated. The simulation may be an aspect of evaluating the cost function. Stated otherwise, one part of evaluating the cost function for a given control parameter set X may be simulating operation of the electrical system with that given control parameter set X. In the simulation, the previously predicted load and generation are applied. The simulation takes place on the future time domain. As time advances through the future time domain in the simulation, costs and benefits (as negative costs) can be accumulated. What is finally returned by the simulation is a representation of how the electrical system state may evolve during the future time domain with control X, and what costs may be incurred during that time.

In some embodiments, the cost function, when evaluated, returns the cost of operating the electrical system with some specific control parameter set X. As can be appreciated, the cost of operating an electrical system may be very different, depending on X. So evaluation of the cost function includes a simulated operation of the electrical system with X first. The result of the simulation can be used to estimate the cost associated with that scenario (e.g., the control parameter set X).

As noted previously, some of the costs considered by the cost function in one embodiment are:
1. Electricity supply charges (both flat rates and ToU rates)
2. Electricity demand charges
3. Battery degradation cost
4. Reduction of energy stored in the energy storage system
5. Incentive maneuver benefits (as a negative number)

Electricity supply and demand charges have already been described. For monthly demand charges, the charge may be calculated as an equivalent daily charge by dividing the charge by approximately 30 days, or by dividing by some other number of days, depending on how many days are remaining in the billing cycle. Battery degradation cost is described in a later section. Reduction in energy stored in an ESS accounts for the difference in value of the storage energy at the beginning of the future time domain compared to the end. Incentive maneuver benefits such as demand response can be calculated as the benefit on a per day basis, but as a negative number. The incentive maneuver benefits, in some embodiments, may include a portion of an upshot of an aggregation opportunity. The portion of the upshot may be a portion that is proportional to the site change in power provided by the site compared to the total requested net change in power of the aggregation opportunity.

During the cost function's electrical system simulation, several variables can be tracked and stored in memory. These include control variables, electrical power consumed by or supplied from various electrical systems, and the states of charge of any energy storage systems. Other variables can also be tracked and stored to memory. Any of the variables stored to memory can be output by the cost function.

Figure 12:
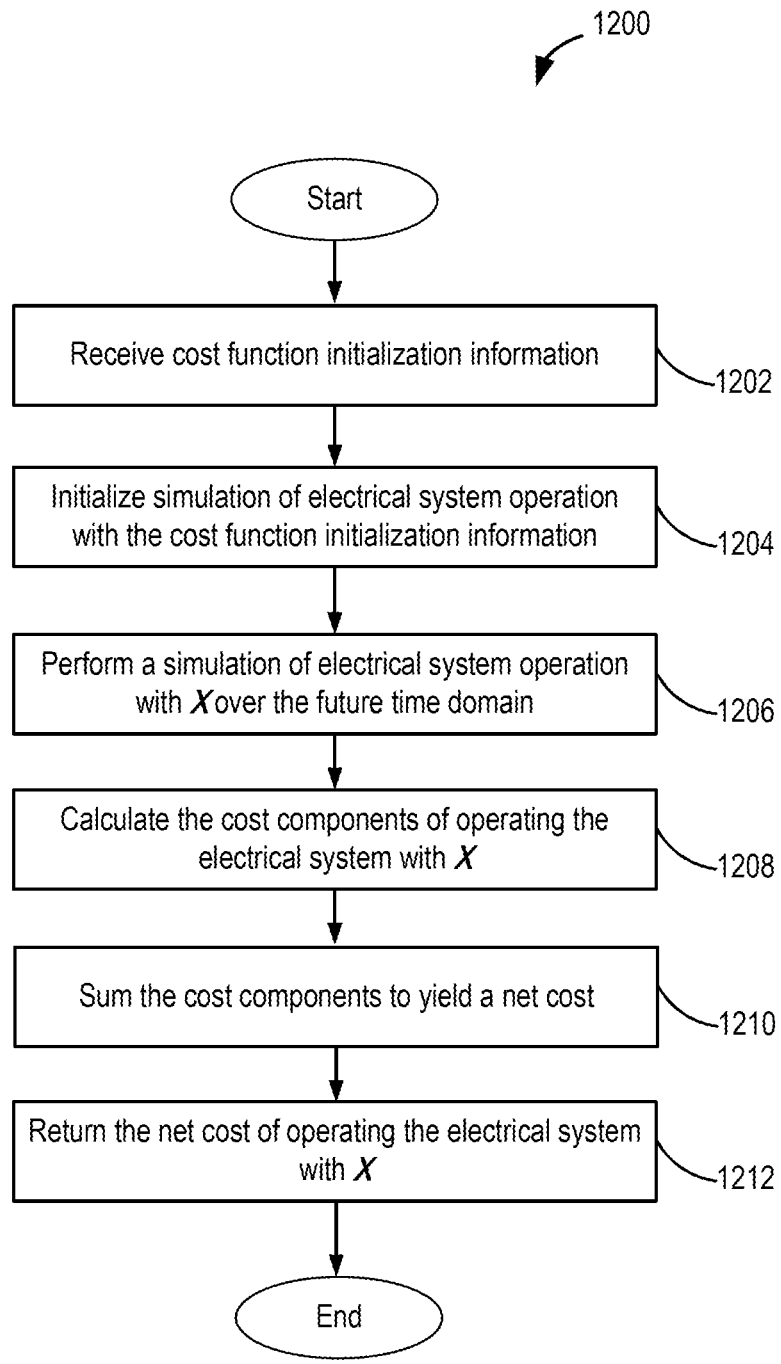
FIG. 12 is a flow diagram of a method of evaluating a cost function that is received from an external source or otherwise unprepared, according to one embodiment of the present disclosure.

FIG. 12 is a flow diagram of a method 1200 of evaluating a cost function that is received from an external source or otherwise unprepared, according to one embodiment of the present disclosure. Cost function initialization information may be received 1202. A simulation of electrical system operation is initialized 1204 with the received 1202 cost function initialization information. The simulation of the electrical system operation is performed 1206 with X over the future time domain. A calculation 1208 of the cost components of operating the electrical system with X is performed. The cost components are summed 1210 to yield a net cost of operating the electrical system with X. The net cost of operating the electrical system with X is returned 1212 or otherwise output.

Figure 13:
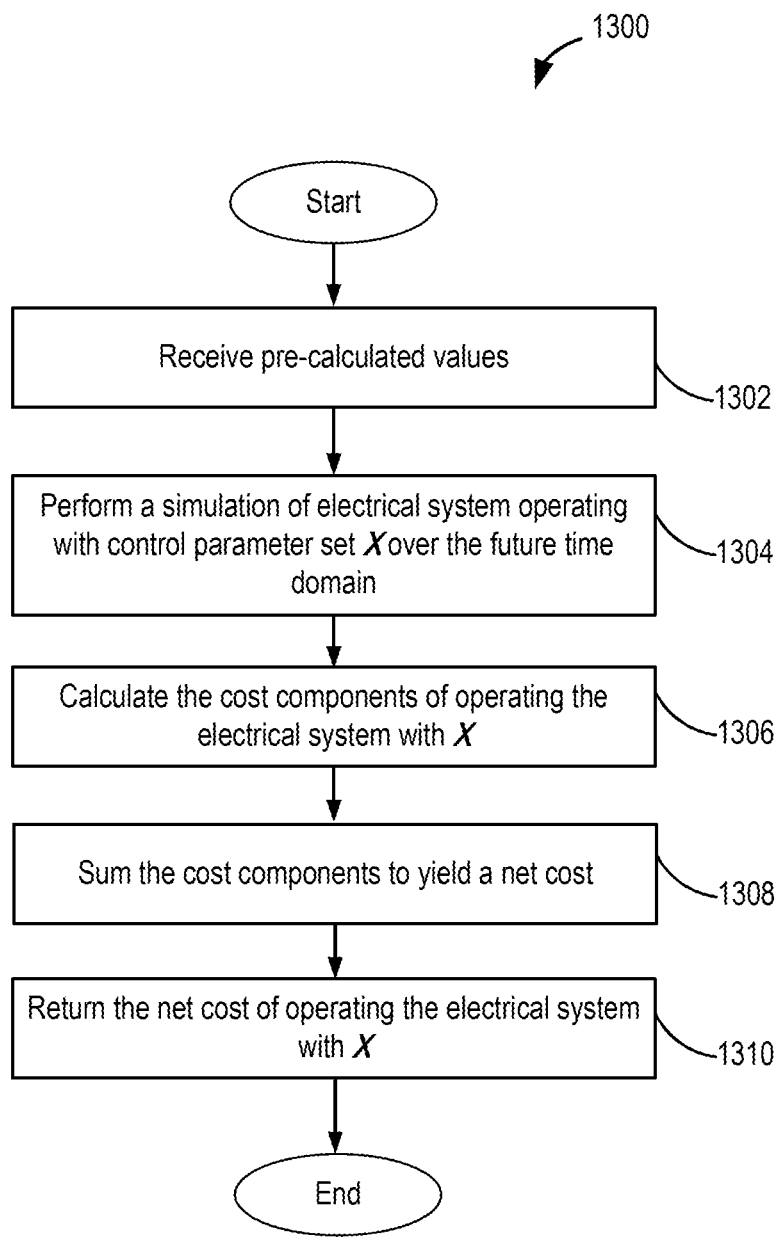
FIG. 13 is a flow diagram of a method of evaluating a prepared cost function, according to one embodiment of the present disclosure.

FIG. 13 is a flow diagram of a method 1300 of evaluating a prepared cost function, according to one embodiment of the present disclosure. The cost function may be prepared according to the method 100 of FIG. 11. Pre-calculated values can be received 1302 as inputs to the method 1300. The values may be pre-calculated during an operation to prepare the cost function, such as the method 1100 of FIG. 11. A simulation is performed 1304 of the electrical system operating with a control parameter set X over the future time domain. A calculation 1306 of the cost components of operating the electrical system with X is performed. The cost components are summed 1308 to yield a net cost of operating the electrical system with X. The net cost of operating the electrical system with X is returned 1310 or otherwise output.

In some embodiments, rather than returning the net cost of operating the electrical system with X during the future time domain, what is returned is the net cost of operating the electrical system with X as a cost per unit time (such as an operating cost in dollars per day). Returning a per day cost can provide better normalization between the different cost elements that comprise the cost function.

The cost per day for example can be determined by multiplying the cost of operating during the future time domain by 24 hours and dividing by the length (in hours) of the future time domain.

Execute Continuous Minimization of the Cost Function

With a prediction of load and generation made, the control parameter set X defined, and the cost function obtained and initialized and/or prepared, minimization of cost can be performed.

Minimization of the cost function may be performed by an optimization process and/or an optimization module that is based on an optimization algorithm. Minimization (or optimization) may include evaluating the cost function iteratively with different sets of values for the control parameter set X (e.g., trying different permutations from an initial value) until a minimum cost (e.g., a minimum value of the cost function) is determined. In other words, the algorithm may iteratively update or otherwise change values for the control parameter set X until the cost function value (e.g. result) converges at a minimum (e.g., within a prescribed tolerance, or satisfying termination criteria). The iterative updating or changing of the values may include perturbing or varying one or more values based on prior one or more values.

Termination criteria (e.g., a prescribed tolerance, a delta from a prior value, a prescribed number of iterations) may aid in determining when convergence at a minimum is achieved and stopping the iterations in a finite and reasonable amount of time. The number of iterations that may be performed to determine a minimum could vary from one optimization cycle to a next optimization cycle. The set of values of the control parameter set X that results in the cost function returning the lowest value may be determined to be the optimal control parameter set $X_{opt}$.

In one embodiment, a numerical or computational generalized constrained nonlinear continuous optimization (or minimization) algorithm is called (e.g., executed or invoked) by a computing device.

Figure 14:
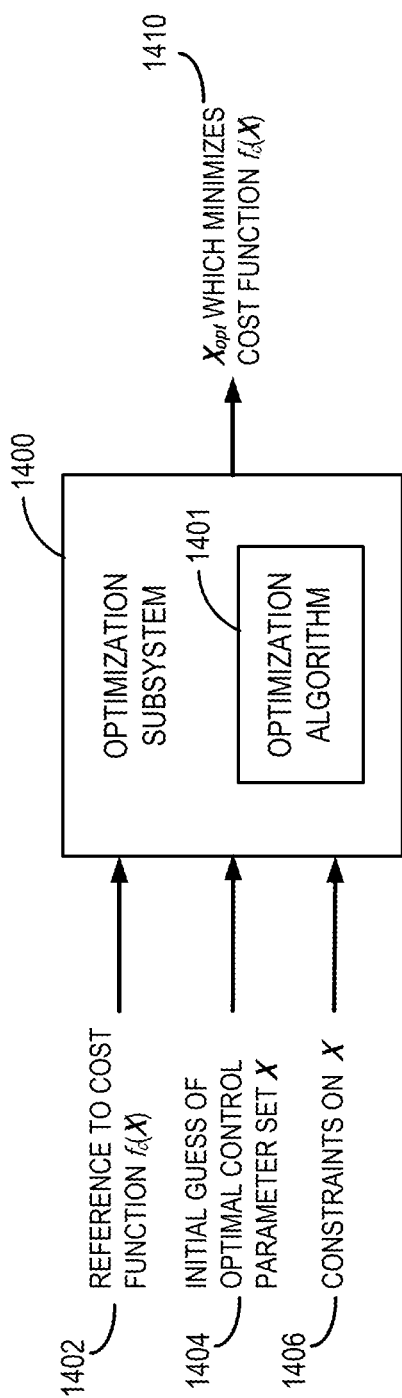
FIG. 14 is a diagrammatic representation of an optimizer that utilizes an optimization algorithm to determine an optimal control parameter set.

FIG. 14 is a diagrammatic representation of an optimization subsystem 1400 that utilizes or otherwise implements an optimization algorithm 1401 to determine an optimal control parameter set $X_{opt}$ 1410, which minimizes the cost function $f_c(X)$. In the embodiment of FIG. 14, the optimization algorithm 1401 utilized by the optimization subsystem 1400 may be a generalized constrained multivariable continuous optimization (or minimization) algorithm. A reference 1402 to the cost function $f_c(X)$ is provided to the optimization subsystem 1400.

The optimization algorithm can be implemented in software, hardware, firmware, or any combination of these. The optimization algorithm may be implemented based on any approach from descriptions in literature, pre-written code, or developed from first principles. The optimization algorithm implementation can also be tailored to the specific problem of electrical system economic optimization, as appropriate in some embodiments.

Some algorithms for generalized constrained multivariable continuous optimization include:
 Trust-region reflective
 Active set
 SQP
 Interior Point
 Covariance Matrix Adaption Evolution Strategy (CMAES)
 Bound Optimization by Quadratic Approximation (BOBYQA)
 Constrained Optimization by Linear Approximation (COBYLA)

The optimization algorithm may also be a hybrid of more than one optimization algorithm. For example, the optimization algorithm may use CMAES to find a rough solution, then Interior Point to converge tightly to a minimum cost. Such hybrid methods may produce robust convergence to an optimum solution in less time than single-algorithm methods.

Regardless of the algorithm chosen, it may be useful to make an initial guess of the control parameter set X 1404. This initial guess enables an iterative algorithm such as those listed above to more quickly find a minimum. In one embodiment, the initial guess is derived from the previous EO execution results.

Any constraints 1406 on X can also be defined or otherwise provided. Example constraints include any minimum or maximum control parameters for the electrical system.

An Example EO Result

Figure 15:
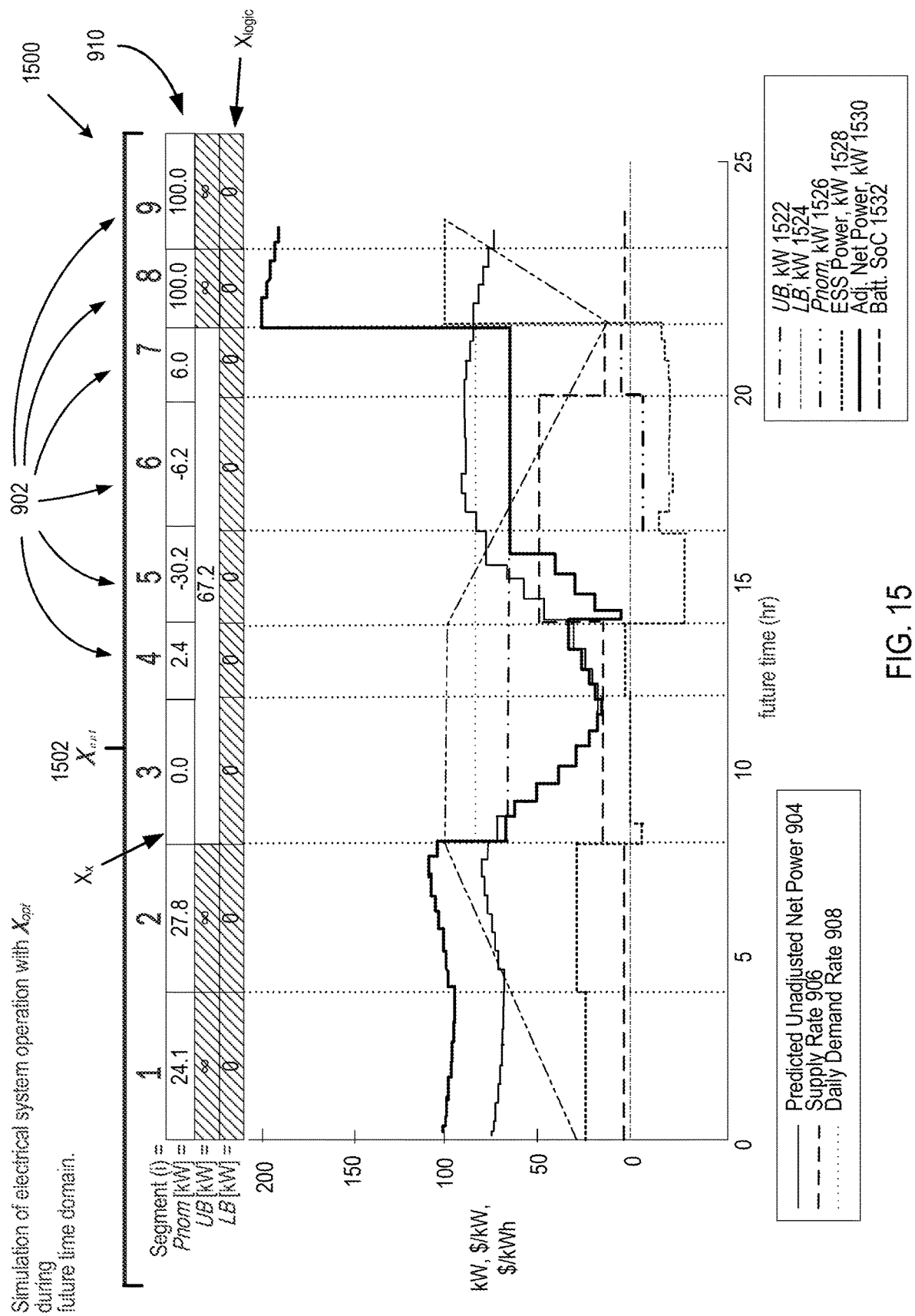
FIG. 15 is a graph illustrating an example result from an economic optimizer (EO) for a battery ESS.

FIG. 15 is a graph 1500 illustrating an example result from an EO for a small battery energy storage system, using the same example upcoming time domain, segmentation of the upcoming time domain into a plurality of segments 902, predicted unadjusted net power plot 904, supply rate plot 906, daily demand rate plot 908, and representation 910 of the control parameter set X as in FIG. 9.

The graph 1500 also includes plots for UB (kW) 1522, LB (kW) 1524, Pnom (kW) 1526, ESS power (kW) 1528, adjusted net power (kW) 1530, and battery SoC 1532.

In FIG. 15, as in FIG. 9, the future time domain is split into nine segments 902, and nine optimal sets of parameters 1502 were determined (e.g., a control parameter set $X_{opt}$ 910 that includes values for nine optimal sets of parameters, one optimal set of parameters for each segment 902). Daily demand charges are applicable and a net export of energy (e.g., to the grid) is not allowed in the illustrated example. An objective of the controller is to find an optimal sequence of electrical system control parameters.

The control parameter set X in this case is defined to include three parameters: Pnom, UB, and LB as described above. In this example, during execution of the optimization algorithm, the optimal values in the unshaded boxes ($X_x$) of the representation 910 of X are determined, $P_{nom}$ 1502 which is the battery inverter power (where charge values are positive and generation/discharge values are negative) during each time segment 902, and UB 1502 which is the upper limit on demand during each time segment 902). The date and time to apply each specific control parameter is part of the definition of X. The shaded values ($X_{logic}$, which includes LB and some UB values) in the representation 910 of X are determined by logic. For example, when no demand charge is applicable, the UB can be set to infinity. And since net export of power is not permitted in this example, LB can be set to zero. There is no need to determine optimal values for these shaded parameters when executing the optimization because their values are dictated by constraints and logic.

Applying the optimal values of X, the expected cost per day of operating the electrical system in the example of FIG. 15 is $209.42 per day. This total cost is the sum of the ToU supply cost ($248.52), the daily demand cost ($61.52), the cost of battery energy change ($−115.93), and the cost of battery degradation ($15.32).

As can be appreciated, in other embodiments, the EO may determine a set of control values for a set of control variables, instead of a control parameter set X. The EO may determine the set of control values to effectuate a change to the electrical system toward meeting a controller objective for economical optimization of the electrical system. The EO may then output the control values or the set of control variables for delivery directly to the electrical system. In such embodiment, the EO may be a primary component of the controller and the controller may not include a dynamic manager (e.g., a high speed controller).

Dynamic Manager or High Speed Controller (HSC)

Greater detail will now be provided about some elements of a dynamic manager, or an HSC, according to some embodiments of the present disclosure. Because the control parameter set X is passed to the high speed controller, the definition of the control parameter set X may be tightly linked to the HSC's control law. The interaction between an example HSC and control parameter set X is described below.

Storing a Control Plan

As already mentioned, the control parameter set X can contain multiple sets of parameters and dates and times that those sets of parameters are to be applied by the HSC. One embodiment of the present disclosure takes this approach. Multiple sets of parameters are included in X, each set of parameters with a date and time the set is intended to be applied to the electrical system being controlled. Furthermore, each controllable system within the electrical system can have a separate set of controls and date and time on which the set of controls is intended to be applied. The HSC commits the full control parameter set X to memory and applies each set of parameters therein to generate control variables to deliver to, and potentially effectuate a change to, the electrical system at the specified times. Stated differently, the HSC stores and schedules a sequence of optimal sets of parameters, each to be applied at an appropriate time. In other words, the HSC stores a control plan. This first task of storing and scheduling a sequence of optimal control parameter sets (e.g., a control plan) by the high speed controller provides distinct advantages over other control architectures.

For example, storing of a control plan by the HSC reduces the frequency that the computationally intensive (EO) portion of the controller is executed. This is because even if the first sequential time interval expires before the EO executes again, the HSC will switch to the next sequential control set at the appropriate time. In other words, the EO does not have to execute again before the first sequential time interval expires since multiple optimal control sets can be queued up in sequence.

As another example, storing of a control plan by the HSC enables operation (e.g., control of the electrical system) for significant periods of time without additional EO output. This may be important for example if the EO is executing in a remote processor such as a cloud computing environment and the HSC is running on a processor local to a building. If communication is lost for a period of time less than the future time domain, the HSC can continue to use the already-calculated optimal control parameter sets at the appropriate times. Although operation in such a manner during outage may not be optimal (because fresh EO executions are desirable as they take into account the latest data), this approach may be favored compared with use of a single invariant control set or shutting down.

Application of Presently Applicable Control Parameters

A second task of the HSC, according to one embodiment, is to control some or all of the electrical system components within the electrical system based on the presently applicable control parameter set. In other words, the HSC applies each set of parameters of a control parameter set X in conjunction with a control law to generate control variables to deliver to, and potentially effectuate a change to, the electrical system at appropriate times.

For an electrical system with a controllable battery ESS, this second task of the HSC may utilize four parameters for each time segment. Each of the four parameters may be defined as in Table 2 above. In one embodiment, these parameters are used by the HSC to control the battery inverter to charge or discharge the energy storage device. For a battery ESS, the typical rate at which the process variables are read and used by the HSC and new control variables are generated may be from 10 times per second to once per 15 minutes. The control variables (or the set of values for the set of control variables) for a given corresponding time segment may be provided to the electrical system at (e.g., before or during) the given corresponding time segment of the upcoming time domain.

As can be appreciated, in other embodiments, an entire control plan (e.g., a control parameter set X comprising a set of sets) may be processed by the HSC to determine a plurality of sets of control variables, each set of control variables for a corresponding time segment. The plurality of sets of control variables may be provided at once (e.g., before the upcoming time domain or no later than during a first time segment of the upcoming time domain). Or, each set of the plurality of sets may be provided individually to the electrical system at (e.g., before or during) the given corresponding time segment.

Another aspect of the HSC, according to one embodiment, is that the HSC can also be used to curtail a generator (such as a photovoltaic generator) if necessary to maintain the lower bound on electrical system power consumption specified by LB.

Figure 16:
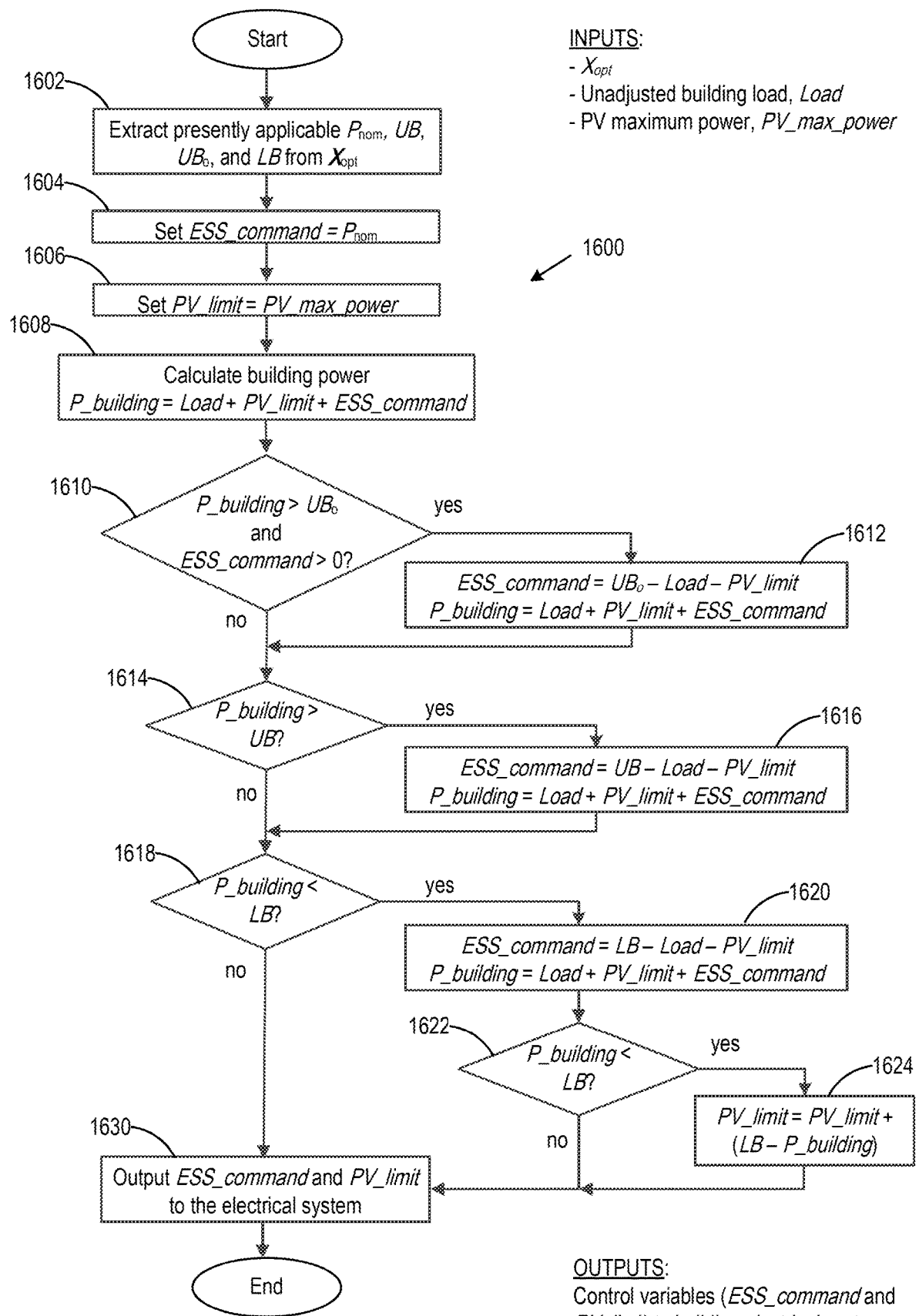
FIG. 16 is a method of a dynamic manager, according to one embodiment of the present disclosure.

FIG. 16 is a method 1600 of a dynamic manager, or HSC, according to one embodiment of the present disclosure, to use a set of optimal control parameters $X_{opt}$ in conjunction with a control law to determine values of a set of control variables to command the electrical system. A set of optimal control parameters ($X_{opt}$), a measurement of unadjusted building load (Load), and PV maximum power (PV_max_power) are received or otherwise available as inputs to the method 1600. The dynamic manager processes $X_{opt}$ to determine a set of control values to effectuate a change to the electrical system toward meeting an objective for economical optimization of the electrical system during an upcoming time domain. The output control variables are the ESS power command (ESS_command) and the photovoltaic limit (PV_limit), which are output to the building electrical system to command an ESS and a photovoltaic subsystem.

The presently applicable $P_{nom}$, UB, $UB_0$, and LB are extracted 1602 from) $X_{opt}$. The ESS power command, ESS_command, is set 1604 equal to $P_{nom}$. The photovoltaic limit, PV_limit, is set 1606 equal to PV maximum power, PV_max_power. The building power, P_building, is calculated 1608 as a summation of the unadjusted building load, the photovoltaic limit, and the ESS power command (P_building=Load+PV_limit+ESS_command).

A determination 1610 is made whether the building power is greater than $UB_0$ (P_building>$UB_0$) and whether the ESS_command is greater than zero (ESS_command>0). If yes, then variables are set 1612 as:

ESS_command=$UB_0$−Load−PV_limit

P_building=Load+PV_limit+ESS_command.

A determination 1614 is made whether building power is greater than UB (P_building>UB). If yes, then variables are set 1616 as:

ESS_command=UB−Load−PV_limit

P_building=Load+PV_limit+ESS_command.

A determination 1618 is made whether building power is less than LB (P_building<LB). If yes, then variables are set 1620 as:

ESS_command=LB−Load−PV_limit

P_building=Load+PV_limit+ESS_command, and another determination 1622 is made whether building power remains less than LB (P_building<LB). If yes, then the photovoltaic limit PV_limit is set 1624 as:

PV_limit+(LB−P_building).

Then the control variables ESS_command and PV_limit are output 1630 to the electrical system.

An Example HSC Result

Figure 17:
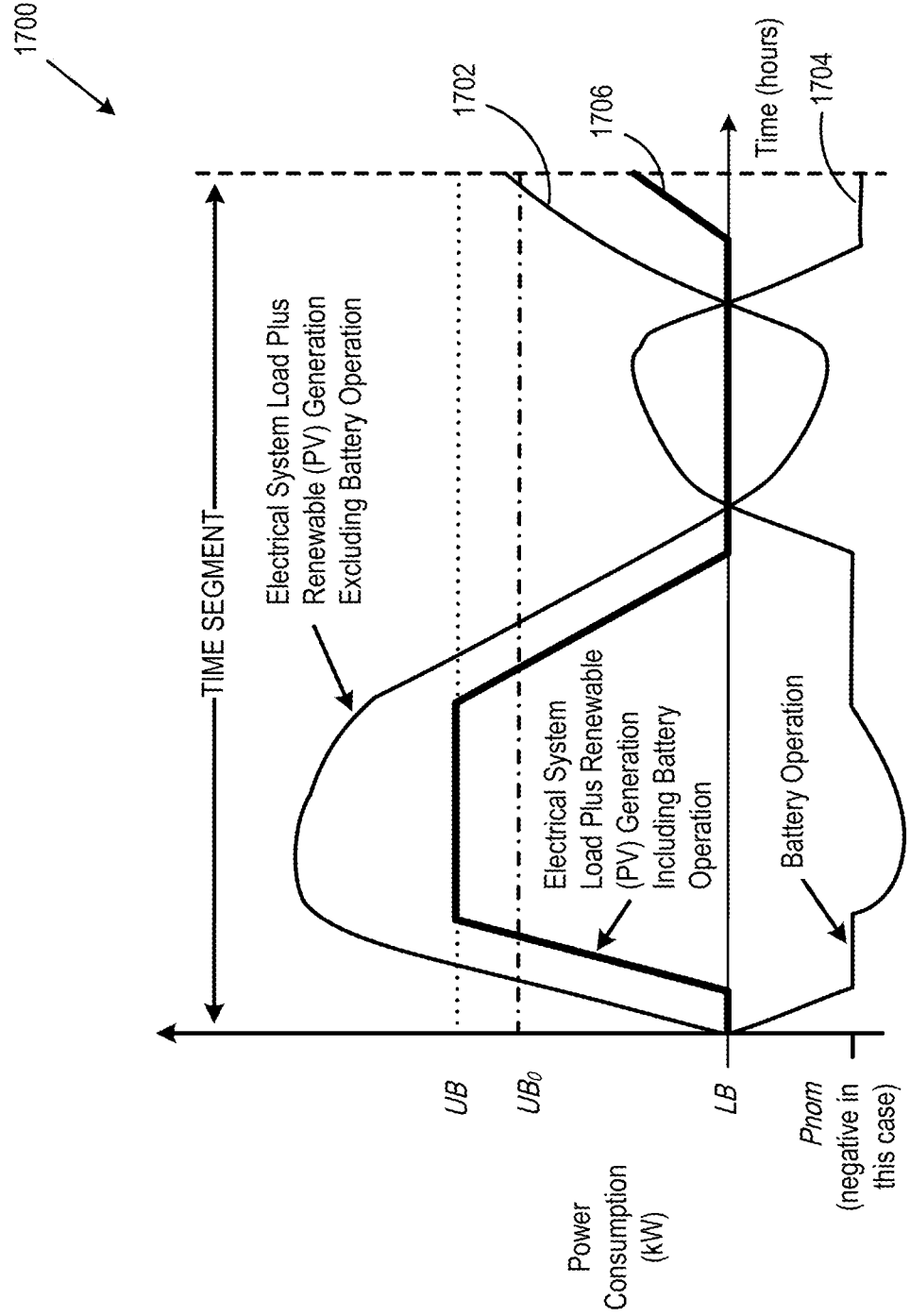
FIG. 17 is a graph showing plots for an example of application of a particular four-parameter control set during a time segment.

FIG. 17 is a graph 1700 showing plots for an example of application of a particular four-parameter control set during a time segment. The graph 1700 shows a value for each of UB, $UB_0$, LB, and $P_{nom}$, which are defined above in Table 2. A vertical axis is the power consumption (or rate of energy consumed), with negative values being generative. A first plot 1702 provides unadjusted values of power consumption (kW) for the electrical system load plus renewable (photovoltaic) generation and excluding battery operation, over the time segment. In other words, the first plot 1702 shows operation of the electrical system without benefit of a controllable ESS (battery) that is controlled by a controller, according to the present disclosure. A second plot 1704 provides values of power consumption (kW) for battery operation over the time segment. The second plot 1704 may reflect operation of an ESS as commanded by the controller. In other words, the second plot 1704 is the control variable for the ESS. The battery operation value may be the value of the control variable to be provided by the HSC to command operation of the ESS. A third plot 1706 provides values of power consumption (kW) for the electrical system load plus renewable (photovoltaic) generation and including battery operation, over the time segment. The third plot 1706 illustrates how the controlled ESS (or battery) affects the power consumption of the electrical system from the grid. Specifically, the battery in this example is controlled (e.g., by the battery operation value) to discharge to reduce the load of the electrical system on the grid and limit peak demand to the UB value when desired. Furthermore, this example shows LB being enforced by commanding the ESS to charge by an amount that limits the adjusted net power to be no less than LB when necessary. Furthermore, this example shows that the nominal ESS power (Pnom) is commanded to the extent possible while still meeting the requirements of UB, $UB_0$, and LB.

In other embodiments, the control parameter set X may have fewer or more parameters than the four described for the example embodiment above. For example, the control parameter set X may be comprised of only three parameters: Pnom, UB, and LB. Alternately, the control parameter set X may be comprised of only two parameters: Pnom and UB. Alternately, the control parameter set X may include only of UB or only of Pnom. Or, it may include any other combination of four or fewer parameters from the above list.

Battery Models

In a battery ESS, battery cost can be a significant fraction of the overall system cost of a site and in many instances can be greater than 60% of the cost of the system (site). The cost of the battery per year is roughly proportional to the initial cost of the battery and inversely proportional to the lifetime of the battery. Also, any estimated costs of system downtime during replacement of a spent battery may be taken into account. A battery's condition, lifetime, and/or state of health (SoH) may be modeled and/or determined by its degradation rate (or rate of reduction of capacity and its capacity at end of life). A battery's degradation rate can be dependent upon many factors, including time, SoC, discharge or charge rate, energy throughput, and temperature of the battery. The degradation rate may consider capacity of the battery (or loss thereof). Other ways that a battery's condition, lifetime, and/or SoH may be evaluated may be based on a maximum discharge current of the battery or the series resistance of the battery.

Described herein are battery models based on battery degradation as a function of battery capacity as compared to initial capacity or capacity at the beginning of life of the battery. Stated otherwise, the disclosed battery models consider battery condition or state of health according to the battery capacity lost from the capacity at the beginning of life of the battery. As can be appreciated, other battery models may model battery condition according to another way, such as maximum discharge current of the battery, the series resistance of the battery, or the like.

In one embodiment, the battery degradation and its associated cost is included as a cost element in the cost function. By including battery degradation cost in the cost function, as the EO executes to find the minimum cost, the EO can effectively consider the contribution of battery degradation cost for each possible control parameter set X. In other words, the EO can take into account a battery degradation cost when determining (e.g., from a continuum of infinite control possibilities) an optimal control parameter set $X_{opt}$. To accomplish this, a parameterized model of battery performance, especially its degradation rate, can be developed and used in the cost function during the simulation of potential control solutions (e.g., sets of control parameters X). The battery parameters (or constants) for any battery type can be determined that provide a closest fit (or sufficiently close fit within a prescribed tolerance) between the model and the actual battery performance or degradation. Once the parameters are determined, the cost function can be initialized with configuration information containing those parameters so that it is able to use the model in its control simulation in some implementations.

In one embodiment, battery degradation is written in the form of a time or SoC derivative that can be integrated numerically as part of the cost function control simulation to yield battery degradation during the future time domain. In one embodiment, this degradation derivative can be comprised of two components: a wear component (or throughput component) and an aging component. The components can be numerically integrated vs. time using an estimate of the battery SoC at each time step in one embodiment.

Figure 18:
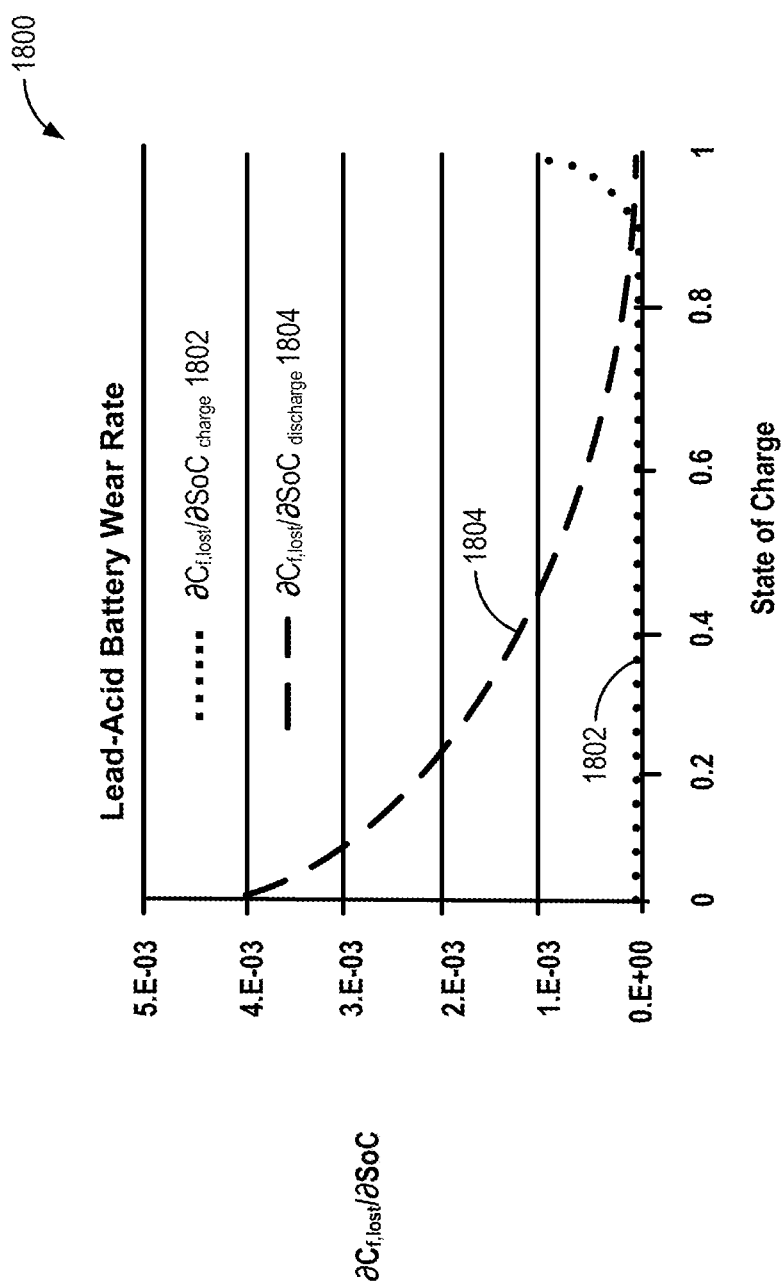
FIG. 18 is a graph providing a plot of the wear rate vs. state of charge for a specific battery degradation model, according to one embodiment of the present disclosure.
Figure 19:
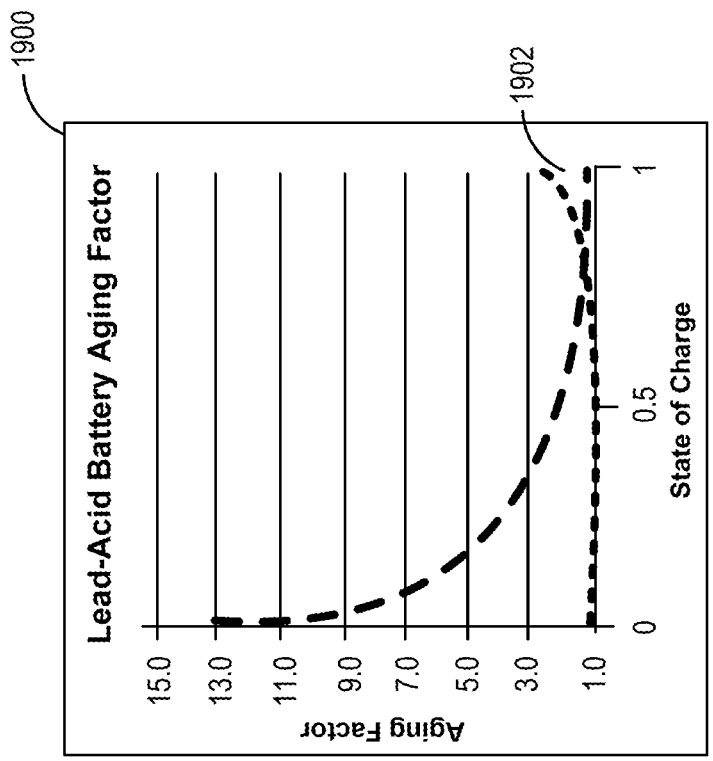
FIG. 19 is a graph providing a plot showing a relationship between state of charge and aging rate (or an aging factor) for a specific battery degradation model, according to one embodiment of the present disclosure.

Examples of components of a battery degradation model, according to one embodiment, that meet these criteria are illustrated by FIGS. 18 and 19. FIG. 18 shows the relationship of wear rate versus SoC for a lead acid battery, based on a battery degradation model that includes wear. FIG. 19 shows a relationship between SoC and aging rate (or aging factor) for a lead acid battery, based on a battery model that includes aging. Battery models that combine both wear and aging can then be fit to match a specific battery's cycle life similar to FIG. 20.

Formulating the battery degradation model as a time or SoC derivative is also beneficial because the model can be used to calculate battery degradation for any arbitrary battery operation profile. (A battery operation profile is a battery's SoC vs. time.) Calculating battery degradation is useful in simulation of the performance (both physical and economic) of a battery ESS. After a simulation produces a battery operation profile, the derivative-based degradation model can be integrated numerically over that profile to produce an accurate estimate of the battery degradation in one embodiment.

Other common degradation or "lifetime" models only provide degradation based on the number of cycles in the profile. With those models, the definition of a "cycle" is problematic, inconsistent, and difficult to use computationally for an arbitrary battery operation profile.

Other embodiments of wear and aging models, and their combinations, can be used in addition to those shown and described herein. For those other models, if the models are expressible as derivatives (and/or partial derivatives) with respect to time or with respect to battery SoC, they will also be afforded the advantages already mentioned and will be readily usable as a cost element in a cost function of an EO.

The graphs of FIGS. 18 and 19 illustrate different components of a battery degradation model, according to one embodiment of the present disclosure. The battery degradation model of the illustrated example may model a lead-acid battery and may include a wear component and an aging component. The wear component may include a function of the rate of charge or discharge of the battery, the SoC of the battery, and the temperature of the battery. The aging component may include a function of the battery state including the SoC of the battery and a temperature of the battery.

Consider one measure of a battery condition, a measure of battery degradation $C_f$, which is the maximum battery capacity divided by the maximum battery capacity at beginning of life (BoL). At BoL, $C_f=1.0$. As the battery degrades, $C_f$ decreases. At end of life (EoL), $C_f=C_{f,EoL}$. $C_{f,EoL}$ is typically between 0.5 and 0.9 and often around 0.8. In some embodiments of present disclosure, changes in $C_f$ can be used to estimate the cost of operating the battery (e.g., battery degradation cost) during that future time domain as:

$$BatteryCost_{t_1 \ldots t_2} = BatteryCost_{total} * (C_{f,t1} - C_{f,t2})/(1 - C_{f,EoL})$$

where $BatteryCost_{total}$ is a total battery cost (for example an initial or net present cost), and $C_{f,t1} - C_{f,t2}$ is the change in $C_f$ between time $t_1$ and $t_2$. In other words, $C_{f,t1} - C_{f,t2}$ is a measure of degradation of the battery between times $t_1$ and $t_2$. The battery lifetime is that point at which $C_f$ reaches $C_{f,EoL}$, which is the manufacturer's failure limit (usually 0.8 or 80% of initial maximum capacity).

Determining the battery degradation cost for a time period may include multiplying the change in $C_f$ by a cost factor. The cost factor may be the total cost of the battery divided by the total decrease in $C_f$ at end of life, $BatteryCost_{total}/(1-C_{f,EOL})$. In other words, the cost factor may be determined as a lifetime cost of the battery divided by the amount of battery degradation resulting in end of life of the battery.

To determine the change in $C_f$ between times $t_1$ and $t_2$, two components (wear and aging) can be considered as two partial derivatives of $C_f$ with respect to SoC and t respectively. A battery's capacity change during some future time domain from $t=t_i$ to $t=t_2$ can be determined using calculus as:

$$C_{f,t1} - C_{f,t2} = -\int_{t=t_1}^{t=t_2} \left[ \frac{\partial C_f}{\partial SoC} \frac{dSoC}{dt} + \frac{\partial C_f}{\partial t} \right] dt,$$

where the rate of change of $C_f$ due to wear (throughput), the "wear rate," is denoted $$\frac{\partial C_f}{\partial SoC},$$

the rate of change of $C_f$ due to aging, "the aging rate," is denoted $$\frac{\partial C_f}{\partial t},$$

and the rate of change of state of charge (denoted "SoC" and ranging from 0 to 1) versus time is denoted $$\frac{dSoC}{dt}.$$

This equation may be integrated numerically using many commonly known methods including the trapezoidal rule. The derivative $$\frac{dSoC}{dt}$$

can be obtained from the simulation performed by the cost function, and can be calculated as a discretized value $$\frac{\Delta SoC}{\Delta t}.$$

Regarding the rate of change of $C_f$ due to wear, an exponential model can be used that depends upon whether the battery is discharging, $$\frac{dSoC}{dt} < 0,$$

or charging, $$\frac{dSoC}{dt} \geq 0.$$

For example, the wear rate can be expressed as, $$\frac{\partial C_f}{\partial SoC} = \begin{cases} -A*e^{-BSoC} - E & \frac{dSoC}{dt} < 0 \\ -C*e^{D(SoC-1)} - F & \frac{dSoC}{dt} \geq 0 \end{cases},$$

where A and B specify the rate of increase in degradation during discharging, E represents the baseline degradation during discharging, C and D specify the rate of increase in degradation during charging, and F represents the baseline degradation during charging.

FIG. 18 is a graph 1800 of the exponential battery wear model for a specific battery degradation model, according to one embodiment of the present disclosure. FIG. 18 provides plots 1802, 1804 of the negative of the "wear rate,"

$$\frac{\partial C_{f,loss}}{\partial SoC} = \frac{-\partial C_f}{\partial SoC},$$

versus Sou. Put another way, plots 1802 and 1804 represent the rate of battery capacity loss versus a change in the state of charge of the battery. A vertical axis of the graph 1800 shows the negative of the wear rate in dimensionless units. A horizontal axis of the graph 1800 shows a battery SoC, where 1.0=100% (fully charged state). One plot 1802 shows the negative of the wear rate during charging, and a second plot 1804 shows the negative of the wear rate during discharging. The plots 1802, 1804 are computed using the above corresponding equations with parameters (A through F) selected specifically to match a type of lead-acid battery. The parameters in this case are A=4e-3, B=5.63, C=9e-4, D=27.4, E=3e-5, and F=3e-5.

Regarding the rate of change of $C_f$ due to aging, an exponential model for the rate of change in fractional capacity versus time can be used. For example, the aging rate can be expressed as, $$\frac{\partial C_f}{\partial t} =$$
$$-G*[AgingFactor] = -G*\left[\left(1 - (1-H)e^{\frac{-SoC}{I}}\right)*\left(1 - (1-J)e^{\frac{(SoC-1)}{K}}\right)\right],$$

where G represents the nominal aging rate in units of fractional capacity lost (e.g., 2% per year) versus time. The Aging Factor, when multiplied by the nominal aging rate G and by −1, gives the aging rate. A 1.0 aging factor indicates the aging rate is at −G. Also, H and I define the rate of increase in aging rate as SoC approaches 0, and J and K define the rate of increase in aging rate as the SoC approaches 1.

FIG. 19 is a graph 1900 providing a plot 1902 showing a relationship between Aging Factor and SoC for a specific battery degradation model, according to one embodiment of the present disclosure. The vertical axis of the graph 1900 shows an Aging Factor. The horizontal axis of the graph 1900 shows the SoC of the battery being modeled. The plot 1902 reflects the values for the Aging Factor $$\left(1 - (1-H)e^{\frac{-SoC}{I}}\right)*\left(1 - (1-J)e^{\frac{(SoC-1)}{K}}\right)$$

where in this example the aging parameters are H=15.0, I=0.2, J=2.5, and K=0.02.

As noted above, a cost function, according to one embodiment, may sum multiple cost elements for operation of an electrical system, including the cost element Battery $Cost_{t1\ldots t2}$, or $BatteryCost_{t1\ldots t2}*24$ hr/($t_2-t_1$) in embodiments where the cost function determines a cost per day and $t_1$ and $t_2$ have units of hours.

The model explained above can also be described in terms of capacity lost $C_{f,lost}$. The model includes both capacity lost due to battery wear (throughput), $C_{f,lost,wear}$, and capacity lost due to battery aging, $C_{f,lost,aging}$. In other words, capacity lost can be expressed as:

$$C_{f,lost} = C_{f,lost,wear} + C_{f,lost,aging}.$$

The battery end of life is that point at which $C_{f,lost}$ reaches 1 minus the manufacturer's failure limit (usually 0.2 or 20% of initial capacity, which again sets a failure point at 80% of original capacity).

Capacity lost due to battery wear (throughput), $C_{f,lost,wear}$, can be modeled with an exponential model for the rate of change in $C_{f,lost}$ versus SoC. For example, a discharge formulation of the loss of fractional capacity per unit change in fractional SoC applicable during a decreasing SoC can be expressed as, $$\frac{\partial C_{f,lost}}{\partial SoC_{discharge}} = A*e^{-BSoC} + E$$

and a charge formulation of the loss of fractional capacity per unit change in fractional SoC applicable during an increasing SoC can be expressed as, $$\frac{\partial C_{f,lost}}{\partial SoC_{charge}} = C*e^{D(SoC-1)} + F.$$

As before, SoC is the state of charge of the battery, A and B specify the rate of increase in degradation during discharging, E represents the baseline degradation during discharging, C and D specify the rate of increase in degradation during charging, and F represents the baseline degradation during charging. As noted previously, the graph 1800 of FIG. 18 provides plots 1802, 1804 of $$\frac{\partial C_{f,lost}}{\partial SoC} \text{ vs. } SoC$$

for this specific battery degradation model.

For a given battery SoC profile, the total capacity loss due to wear, $C_{f,lost,wear}$, between times $t_1$ and $t_2$ can be calculated with:

$$\frac{\partial C_{f,lost}}{\partial SoC}\frac{\partial SoC}{\partial t} = \begin{cases} \frac{-\partial C_{f,lost}}{\partial SoC_{discharge}}\frac{dSoC}{dt}\frac{dSoC}{dt} < 0 \\ \frac{\partial C_{f,lost}}{\partial SoC_{charge}}\frac{dSoC}{dt}\frac{dSoC}{dt} \geq 0 \end{cases}$$

$$C_{f,lost,wear} = \int_{t=t_1}^{t=t_2} \frac{\partial C_{f,lost}}{\partial SoC}\frac{dSoC}{dt}dt$$

Capacity lost due to battery aging, $C_{f,lost,aging}$, can be represented differentially by defining the rate of battery capacity loss versus time, or more specifically in one embodiment, the rate of change in fractional capacity lost versus time. In one example, this differential representation of battery capacity loss can take an exponential form as, $$\frac{\partial C_{f,lost}}{\partial t} = G * [AgingFactor] = G * \left[\left(1 - (1-H)e^{\frac{-SoC}{I}}\right) * \left(1 - (1-J)e^{\frac{(SoC-1)}{K}}\right)\right],$$

where, as before, G represents the nominal aging rate in units of fractional capacity lost (e.g., 2% per year) versus time. The Aging Factor, when multiplied by the nominal aging rate G and by −1, gives the aging rate. A 1.0 aging factor indicates the aging rate is at −G. Also, H and I define the rate of increase in aging rate as SoC approaches 0, and J and K define the rate of increase in aging rate as the SoC approaches 1.

For a given battery SoC profile, the total battery capacity loss due to aging, $C_{f,lost,aging}$, between times $t_1$ and $t_2$ can be calculated with:

$$C_{f,lost,aging} = \int_{t=t_1}^{\tau=t_2} \frac{\partial C_{f,lost}}{\partial t} dt$$

As noted previously, the graph 1900 of FIG. 19 provides a plot 1902 showing a relationship between SoC and aging rate (or an aging factor) for this specific battery degradation model.

Combining the two components (wear and aging) from the previous examples, a battery's capacity lost during some future time domain from $t=t_1$ to $t_2$ can be determined as:

$$C_{f,lost} = C_{f,lost,wear} + C_{f,lost,aging} \int_{t=t_1}^{\tau=t_2} \frac{\partial C_{f,lost}}{\partial SoC} \frac{\partial SoC}{\partial t} dt +$$
$$\int_{t=t_1}^{\tau=t_2} \frac{\partial C_{f,lost}}{\partial t} dt \int_{t=t_1}^{\tau=t_2} \left[\frac{\partial C_{f,lost}}{\partial SoC} \frac{dSoC}{dt} + \frac{\partial C_{f,lost}}{\partial t}\right] dt$$

Once the battery capacity lost is determined over the future time domain by numerically integrating the above equation, the cost of operating the battery (e.g., a battery degradation cost) during that future time domain can be calculated as:

BatteryCost$_{t_1 \ldots t_2}$=BatteryCost$_{total}$*C$_{f,lost}$(1−C$_{f,EOL}$), where BatteryCost$_{total}$ is a total battery cost (for example an initial or net present cost) and $C_{f,EoL}$ is the fractional battery capacity remaining at end of life. Stated otherwise, determining the battery degradation cost for a time period comprises multiplying the total battery degradation for the time period by a cost factor. The cost factor may be the total cost of the battery divided by the total fractional capacity loss during the battery's lifetime, BatteryCost$_{total}$/(1−C$_{f,EOL}$). In other words, the cost factor may be determined as a lifetime cost of the battery divided by the amount of battery degradation resulting in end of life of the battery.

Using the combined wear and aging model described above, coefficients can be found that result in a fit to a battery manufacturer's cycle life.

Figure 20:
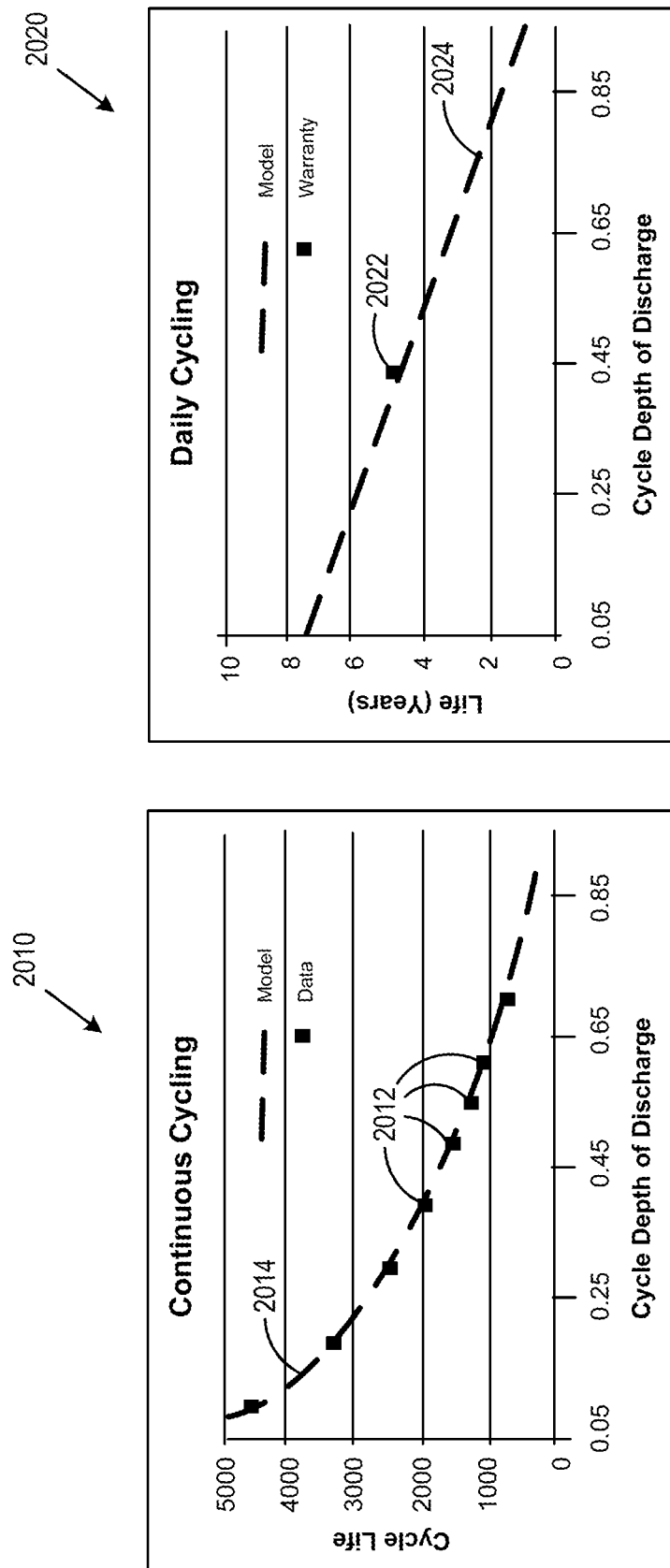
FIG. 20 is a pair of graphs that illustrate a battery's lifetime.

FIG. 20 is a pair of graphs 2010, 2020 that illustrate a battery's lifetime. Graph 2010 shows the manufacturer's data 2012 for battery cycle life (number of cycles) versus depth of discharge under continuous cycling conditions. Graph 2020 shows the manufacturer's data 2022 for battery lifetime (in years) versus depth of discharge assuming one cycle per day. The coefficients determined to match the data of this manufacturer's cycle life for the example battery may be:

A=4e-3, B=5.63, C=9e-4, D=27.4, E=3e-5, F=3e-5, G=1.95e-6 hr$^{-1}$, H=15.0, I=0.2, J=2.5, and K=0.02.

Graph 2010 includes a plot 2014 of the model with the above coefficients aligning with the manufacturer's data 2012 and providing a projected battery cycle life versus depth of discharge. Graph 2020 includes a plot 2024 of the model with the above coefficients aligning with the manufacturer's data 2022 and providing projected battery lifetime versus depth of discharge.

As can be appreciated, different coefficients and/or different battery degradation models may be used, depending on a type of battery deployed in an ESS, according to the present disclosure.

Other battery models may be used to estimate Coulombic and Ohmic efficiency or the maximum rates of charge and discharge. Similar to the degradation model described above, the efficiency and maximum charge and discharge rates may be parameterized with constants that achieve a substantial "fit" between the model and the expected battery performance. Once these battery performance models are defined and parameters are provided, they may be used in the cost function control simulation to better predict the outcome of application of various control parameter sets.

Apparatus Architectures

Figure 21:
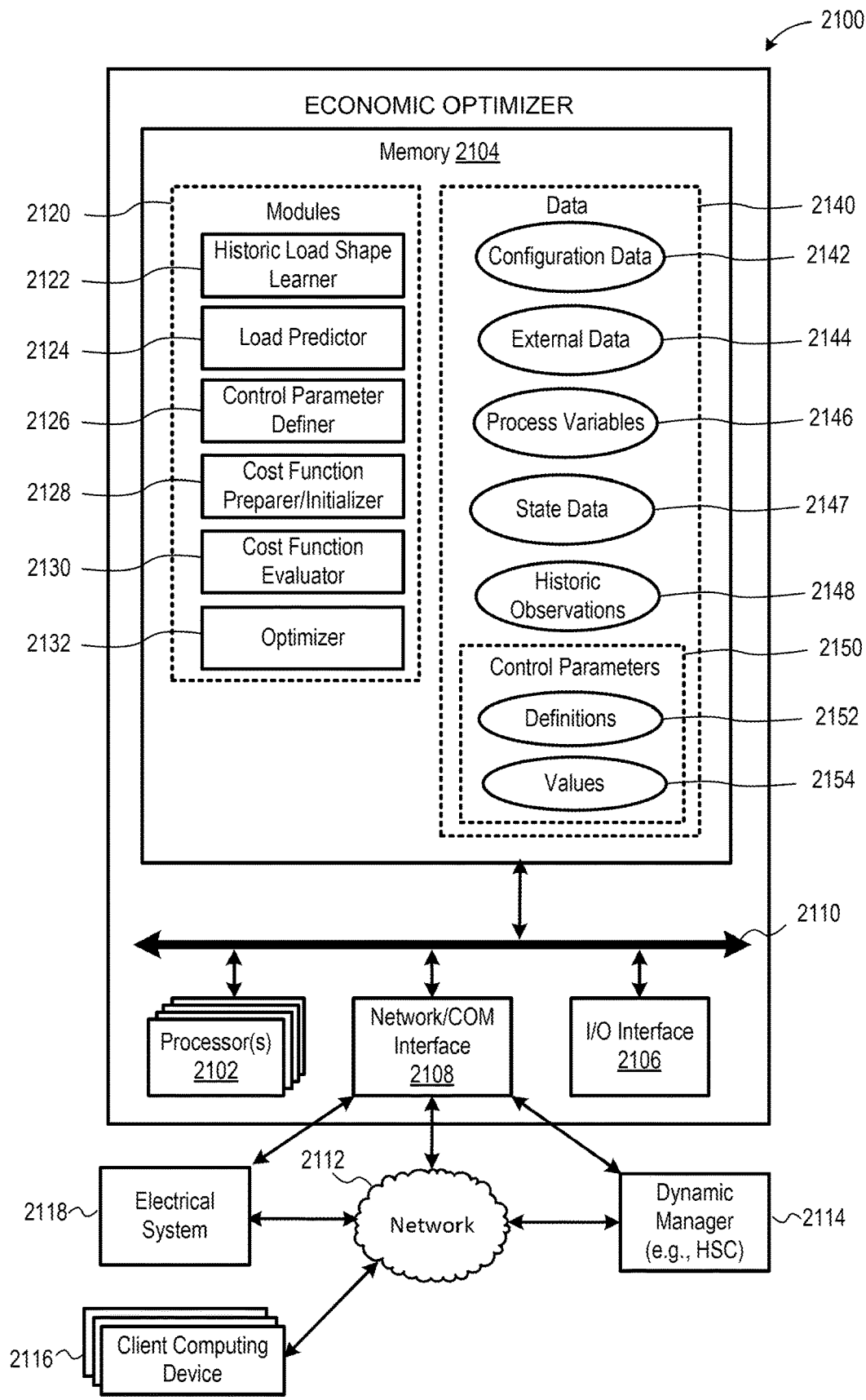
FIG. 21 is a diagram of an economic optimizer, according to one embodiment of the present disclosure.

FIG. 21 is a diagram of an EO 2100 according to one embodiment of the present disclosure. The EO 2100 may determine a control plan for managing control of an electrical system 2118 of a site during an upcoming time domain and provide the control plan as output. The determined control plan may include a plurality of sets of parameters each to be applied for a different time segment within an upcoming time domain. The EO 2100 may determine the control plan based on a set of configuration elements specifying one or more constraints of the electrical system 2118 and defining one or more cost elements associated with operation of the electrical system. The EO 2100 may also determine the control plan based on a set of process variables that provide one or more measurements of a state of the electrical system 2118. The EO 2100 may include one or more processors 2102, memory 2104, an input/output interface 2106, a network/COM interface 2108, and a system bus 2110.

The one or more processors 2102 may include one or more general purpose devices, such as an Intel®, AMD®, or other standard microprocessor. The one or more processors 2102 may include a special purpose processing device, such as ASIC, SoC, SiP, FPGA, PAL, PLA, FPLA, PLD, or other customized or programmable device. The one or more processors 2102 perform distributed (e.g., parallel) processing to execute or otherwise implement functionalities of the present embodiments. The one or more processors 2102 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 2104 may include static RAM, dynamic RAM, flash memory, one or more flip-flops, ROM, CD-ROM, DVD, disk, tape, or magnetic, optical, or other computer storage medium. The memory 2104 may include a plurality of program modules 2120 and a data 2140.

The program modules 2120 may include all or portions of other elements of the EO 2100. The program modules 2120 may run multiple operations concurrently or in parallel by or on the one or more processors 2102. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems and/or the like.

The system memory 2104 may also include the data 2140. Data generated by the EO 2100, such as by the program modules 2120 or other modules, may be stored on the system memory 2104, for example, as stored program data 2140. The data 2140 may be organized as one or more databases.

The input/output interface 2106 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 2108 may facilitate communication or other interaction with other computing devices (e.g., a dynamic manager 2114) and/or networks 2112, such as the Internet and/or other computing and/or communications networks. The network/COM interface 2108 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 2108 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth. The network/COM interface 2108 may be any appropriate communication interface for communicating with other systems and/or devices.

The system bus 2110 may facilitate communication and/or interaction between the other components of the system, including the one or more processors 2102, the memory 2104, the input/output interface 2106, and the network/COM interface 2108.

The modules 2120 may include a historic load shape learner 2122, a load predictor 2124, a control parameter definer 2126, a cost function preparer/initializer 2128, a cost function evaluator 2130, and an optimizer 2132.

The historic load shape learner 2122 may compile or otherwise gather historic trends to determine a historic profile or an average load shape that may be used for load prediction. The historic load shape learner 2122 may determine and update and an avg_load_shape array and an avg_load_shape_time_of_day array by recording load observations and using an approach to determine a suitable average of the historic load observations after multiple periods of time. The historic load shape learner 2122 may utilize a process or an approach to determining the historic average profile such as described above with reference to FIG. 8.

The load predictor 2124 may predict a load on the electrical system 2118 during an upcoming time domain. The load predictor 2124 may utilize a historic profile or historic load observations provided by the historic load shape learner 2122. The load predictor 2124 may utilize a load prediction method such as described above with reference to FIGS. 8 and 8.

The control parameter definer 2126 may generate, create, or otherwise define a control parameter set X, in accordance with a control law. The created control parameters 2150 may include a definition 2152 and a value 2154 and may be stored as data 2140.

The cost function preparer/initializer 2128 prepares or otherwise obtains a cost function to operate on the control parameter set X. The cost function may include the one or more constraints and the one or more cost elements associated with operation of the electrical system 2118. The cost function preparer/initializer 2128 pre-calculates certain values that may be used during iterative evaluation of the cost function involved with optimization.

The cost function evaluator 2130 evaluates the cost function based on the control parameter set X. Evaluating the cost function simulates operation of the electrical system for a given time period under a given set of circumstances set forth in the control parameter set X and returns a cost of operating the electrical system during the given time period.

The optimizer 2128 may execute a minimization of the cost function by utilizing an optimization algorithm to find the set of values for the set of control variables. Optimization (e.g., minimization) of the cost function may include iteratively utilizing the cost function evaluator 2130 to evaluate the cost function with different sets of values for a control parameter set X until a minimum cost is determined. In other words, the algorithm may iteratively change values for the control parameter set X to identify an optimal set of values in accordance with one or more constraints and one or more cost elements associated with operation of the electrical system.

The data 2140 may include configuration data 2142, external data 2144, process variables 2146, state data 2147, historic observations 2148, and control parameters 2150 (including definitions 2152 and values 2154).

The configuration data 2142 may be provided to, and received by, the EO 2100 to communicate constraints and characteristics of the electrical system 2118.

The external data 2144 may be received as external input (e.g., weather reports, changing tariffs, fuel costs, event data), which may inform the determination of the optimal set of values.

The process variables 2146 may be received as feedback from the electrical system 2118. The process variables 2146 are typically measurements of the electrical system 2118 state and are used to, among other things, determine how well objectives of controlling the electrical system 2118 are being met.

The state data 2147 would be any EO state information that may be helpful to be retained between one EO iteration and the next. An example is avg_load_shape.

The historic observations 2148 are the record of process variables that have been received. A good example is the set of historic load observations that may be useful in a load predictor algorithm.

As noted earlier, the control parameter definer may create control parameters 2150, which may include a definition 2152 and a value 2154 and may be stored as data 2140. The cost function evaluator 2130 and/or the optimizer 2132 can determine values 2154 for the control parameters 2150.

The EO 2100 may provide one or more control parameters 2150 as a control parameter set X to the dynamic manager 2114 via the network/COM interface 2108 and/or via the network 2112. The dynamic manager 2114 may then utilize the control parameter set X to determine values for a set of control variables to deliver to the electrical system 2118 to effectuate a change to the electrical system 2118 toward meeting one or more objectives (e.g., economic optimization) for controlling the electrical system 2118.

In other embodiments, the EO 2100 may communicate the control parameter set X directly to the electrical system 2118 via the network/COM interface 2108 and/or via the network 2112. In such embodiments, the electrical system 2118 may process the control parameter set X directly to determine control commands, and the dynamic manager 2114 may not be included.

In still other embodiments, the EO 2100 may determine values for a set of control variables (rather than for a control parameter set X) and may communicate the set of values for the control variables directly to the electrical system 2118 via the network/COM interface 2108 and/or via the network 2112.

One or more client computing devices 2116 may be coupled via the network 2112 and may be used to configure, provide inputs, or the like to the EO 2100, the dynamic manager 2114, and/or the electrical system 2118.

Figure 22:
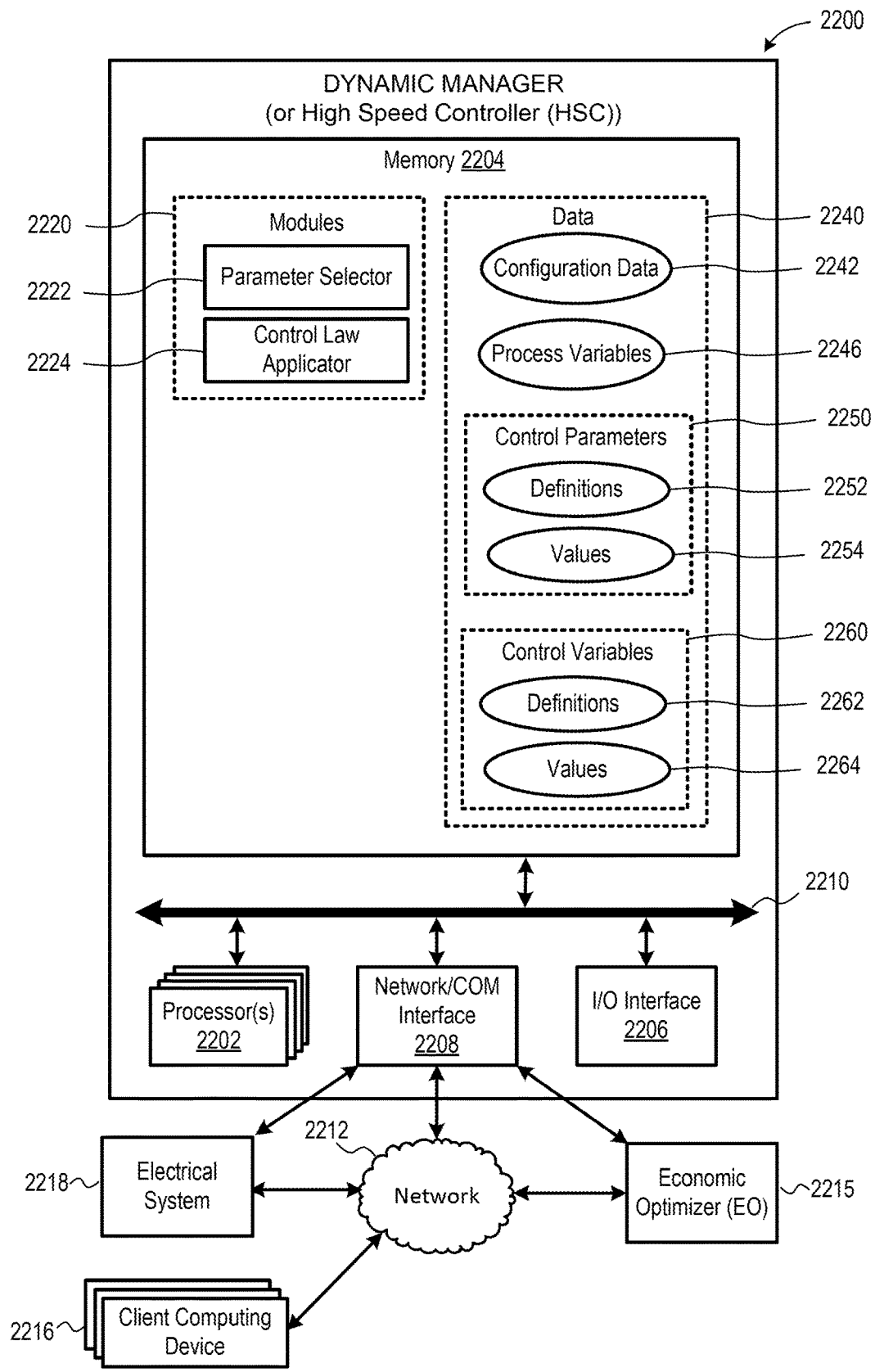
FIG. 22 is a diagram of a dynamic manager, according to one embodiment of the present disclosure.

FIG. 22 is a diagram of a dynamic manager 2200, according to one embodiment of the present disclosure. The dynamic manager 2200, according to one embodiment of the present disclosure, is a second computing device that is separate from an EO 2215, which may be similar to the EO 2100 of FIG. 21. The dynamic manager 2200 may operate based on input (e.g., a control parameter set X) received from the EO 2215. The dynamic manager 2200 may determine a set of control values for a set of control variables for a given time segment of the upcoming time domain and provide the set of control values to an electrical system 2218 of a site to effectuate a change to the electrical system 2218 toward meeting an objective (e.g., economical optimization, participation in an aggregation opportunity event) of the electrical system 2218 during an upcoming time domain. The dynamic manager 2200 determines the set of control values based on a control law and a set of values for a given control parameter set X. The dynamic manager 2200 may include one or more processors 2202, memory 2204, an input/output interface 2206, a network/COM interface 2208, and a system bus 2210.

The one or more processors 2202 may include one or more general purpose devices, such as an Intel®, AMD®, or other standard microprocessor. The one or more processors 2202 may include a special purpose processing device, such as ASIC, SoC, SiP, FPGA, PAL, PLA, FPLA, PLD, or other customized or programmable device. The one or more processors 2202 perform distributed (e.g., parallel) processing to execute or otherwise implement functionalities of the present embodiments. The one or more processors 2202 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 2204 may include static RAM, dynamic RAM, flash memory, one or more flip-flops, ROM, CD-ROM, DVD, disk, tape, or magnetic, optical, or other computer storage medium. The memory 2204 may include a plurality of program modules 2220 and a program data 2240.

The program modules 2220 may include all or portions of other elements of the dynamic manager 2200. The program modules 2220 may run multiple operations concurrently or in parallel by or on the one or more processors 2202. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The system memory 2204 may also include data 2240. Data generated by the dynamic manager 2200, such as by the program modules 2220 or other modules, may be stored on the system memory 2204, for example, as stored program data 2240. The stored program data 2240 may be organized as one or more databases.

The input/output interface 2206 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 2208 may facilitate communication with other computing devices and/or networks 2212, such as the Internet and/or other computing and/or communications networks. The network/COM interface 2208 may couple (e.g., electrically couple) to a communication path (e.g., direct or via the network) to the electrical system 2218. The network/COM interface 2208 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 2208 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 2210 may facilitate communication and/or interaction between the other components of the system, including the one or more processors 2202, the memory 2204, the input/output interface 2206, and the network/COM interface 2208.

The modules 2220 may include a parameter selector 2222 and a control law applicator 2224.

The parameter selector may pick which set of parameters to be used from the control parameter set X, according to a given time segment.

The control law applicator 2224 may process the selected set of parameters from the control parameter set X and convert or translate the individual set of parameters into control variables (or values thereof). The control law applicator 2224 may apply logic and/or a translation process to determine a set of values for a set of control variables based on a given set of parameters (from a control parameter set X) for a corresponding time segment. For example, the control law applicator 2224 may apply a method and/or logic as shown in FIG. 16.

The data 2240 may include configuration data 2242, process variables 2246, control parameters 2250 (including definitions 2252 and values 2254), and/or control variables 2260 (including definitions 2262 and values 2264).

The configuration data 2242 may be provided to, and received by, the dynamic manager 2200 to communicate constraints and characteristics of the electrical system 2118.

The process variables 2246 may be received as feedback from the electrical system 2218. The process variables 2246 are typically measurements of the electrical system 2218 state and are used to, among other things, determine how well objectives of controlling the electrical system 2218 are being met. Historic process variables 2246 may be utilized by the HSC for example to calculate demand which may be calculated as average building power over the previous 15 or 30 minutes. The dynamic manager 2200 can determine the set of control values for the set of control variables based on the process variables 2246.

The control parameters 2250 may comprise a control parameter set X that includes one or more sets of parameters each for a corresponding time segment of an upcoming time domain. The control parameters 2250 may additionally, or alternately, provide a control plan for the upcoming time domain. The control parameters 2250 may be received from an EO 2215 as an optimal control parameter set $X_{opt}$.

The control variables 2260 may be generated by the parameter interpreter 2222 based on an optimal control parameter set $X_{opt}$.

The dynamic manager 2200 may receive the optimal control parameter set $X_{opt}$ from the EO 2215 via the network/COM interface 2208 and/or via the network 2212. The dynamic manager 2200 may also receive the process variables from the electrical system 2218 via the network/COM interface 2208 and/or via the network 2212.

The dynamic manager 2200 may provide the values for the set of control variables to the electrical system 2218 via the network/COM interface 2208 and/or via the network 2212.

One or more client computing devices 2216 may be coupled via the network 2212 and may be used to configure, provide inputs, or the like to the EO 2215, the dynamic manager 2200, and/or the electrical system 2218.

Site Controller Examples

Figure 23:
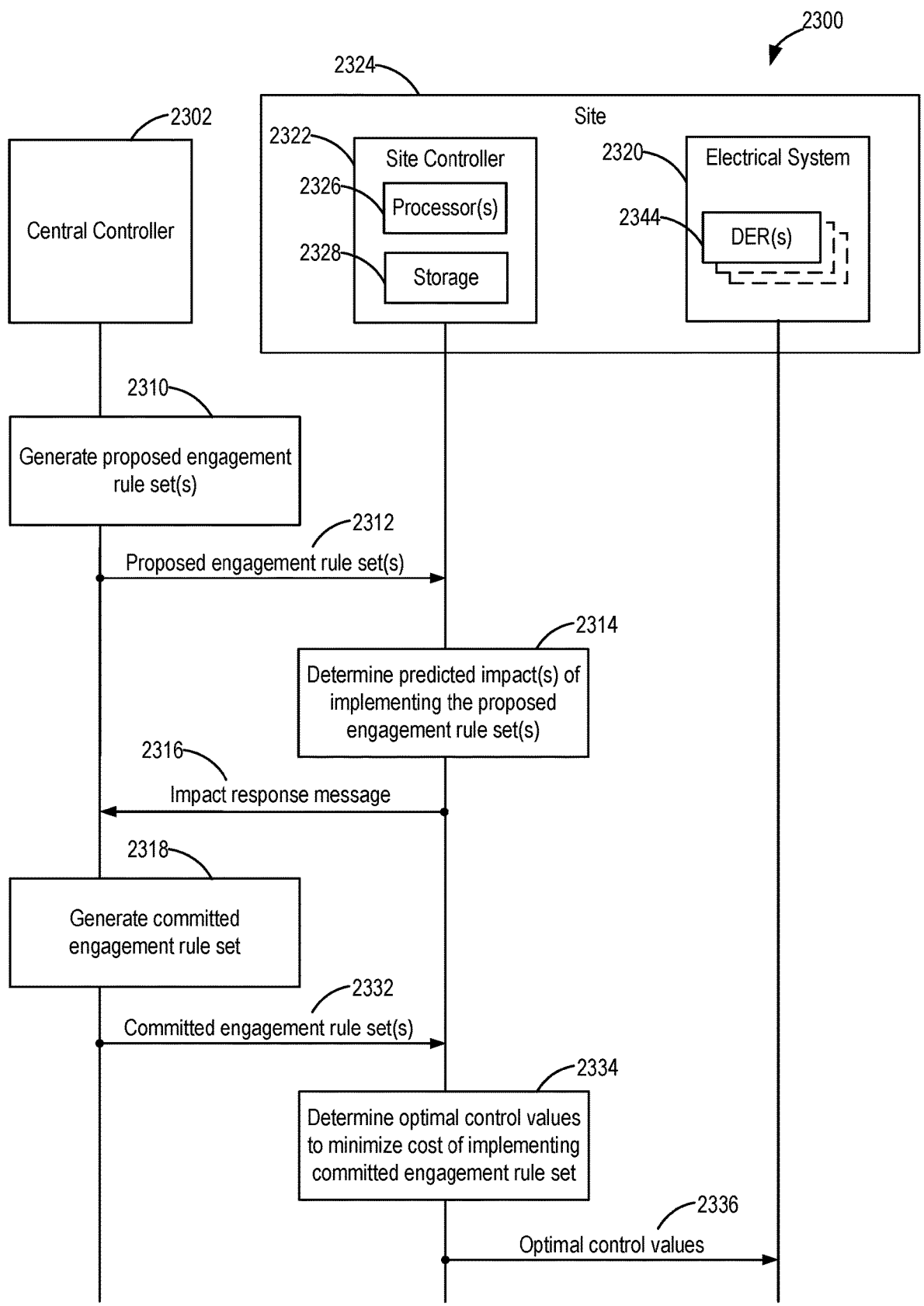
FIG. 23 is a simplified signal flow diagram of an electrical power control system, according to some embodiments.

FIG. 23 is a simplified signal flow diagram of an electrical power control system 2300, according to some embodiments. The electrical power control system 2300 includes a central controller 2302, a site controller 2322, and one or more DERs 2244 of an electrical system 2320 located at a site 2324. The site controller 2322 includes one or more processors 2326 operably coupled to one or more data storage devices 2328. The processors 2326 are configured to perform functions of the site controller 2322 as will be discussed in more detail below. In some embodiments the site controller 2322 is similar to the controllers 122, 142, 162 (FIG. 1), 216 (FIG. 2), 410 (FIG. 4), and 610 (FIG. 6) discussed above. The site controller 2322 may include a control interface configured to communicate with the DERs 2344. The DERs 2344 may be electrically controllable by one or more control values of one or more control variables delivered to the DERs 2344 through the control interface. The DERs 2344 may include one or more ESSs, one or more electrical power generators, one more loads, or combinations thereof.

The site controller 2322 is configured to optimally control operation of the DERs 2344, and in some embodiments, other electrical equipment (not shown) of the electrical system 2320 in an optimal manner, as discussed above with reference to FIGS. 8-22. Accordingly, at any given moment in time during operation, the site controller 2322 is controlling the electrical equipment of the electrical system 2320 in a way that the site controller 2322 has determined to be optimal (e.g., economically optimal).

The central controller 2302 is configured to determine whether and how much to commit the site 2324 to participation in incentive maneuvers. Since the site controller 2322 already controls the electrical system 2320 in a manner that the site controller 2322 has determined to be optimal, deviation in this optimal operation to participate in incentive maneuvers presumably has a negative or undesirable impact (e.g., an increase in an economic cost, equipment wear and tear, etc.) on the operation of the electrical system 2320. The central controller 2302, however, is not privy to the computations performed by the site controller 2322 in determining how to optimally control the electrical system 2320. In other words, without receiving some information from the site controller 2322, the central controller 2302 may not be able to determine whether the upshot of participating in the incentive maneuver justifies the cost of the site controller 2322 deviating operation of the electrical system 2320 from the optimal operation. As a result, the central controller 2302 and the site controller 2322 are configured to communicate with each other to enable the central controller 2302 to propose, to the site controller 2322, participation in incentive maneuvers and learn, from the site controller 2322, a predicted impact of the proposed participation. Communication between the central controller 2302 and the site controller 2322 also enables the central controller 2302 to communicate committed participation of the site 2324 in incentive maneuvers to the site controller 2322 once the central controller 2302 has determined if and to what extent the site 2324 should participate in the incentive maneuvers.

In operation, the central controller generates 2310 one or more proposed engagement rule sets identifying one or more levels of participation, by the site 2324, in an incentive maneuver. In some embodiments, information regarding the incentive maneuver may have been received by the central controller 2302 from a utility entity (e.g., a power company, etc.). In some embodiments, the central controller 2302 may itself be the utility entity.

In some embodiments the proposed engagement rule sets correspond to an incentive maneuver that the site 2324 is to participate in on its own. In some such embodiments the proposed engagement rule sets include a requested site change in power (e.g., a value of provided power, a value of reduced consumption of power, or combinations thereof) that the site 2324 is proposed to provide in order to participate in the incentive maneuver. In some embodiments the incentive maneuver includes various levels of participation (e.g., an incentive that is a function of a total site change in power). In such embodiments the proposed engagement rule sets include multiple values corresponding to various levels of proposed participation in the incentive maneuver.

In some embodiments the proposed engagement rule sets correspond to an incentive maneuver that the site 2324 is to participate in with at least one other site (not shown). In such embodiments the central controller 2302 includes an aggregation engine such as the aggregation engines 102 (FIG. 1), 202 (FIG. 2), 402 (FIG. 4), 602 (FIG. 6) discussed above. Also, in such embodiments the proposed engagement rule sets include one or more proposed apportionment values corresponding to portions of the total requested net change in power of the incentive maneuver (e.g., an apportionment opportunity) that the site 2324 is proposed to implement.

The central controller 2302 transmits the one or more proposed engagement rule sets 2312 to the site controller 2322. The site controller 2322 is configured to store the engagement rule sets 2312 on the storage 2328. The site controller 2322 determines 2314 a predicted impact of implementing the proposed engagement rule sets. In some embodiments the site controller 2322 determines 2314 the predicted impact by computing a predicted difference in cost (e.g., an economic cost, a cost from the cost function used to optimize operation of the electrical system 2320, a degradation cost of operating equipment of the electrical system 2320 such as an ESS, etc.) between implementing the proposed engagement rule sets and not implementing the proposed engagement rule sets. By way of non-limiting example, the predicted impact may include a predicted difference in an economic cost between implementing the proposed engagement rule sets and not implementing the proposed engagement rule sets. In some embodiments the site controller 2322 determines 2314 the predicted impact by merely computing the predicted cost of implementing the proposed engagement rule sets and the predicted cost of not implementing the proposed engagement rule sets. By way of non-limiting example, the predicted impact may include a predicted economic cost of implementing the proposed engagement rule sets and a predicted economic cost of not implementing the proposed engagement rule sets.

In some embodiments the predicted impact determined 2314 by the site controller 2322 is an optimal predicted impact. An optimal predicted impact, in one embodiment, is an optimal predicted economic impact, which is an operating cost of optimized operation of the site with the proposed site change in power. An optimal predicted economic impact can be the difference between the operating cost of optimized operation with and without the proposed site change in power. In other words, the site controller 2322 may optimize the predicted cost of implementing the proposed engagement rule sets in determining 2314 the predicted impact. In some embodiments the site controller 2322 constructs a cost function in determining the optimal predicted impact. The cost function may include a sum of predicted economic costs of operating the electrical system 2320. By way of non-limiting example, the cost function may include a sum of predicted ToU supply charges and predicted demand charges. Also by way of non-limiting example, the cost function may include summing the predicted ToU supply charges and the predicted demand charges with equipment degradation costs associated with degradation of at least one of the DERs 2344 (e.g., degradation of an ESS, a generator, etc.). The site controller 2322 may optimize the cost function. The site controller 2322 transmits an impact response message 2316 indicating the predicted impact to the central controller 2302.

In some embodiments the site controller 2322 determines predicted impacts of implementing a plurality of different proposed engagement rule sets and generates impact response messages 2318 to report the predicted impacts to the central controller 2302. By way of non-limiting example, the site controller 2322 may receive the plurality of different proposed engagement rule sets one at a time, and the corresponding impact response messages 2316 may be transmitted to the central controller 2302 one at a time after reception of each corresponding one of the engagement rule sets is received. In other words, the generating 2310, transmitting of the proposed engagement rule sets 2312, determining 2314, and transmission of impact response message 2316 may be repeated until each of the plurality of proposed engagement rule sets 2312 has been accounted for. Also by way of non-limiting example, the plurality of different engagement rule sets 2312 may be received together (e.g., in the same transmission from the central controller 2302). In this example the impact responses may, after reception of all the plurality of different engagement rule set values, be transmitted to the central controller 2302 together (e.g., in the same impact response message 2316 or in multiple impact response messages 2316).

The central controller 2302 determines whether and/or to what extent the site 2324 should participate in the incentive maneuver based on information from the proposed engagement rule sets 2312, the impact response message 2316, and the upshot of the incentive maneuver. The central controller generates 2318 a committed engagement rule set 2332 based on the determination of whether and/or to what extent the site 2324 should participate in the incentive maneuver. The committed engagement rule set 2332 indicates a committed site change in power, by the electrical system 2320, during a committed period of time. By way of non-limiting example, the committed engagement rule set 2332 may be the same as one of the proposed engagement rule sets 2312. Also by way of non-limiting example, the committed engagement rule set 2332 may not be the same as one of the proposed engagement rule sets 2312 (e.g., the central controller may predict impacts of other engagement rule sets not proposed to the site controller 2322 based on received impact responses corresponding to the proposed engagement rule sets 2312). The central controller 2318 transmits the committed engagement rule set 2332 to the site controller 2322.

The site controller 2322 determines 2334 optimal control values 2336 for the one or more control variables that control the DERs 2344. By way of non-limiting example, the optimal control values 2336 may be selected to minimize an economic cost of implementing the committed engagement rule set 2332. The site controller 2322 provides the optimal control values 2336 to the DERs 2344 to control operation of the DERs 2344 to implement the committed engagement rule set 2332.

It should be noted that although FIG. 23 illustrates the site controller 2322 as being at the site 2324, in some embodiments the site controller 2322 may be located remotely from the site 2324 and may communicate with the electrical system 2320 through one or more networks to provide the optimal control values 2336 to the DERs 2344.

EXAMPLE EMBODIMENTS

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1

An aggregation engine (e.g. a centralized optimization engine) to aggregate power of distributed energy resources (DERs) to produce a power level for a period of time (or to otherwise respond to a request for production of power), the aggregation engine comprising: a communication interface to communicate over an electronic communication network with a plurality of local controllers (e.g. site optimization engines) each corresponding to a DER of a plurality of DERs; one or more processors to: receive an aggregation opportunity (such as a demand response call) to participate in a response event, the aggregation opportunity specifying a requested power level production over a period of time (e.g., in the future) of the response event and optionally an upshot for providing the requested power level production for the period of time; poll, via the communication interface, each of the plurality of local controllers to inquire an impact of the corresponding DER participating in the response event (versus not participating), the participating including providing at least a portion of the power level for at least a portion of the period of time of the response event; receive, via the communication interface, an impact representation from each of the plurality of local controllers; determine, based on a total impact of the plurality of local controllers (and the upshot, if any), to participate in the response event and/or which of the plurality of DERs to include in the participation in the response event; and transmit, via the communication interface, a command to selected DERs of the plurality of DERs to schedule participation in the response event by producing a portion of the requested power level production for (at least a portion of) the period of time of the response event.

Example 2

The aggregation engine of Example 1, wherein the one or more processors poll each of the plurality of local controllers by: providing to each local controller an engagement rule set (defining parameters for participating in the aggregation opportunity); and receiving an impact representation for the corresponding DER participating in the response event, wherein the total impact is determined in part by a summation of the impact representations for the plurality of DERS.

Example 3

The aggregation engine of Example 2, wherein the engagement rule set specifies a period of time and a portion of the requested power level production or reduction to be provided by the corresponding DER.

Example 3A

The aggregation engine of Example 3, wherein the engagement rule set specifies the portion of the requested power level production to be provided by the corresponding DER as an apportionment value indicating a portion of the requested power level production to be provided by the corresponding DER (e.g., in one of kW (power) and kWh (energy).

Example 3B

The aggregation engine of Example 3, wherein the engagement rule set specifies the portion of the requested power level production to be provided by the corresponding DER in terms of a participation benefit (e.g., a value per unit power (dollars/kW)).

Example 3C

The aggregation engine of Example 3, wherein the engagement rule set specifies the portion of the requested power level production to be provided by the corresponding DER in terms of: an upper limit, an acceptable range of participation (e.g., in units power).

Example 4

The aggregation engine of Example 2, wherein the impact representation includes optimized cost information of a corresponding DER participating in the response event.

Example 4A

The aggregation engine of Example 4, wherein the optimized cost information includes a cost differential indicating a difference in cost for the DER participating in the response event versus not participating in the response event.

Example 4B

The aggregation engine of Example 4, wherein the impact representation further includes one of: optimized participation (e.g., in kW); and marginal cost of participation (e.g., in dollars per kW).

Example 5

The aggregation engine of Example 1, wherein the requested power level production is one of: an amount relative to a baseline level; and an amount relative to an expected level.

Example 6

The aggregation engine of Example 1, wherein producing a portion of the requested power level production comprises one or more of: a reduction in consumed power (such as through control of loads, generators, batteries); and original generation of electricity.

Example 7

The aggregation engine of Example 1, wherein polling to inquire a cost differential comprises: requesting a participation cost for the corresponding DER to participate in the response event; and requesting a baseline cost for the DER without participation in the response event, and wherein receiving the cost differential comprises receiving the participation cost and the baseline cost and calculating the cost differential.

Example 8

The aggregation engine of Example 1, wherein the aggregation opportunity further specifies an upshot to be received for providing the requested power level production over the period of time of the response event.

Example 9

The aggregation engine of Example 8, wherein the upshot includes one or both of a benefit (e.g., economic) for participating in the response event and a penalty (e.g., economic) for not participating in the response event.

Example 10

The aggregation engine of Example 8, wherein the upshot is a function of actual power level production (e.g. above one of a baseline level and/or an expected level).

Example 11

The aggregation engine of Example 8, wherein the upshot is a function of the requested power level production (i.e., a function of the request rather than the result.

Example 12

The aggregation engine of Example 1, wherein the one or more processors poll each of the plurality of local controllers by providing a proposed apportionment value indicating a portion of the requested power level production to be provided by the corresponding DER, and wherein the given local controller determines the cost differential based on the proposed apportionment value.

Example 13

The aggregation engine of Example 12, wherein the one or more processors determine the proposed apportionment value of each given DER based on one or more of: a total quantity of the plurality of DERs; a capacity of a battery of the energy storage system of the given DER relative to a capacity of all batteries of the energy storage systems of the plurality of DERs; a power output of a battery of the energy storage system of the given DER relative to a total power output of all batteries of the energy storage systems of the plurality of DERs; and assigning or designating the total requested power level production as the proposed apportionment value.

Example 14

An aggregation engine (or engine) to aggregate distributed energy resources (DERs) to produce a power level for a period of time of a response event, the aggregation engine comprising: a communication interface to communicate over an electronic communication network with a local (e.g., onsite) controller of each of a plurality of DERs; one or more processors to: provide an engagement rule set to the local controller of each DER of the plurality of DERs, the engagement rule set defining parameters for a given DER to participate in a response event providing a power level production over a period of time; receive an impact representation from the local controller of each DER of the plurality of DERs, the impact representation indicating an impact of participation of the corresponding DER in the response event; determine a committed apportionment value for each DER of the plurality of DERs based on the impact representations of the plurality of DERs; and schedule participation in the response event by transmitting, via the communication interface, the committed apportionment values and instructions to each DER of the plurality of DERs to produce a portion of the power level production according to the corresponding committed apportionment value.

Example 15

The aggregation engine of Example 14, wherein the one or more processors repeatedly poll each given DER to determine the committed apportionment value for each DER of the plurality of DERs by utilizing an optimization algorithm.

Example 16

The aggregation engine of Example 14, wherein receiving the impact representation comprises receiving a delta value from each of the plurality of DERs, the delta value indicating a difference in impact of participating in the response event versus not participating in the response event.

Example 16A

The aggregation engine of Example 16, wherein receiving the impact representation comprises a receiving a cost differential indicating a difference in cost of operating the DER with participation in the response event versus a cost of operating the DER not participating in the response event.

Example 17

The aggregation engine of Example 14, wherein receiving the impact representation comprises receiving from each of the plurality of DERs both a participation impact and a nonparticipation impact.

Example 17A

The aggregation engine of Example 14, wherein receiving the impact representation comprises receiving a cost differential by receiving from each of the plurality of DERs both a participation cost and a nonparticipation cost, wherein a calculation results in the cost differential as a difference in cost of participating in the response event versus not participating in the response event.

Example 18

The aggregation engine of Example 14, wherein engagement rule set comprises a proposed apportionment value for each given DER based on one or more of: a total quantity of the plurality of DERs; a capacity of a battery of the energy storage system of the given DER relative to a capacity of all batteries of the energy storage systems of the plurality of DERs; a power output of a battery of the energy storage system of the given DER relative to a total power output of all batteries of the energy storage systems of the plurality of DERs; and assigning or otherwise indicating the total requested power level production as the proposed apportionment value.

Example 19

The aggregation engine of Example 14, wherein the power level production is one of: an amount relative to a baseline level; and an amount relative to an expected level.

Example 20

The aggregation engine of Example 14, wherein producing a portion of the power level production comprises one or more of: a reduction in consumed power (e.g., such as through control of loads, generators, batteries); original generation of electricity.

Example 21

The aggregation engine of Example 14, wherein the committed apportionment value for each of the plurality of DERs is also determined based on an upshot to be received for providing the power level production over the period of time.

Example 22

The aggregation engine of Example 21, wherein the upshot includes one or both of a benefit (e.g., economic) for participating in the response event and a penalty (e.g., economic) for not participating in the response event.

Example 23

The aggregation engine of Example 21, wherein the upshot is a function of power level production (e.g., above one of a baseline level and/or an expected level).

Example 24

An aggregation engine (e.g., engine) to aggregate distributed energy resources (DERs), the aggregation engine comprising: a communication interface to communicate over an electronic communication network with a local (e.g., onsite) controller of each of a plurality of DERs; one or more processors to: provide proposed apportionment values to the plurality of local controllers of the plurality of DERs for participating in a response event to provide a power level production over a period of time; receive differential values from the plurality of DERs, each differential indicating a delta of an impact on a corresponding DER of participating in the response event versus not participating in the response event; determine a committed apportionment value for each of the plurality of DERs based on the differential values of the plurality of DERs; and provide, via the communication interface, the committed apportionment values and instructions to the plurality of DERs to schedule participation in the response event, wherein each of the plurality of DERs is to participate in the response event by providing a portion of the power level production according to the DERs corresponding committed apportionment value.

Example 25

The aggregation engine of Example 24, wherein the one or more processors repeatedly poll each given DER to determine the committed apportionment value for each of the plurality of DERs by utilizing an optimization algorithm.

Example 26

The aggregation engine of Example 24, wherein receiving differential values comprises receiving a delta value from each of the plurality of DERs.

Example 26A

The aggregation engine of Example 26, wherein the delta value indicates a difference in cost of participating in the response event versus not participating in the response event.

Example 27

The aggregation engine of Example 24, wherein receiving differential values comprises receiving from each of the plurality of DERs both a participation cost and a nonparticipation cost, wherein a calculation provides a difference in cost of participating in the response event versus not participating in the response event.

Example 28

The aggregation engine of Example 24, wherein the one or more processors determine a proposed apportionment value for each given DER based on one or more of: a total quantity of the plurality of DERs; a capacity of a battery of the energy storage system of the given DER relative to a capacity of all batteries of the energy storage systems of the plurality of DERs; a power output of a battery of the energy storage system of the given DER relative to a total power output of all batteries of the energy storage systems of the plurality of DERs; and assigning the total requested power level production as the proposed apportionment value.

Example 29

The aggregation engine of Example 24, wherein the power level production is one of: an amount relative to a baseline level; and an amount relative to an expected level.

Example 30

The aggregation engine of Example 24, wherein providing a portion of the power level production comprises one or more of: a reduction in consumed power (e.g., through control of loads, generators, batteries); original generation of electricity.

Example 31

The aggregation engine of Example 24, wherein the committed apportionment value for each of the plurality of DERs is also determined based on an upshot to be received for providing the power level production over the period of time.

Example 32

The aggregation engine of Example 31, wherein the upshot includes one or both of a benefit for participating in the response event and a penalty for not participating in the response event.

Example 33

The aggregation engine of Example 31, wherein the upshot is a function of power level production above one of a baseline level and/or an expected level.

Example 34

A method of aggregating power of distributed energy resources (DERs) to produce a power level for a period of time (or to otherwise respond to a request for production of power), comprising: receiving an aggregation opportunity (such as a demand response call) requesting participation in a response event, the aggregation opportunity specifying a requested power level production over a period of time of the response event and/or an upshot for providing the requested power level production for the period of time; polling, over a communication network, each site controller of a plurality of site controllers for a local impact (e.g., a cost differential) of a corresponding DER participating in the response event (versus not participating), the participating including providing at least a portion of the power level for at least a portion of the period of time of the response event; determining, based on a total impact of the plurality of local controllers (and the upshot, if any), to participate in the response event and/or which of the plurality of DERs to include in the participation in the response event, the total impact comprising a summation of the local impacts for the plurality of DERS; and scheduling (e.g., by transmitting, via the communication network, a command to) selected DERs of the plurality of DERs to participate in the response event to produce a portion of the requested power level production for (at least a portion of) the period of time of the response event.

Example 35

The method of Example 34, wherein polling each site controller of the plurality of site controllers includes: providing to the site controller an engagement rule set (e.g., that defines parameters for participating in the aggregation opportunity); receiving an impact representation for the corresponding DER participating in the response event, wherein the impact representation provides the local impact of the corresponding DER participating in the aggregation opportunity.

Example 36

The method of Example 35, wherein the impact representation includes information for determining a cost differential of the corresponding DER participating in the response event versus not participating, the participating including providing at least a portion of the power level for at least a portion of the period of time of the response event.

Example 37

The method of Example 35, wherein the engagement rule set specifies a period of time and a portion of the requested power level production to be provided by the corresponding DER.

Example 38

The method of Example 37, wherein the engagement rule set specifies the portion of the requested power level production to be provided by the corresponding DER as an apportionment value indicating a portion of the requested power level production to be provided by the corresponding DER (e.g., in one of kW (power) and kWh (energy)).

Example 39

The method of Example 37, wherein the engagement rule set specifies the portion of the requested power level production to be provided by the corresponding DER in terms of a participation benefit (e.g., a value per unit power (dollars/kW)).

Example 40

The method of Example 37, wherein the engagement rule set specifies the portion of the requested power level production to be provided by the corresponding DER in terms of: an upper limit and an acceptable range of participation (e.g., in units power).

Example 41

The method of Example 35, wherein the impact representation comprises cost information, including optimized cost information of a corresponding DER participating in the response event.

Example 42

The method of Example 41, wherein the cost representation further includes one of: optimized participation (e.g., in kW); and marginal cost of participation (e.g., in dollars per kW).

Example 43

The method of Example 34, wherein the requested power level production is one of: an amount relative to a baseline level; and an amount relative to an expected level.

Example 44

The method of Example 34, wherein each selected DER is scheduled to produce a portion of the requested power level production by one or more of: a reduction in consumed power (e.g., through control of loads, generators, batteries); and original generation of electricity.

Example 45

The method of Example 34, wherein polling each site controller for a cost comprises: requesting a participation cost for the corresponding DER to participate in the response event; requesting a baseline cost for the DER without participation in the response event; and calculating the cost differential based on the participation cost and the baseline cost.

Example 46

The method of Example 34, wherein the aggregation opportunity further specifies an upshot to be received for providing the requested power level production over the period of time of the response event.

Example 47

The method of Example 46, wherein the upshot includes one or both of an economic benefit for participating in the response event and an economic penalty for not participating in the response event.

Example 48

The method of Example 46, wherein the upshot is a function of actual power level production above one of a baseline level and/or an expected level.

Example 49

The method of Example 46, wherein the upshot is a function of the requested power level production (i.e., the request rather than the result).

Example 50

The method of Example 46, wherein determining to participate in the response event includes comparing the upshot to a sum of the cost differentials.

Example 51

The method of Example 34, wherein polling each of the plurality of site controllers includes providing a proposed apportionment value indicating a portion of the requested power level production to be provided by the corresponding DER, and wherein the given local controller determines the cost differential based on the proposed apportionment value.

Example 52

The method of Example 51, wherein the proposed apportionment value of each given DER is determined based on one or more of: a total quantity of the plurality of DERs; a capacity of a battery of the energy storage system of the given DER relative to a capacity of all batteries of the energy storage systems of the plurality of DERs; a power output of a battery of the energy storage system of the given DER relative to a total power output of all batteries of the energy storage systems of the plurality of DERs; and assigning or otherwise indicating the total requested power level production as the proposed apportionment value.

Example 53

An aggregation engine (or engine) to perform a maneuver to aggregate distributed energy resources (DERs) to provide a requested power level production for a duration of a response event, the aggregation engine comprising: a communication interface to communicate over an electronic communication network with a local controller of each of a plurality of DERs; one or more processors to: determine a set of parameters for the plurality of DERs, the set of parameters including values for a set of decision variables for each DER of the plurality of DERs, each set of decision variables including one or more variables to indicate one or more of an amount of power production and a period of time for the corresponding DER to participate in the maneuver, wherein the values for each set of decision variables in the set of parameters are determined by the one or more processors polling a cost differential for each of the plurality of DERs and utilizing an optimization algorithm to find the values based on the cost differentials, wherein the cost differential is a difference in cost of a corresponding DER participating in the response event as compared to not participating in the response event; and provide, via the communication interface, an instruction and/or the values for each set of decision variables to a corresponding DER of the plurality of DERs for participation in the maneuver to provide the requested power level production.

Example 54

The aggregation engine of Example 53, the one or more processors further to: compare a total change in cost with an upshot for participation in the maneuver to determine to participate in the maneuver, wherein the total change in cost is a sum of the cost differentials for participation in the maneuver for the plurality of DERs.

Example 55

The aggregation engine of Example 54, wherein the upshot includes one or both of a benefit for participating in the response event and a penalty for not participating in the response event.

Example 56

The aggregation engine of Example 54, wherein the upshot is a function of actual power level production above one of a baseline level and/or an expected level.

Example 57

The aggregation engine of Example 54, wherein the upshot is a function of the requested power level production.

Example 58

The aggregation engine of Example 53, the one or more processors to determine the set of parameters by: repeatedly polling each given DER for a cost differential based on a permutation of values for the corresponding set of decision variables of the set of parameters.

Example 59

The aggregation engine of Example 53, wherein the optimization algorithm is one or more of: a continuous optimization algorithm, a constrained optimization algorithm, a generalized optimization algorithm, and a multivariable optimization algorithm.

Example 60

The aggregation engine of Example 53, wherein the requested power level production is an amount relative to a baseline level.

Example 61

The aggregation engine of Example 53, wherein the requested power level production is an amount relative to an expected level.

Example 62

The aggregation engine of Example 53, wherein providing the requested power level production comprises a reduction in consumed power.

Example 63

The aggregation engine of Example 53, wherein providing the requested power level production comprises original generation of electricity.

Example 64

The aggregation engine of Example 53, wherein polling a cost differential comprises: requesting a participation cost for the corresponding DER to participate in the maneuver; and requesting a baseline cost for the DER without participation in the maneuver, and wherein receiving the cost differential comprises receiving the participation cost and the baseline cost and calculating the cost differential.

Example 65

The aggregation engine of Example 53, wherein only a subset of the plurality of DERs participate in the maneuver to provide the requested power level production.

Example 66

A virtual power plant to provide a power level for a period of time of a response event, the virtual power plant comprising; a plurality of local controllers (e.g. site optimization engines) each corresponding to a distributed energy resource (DER) of a plurality of DERs, each local controller of the plurality of local controllers to optimize overall economics of operation of the corresponding DER by determining a set of control values for a set of control variables to control (e.g., effectuate a change to) the corresponding DER toward meeting a controller objective for economical optimization of the corresponding DER, wherein the set of control values are determined by one or more processors utilizing a primary optimization algorithm to identify the set of control values in accordance with a cost function (e.g., one or more constraints and one or more cost elements) associated with operation of the corresponding DER; and an aggregation engine (or engine) communicably coupled with each of the plurality of local controllers over an electronic communication network, the aggregation engine to: determine a set of parameters for the plurality of DERs, the set of parameters including values for a set of decision variables (e.g., a apportionment value, a time period) for each DER of the plurality of DERs, each set of decision variables including one or more variables to be considered in the cost function of a corresponding local controller and to indicate one or more of an amount of power production and a period of time for the corresponding DER to participate in the response event, wherein the values for each set of decision variables in the set of parameters are determined by polling a cost differential for each of the plurality of DERs and utilizing a secondary optimization algorithm to find the values based on the cost differentials of the plurality of DERs, wherein the cost differential is a difference in cost of a corresponding DER participating in the response event as compared to not participating in the response event; and provide, via the electronic communication network, an instruction and/or the values for each set of decision variables to the local controller of the corresponding DER of the plurality of DERs for participation in the response event to provide the requested power level production.

Example 67

The virtual power plant of Example 66, wherein each local controller of the plurality of local controllers determines the set of control values for the set of control variables by: preparing a cost function to operate on the set of control variables, the cost function including the one or more constraints, the one or more cost elements associated with operation of the electrical system, and; and executing a minimization of the cost function by utilizing the optimization algorithm to find the set of values for the set of control variables.

Example 68

The virtual power plant of Example 66, wherein the one or more cost elements include one or more of an electricity cost, an ESS degradation cost, an incentive associated with operation of an electrical system of the corresponding DER, a payment for contracted maneuvers, a value of a change in ESS energy, a value of reserve energy, revenue for demand response opportunities, revenue for ancillary services, a cost of local generation, and penalties and revenues associated with deviation from a prescribed or contracted operating plan.

Example 69

The virtual power plant of Example 66, wherein each local controller of the plurality of local controllers is further to receive a set of external inputs providing indication of one or more conditions that are external to the local controller and the DER, wherein the one or more processors determine the set of control values for the set of control variables with consideration of the one or more conditions.

Example 70

The virtual power plant of Example 66, wherein the a local controller is further configured to predict one or more of a load on an electrical system of the corresponding DER and generation by a generator of the electrical system of the corresponding DER during the period of time, wherein the determining the set of control values for the set of control variables includes consideration of the one or more of the predicted load and predicted generation during the period of time.

Example 71

The virtual power plant of Example 66, wherein the primary optimization algorithm is one or more of: a continuous optimization algorithm, a constrained optimization algorithm, a generalized optimization algorithm, and a multivariable optimization algorithm.

Example 72

The virtual power plant of Example 66, wherein the secondary optimization algorithm is one or more of: a continuous optimization algorithm, a constrained optimization algorithm, a generalized optimization algorithm, and a multivariable optimization algorithm.

Example 73

The virtual power plant of Example 66, the aggregation engine further to compare a total change in cost with an upshot for participation in the response event to determine to participate in the response event, wherein the total change in cost is a sum of the cost differentials for participation in the response event for the plurality of DERs.

Example 74

The virtual power plant of Example 73, wherein the upshot includes one or both of a benefit for participating in the response event and a penalty for not participating in the response event.

Example 75

The virtual power plant of Example 73, wherein the upshot is a function of actual power level production above one of a baseline level and/or an expected level.

Example 76

The virtual power plant of Example 73, wherein the upshot is a function of the requested power level production.

Example 77

The virtual power plant of Example 66, the aggregation engine to determine the set of parameters by: repeatedly polling each given DER for a cost differential based on a permutation of values for the corresponding set of decision variables of the set of parameters.

Example 78

The virtual power plant of Example 66, wherein providing the requested power level production comprises a reduction in consumed power.

Example 79

The virtual power plant of Example 66, wherein providing the requested power level production comprises original generation of electricity.

Example 80

The virtual power plant of Example 66, wherein polling the cost differential comprises: requesting a participation cost for the corresponding DER to participate in the maneuver; and requesting a baseline cost for the DER without participation in the maneuver, and wherein receiving the cost differential comprises receiving the participation cost and the baseline cost and calculating the cost differential.

Example 81

The virtual power plant of Example 66, wherein only a subset of the plurality of DERs participate in the response event to provide the requested power level production.

Example 82

The virtual power plant of Example 66, wherein polling the cost differential comprises: providing to each local controller an engagement rule set defining parameters for participating in the aggregation opportunity; and receiving a cost representation for the corresponding DER participating in the response event, the cost representation including the cost differential for the corresponding DER.

Example 83

A aggregation engine (optionally at a centralized location) to aggregate distributed energy resources (DERs), the aggregation engine comprising: a communication interface to communicate over an electronic communication network with a plurality of local controllers each local to and to control a DER; one or more processors to: receive an aggregation opportunity to participate in a response event, the aggregation opportunity specifying a requested power level production over a period of time of the response event and an upshot for providing the requested power level production for the period of time; provide, via the communication interface, a proposed set of apportionment values ($P_p$) to the plurality of local controllers, each proposed apportionment value of the set $P_p$ for a local controller of the plurality of local controllers and corresponding DER participation in the response event to provide the requested power level production for the period of time; receive from each local controller of the plurality of local controllers an optimized local impact on a corresponding DER of participating in the response event according to the set $P_p$ versus not participating in the response event; determine a final set of apportionment values ($P_f$), each value of the set $P_f$ for a local controller of the plurality of local controllers and corresponding DER, wherein the set $P_f$ is determined by the one or more processors utilizing an optimization algorithm; sum the local impacts of the plurality of local controllers to obtain a total participation impact; determine whether to participate in the response event by comparing the total participation impact with the upshot specified by the response event; and if the determination is to participate, provide via the communication interface the set $P_f$ and instructions to the plurality of local controllers to schedule a plurality of DERs for participation in the response event.

Example 84

The aggregation engine of Example 83, wherein each local impact indicates a delta of an impact on a corresponding DER of participating in the response event according to the set $P_f$ versus not participating in the response event.

Example 85

The aggregation engine of Example 83, wherein the upshot specified by the response event is a benefit to be received for providing the requested power level production over the period of time of the response event.

Example 86

The aggregation engine of Example 83, wherein the upshot specified by the response event is a penalty to be received for failing to provide the requested power level production over the period of time of the response event.

Example 87

The aggregation engine of Example 83, wherein the upshot specified by the response event includes one or both of an economic benefit for participating in the response event and an economic penalty for not participating in the response event.

Example 88

The aggregation engine of Example 83, wherein the one or more processors repeatedly poll each given DER according to the optimization algorithm to determine the set $P_f$.

Example 89

The aggregation engine of Example 83, wherein only a subset of the plurality of local controllers receive instructions for participation in the response event.

Example 90

A system to aggregate distributed energy resources (DERs), comprising: a plurality of site controllers (e.g., site optimization engines) each corresponding to and controlling a DER of a plurality of DERs, each site controller to determine a set of control values for a set of control variables to effectuate a change to the corresponding DER, wherein each site controller can determine an anticipated outcome (e.g., cost) of the corresponding DER operating during a given time period in accordance with one or more constraints and one or more cost elements associated with operation of the corresponding DER; an aggregation engine or engine (optionally centralized) to aggregate the plurality of DERs, the aggregation engine to: receive an aggregation opportunity to participate in a response event, the aggregation opportunity specifying a requested power level production over a period of time of the response event and an upshot for providing the requested power level production for the period of time; provide a proposed set of apportionment values ($P_p$) to the plurality of site controllers, each proposed apportionment value of the set $P_p$ corresponding to a site controller of the plurality of site controllers, the corresponding site controller to consider the apportionment value as a constraint; receive from each site controller of the plurality of site controllers a site impact for a corresponding DER participating in the response event, the site impact including an anticipated outcome of the DER operating according to the set $P_p$ and an anticipated outcome of the DER not participating in the response event; determine a final set of apportionment values ($P_f$), each value of the set $P_f$ for a site controller of the plurality of site controllers and corresponding DER, wherein the set $P_f$ is determined by the one or more processors utilizing an aggregation optimization algorithm; sum the site impacts of the plurality of site controllers to obtain a total participation impact; determine whether to participate in the response event by comparing the total participation impact with the upshot specified by the response event; and if the determination is to participate, instruct the plurality of site controllers to schedule the plurality of DERs for participation in the response event.

Example 91

The system of Example 90, each site controller to identify the set of control values to optimize performance of the DER based on the cost elements and the constraints.

Example 92

The system of Example 90, each site controller to identify the set of control values to optimize economic performance of the DER toward meeting an objective for economical optimization of the corresponding DER, wherein the set of control values are determined by one or more processors utilizing a site optimization algorithm to identify the set of control values in accordance with one or more constraints and one or more cost elements associated with operation of the corresponding DER.

Example 93

The system of Example 90, wherein one or more site controllers of the plurality of site controllers are remote from a corresponding DER and communicate with the DER over a communication network.

Example 94

The system of Example 90, wherein only a subset of the plurality of site controllers receive instructions for participation in the response event.

Example 95

The system of Example 90, wherein the aggregation engine repeatedly polls each site controller of the plurality of site controllers utilizing an optimization algorithm in order to determine the committed apportionment value for each of the plurality of DERs.

Example 96

The system of Example 90, wherein receiving the site impact comprises receiving a delta value from each of the plurality of DERs, the delta value indicating a difference in impact of participating in the response event versus not participating in the response event.

Example 97

The system of Example 90, wherein receiving the site impact comprises receiving from each of the plurality of DERs both a participation impact and a nonparticipation impact.

Example 98

The system of Example 90, wherein the power level production is one of: an amount relative to a baseline level; and an amount relative to an expected level.

Example 99

The system of Example 90, wherein producing a portion of the power level production comprises one or more of: a reduction in consumed power; generation of electricity.

Example 100

The system of Example 90, wherein the upshot includes one or both of a benefit for participating in the response event and a penalty for not participating in the response event.

Example 101

The system of Example 90, wherein the upshot is a function of power level production.

Example 102

The system of Example 90, each site controller is further to receive a set of configuration elements specifying the one or more constraints and defining the one or more cost elements associated with operation of the DER.

Example 103

The system of Example 90, wherein each site controller is further to receive (from a corresponding DER) a set of process variables that provide one or more measurements of a state of a corresponding DER.

Example 104

The system of Example 90, wherein each site controller determines the set of control values for the set of control variables by: preparing a cost function to operate on the set of control variables, the cost function including the one or more constraints and the one or more cost elements associated with operation of the electrical system; and executing a minimization of the cost function by utilizing the optimization algorithm to find the set of values for the set of control variables.

Example 105

The system of Example 90, wherein the one or more cost elements include one or more of an electricity cost, a ESS degradation cost, an incentive associated with operation of the electrical system, a payment for contracted maneuvers, a value of a change in ESS energy, a value of reserve energy, revenue for demand response opportunities, revenue for ancillary services, a cost of local generation, and penalties and revenues associated with deviation from a prescribed or contracted operating plan.

Example 106

The system of Example 90, wherein each site controller is further to receive a set of external inputs providing indication of one or more conditions that are external to the site controller and the corresponding DER, wherein each site controller determines the set of control values for the set of control variables with consideration of the one or more conditions.

Example 107

The system of Example 90, wherein each site controller predicts one or more of a load at the DER and generation by a local generator of the DER during an upcoming time domain, wherein the determining the set of control values for the set of control variables includes consideration of one or more of the predicted load and predicted generation during the upcoming time domain.

Example 108

The system of Example 90, wherein the site optimization algorithm is one or more of: a continuous optimization algorithm, a constrained optimization algorithm, a generalized optimization algorithm, and a multivariable optimization algorithm.

Example 109

The system of Example 90, wherein the aggregation optimization algorithm is one or more of: a continuous optimization algorithm, a constrained optimization algorithm, a generalized optimization algorithm, and a multivariable optimization algorithm.

Example 110

The system of Example 90, wherein the set of control variables is one of a plurality of control variable sets within a control parameter set X, each of the plurality of control variable sets to be applied to a different time segment within an upcoming time domain, the set of control variables to be applied to a corresponding time segment of the upcoming time domain and each other set of the plurality of control variable sets to be applied during a different time segment of the upcoming time domain, wherein the plurality of site controllers are further to determine a set of values for each control variable set of X and to provide the set of values for X.

Example 111

The system of Example 110, wherein providing the set of values for X comprises providing a given set of control values for each of the plurality of sets of control variables of X individually at a corresponding time segment of the upcoming time domain.

Example 112

A system of aggregated distributed energy resources (DERs), comprising: a plurality of site controllers (e.g. site optimization engines) each corresponding to and controlling a site of a plurality of sites each comprising one or more corresponding DER (e.g. a single DER) of a plurality of DERs, each site controller to determine a set of control values for a set of control variables to effectuate a change to the corresponding one or more DERs, wherein each site controller can determine a site impact (e.g., cost) of the corresponding one or more DERs operating during a given time period in accordance with one or more constraints and one or more cost elements associated with operation of the corresponding one or more DERs; an aggregation engine to aggregate the plurality of DERs, the aggregation engine to: receive an aggregation opportunity to participate in a response event, the aggregation opportunity specifying a requested power level production over a period of time of the response event and/or an upshot for providing the requested power level production for the period of time; provide an engagement rule set for each site controller of the plurality of site controllers, the engagement rule set defining parameters for the corresponding one or more DERs to participate in the response event by providing a power level production over a period of time, wherein each site controller considers the engagement rule set as a constraint; receive an impact representation from each site controller of the plurality of site controllers, the impact representation providing the site impact for the corresponding one or more DERs participating in the response event according to the engagement rule set verses versus not participating in the response event; determine a committed apportionment value for each site controller of the plurality of site controllers based on the impact representations received from the plurality of site controllers, wherein the committed apportionment value is determined by the one or more processors utilizing an aggregation optimization algorithm; sum the site impacts of the plurality of site controllers to obtain a total participation impact; determine whether to participate in the response event by comparing the total participation impact with the upshot specified by the response event; and if the determination is to participate, instruct the plurality of site controllers to schedule the plurality of DERs for participation in the response event.

Example 113

The system of aggregated DERs of Example 112, wherein the aggregation engine repeatedly polls each site controller of the plurality of site controllers utilizing an optimization algorithm in order to determine the committed apportionment value for each of the plurality of site controllers.

Example 114

The system of aggregated DERs of Example 112, wherein each site controller considers the corresponding committed apportionment value rule set as a constraint during operation to contribute to the plurality of DERs providing the requested power level production over a period of time.

Example 115

The system of aggregated DERs of Example 112, wherein receiving the impact representation comprises receiving a delta value from each of the plurality of site controllers, the delta value indicating a difference in impact of participating in the response event versus not participating in the response event.

Example 116

The system of aggregated DERs of Example 112, wherein receiving the impact representation comprises receiving from each of the plurality of site controllers both a participation impact and a nonparticipation impact.

Example 117

The system of aggregated DERs of Example 112, wherein engagement rule set comprises a proposed apportionment value for each given site based on one or more of: a quantity of the plurality of DERs; a capacity of a battery of the given DER relative to a capacity of all batteries of the plurality of sites; a power output of a battery of a given DER relative to a total power output of all batteries of the plurality of DERs; and assigning the total requested power level production as the proposed apportionment value.

Example 118

The system of aggregated DERs of Example 112, wherein the power level production is one of: an amount relative to a baseline level; and an amount relative to an expected level.

Example 119

The system of aggregated DERs of Example 112, wherein producing a portion of the power level production comprises one or more of: a reduction in consumed power; generation of electricity.

Example 120

The system of aggregated DERs of Example 112, wherein the committed apportionment value for each of the plurality of site controllers is also determined based on an upshot to be received for providing the power level production over the period of time.

Example 121

The system of aggregated DERs of Example 120, wherein the upshot includes one or both of a benefit for participating in the response event and a penalty for not participating in the response event.

Example 122

The system of aggregated DERs of Example 120, wherein the upshot is a function of power level production.

Example 123

A system of aggregated distributed energy resources (DERs), comprising: a plurality of site optimization engines each to control and optimize operation of a corresponding site of a plurality of sites, each site comprising one or more DERs, each site optimization engine to determine a set of control variables to effectuate a change to the corresponding site, wherein each site optimization engine determines a site impact (e.g., cost) of the corresponding site operating during a given time period in accordance with one or more constraints and one or more cost elements associated with operation of the corresponding site; an aggregation engine to aggregate the plurality of sites, the aggregation engine to: receive an aggregation opportunity to participate in a response event, the aggregation opportunity specifying a requested power level production over a period of time of the response event; poll, via the communication interface, each of the plurality of site optimization engines to inquire a site impact of each corresponding site participating in the response event; determine, based on a total impact of the plurality of site optimization engines, to participate in the response event; and transmit (or otherwise signal), via the communication interface, each of the plurality of site optimization engines to schedule participation of the plurality of sites in the response event, wherein participation comprises each site of the plurality of sites producing a portion of the requested power level production for the period of time of the response event.

Example 124

The system of aggregated DERs of Example 123, wherein the aggregation engine polls each of the plurality of site optimization engines by: providing to each site optimization engine an engagement rule set; and receiving an impact representation for the corresponding site participating in the response event, wherein the total impact is a summation of the impact representations for the plurality of sites.

Example 125

The system of aggregated DERs of Example 124, wherein the engagement rule set specifies a period of time and a portion of the requested power level production to be provided by the corresponding site.

Example 126

The system of aggregated DERs of Example 124, wherein the impact representation includes optimized cost information of a corresponding site participating in the response event.

Example 127

The system of aggregated DERs of Example 123, wherein the requested power level production is one of: an amount relative to a baseline level; and an amount relative to an expected level.

Example 128

The system of aggregated DERs of Example 123, wherein producing a portion of the requested power level production comprises one or more of: a reduction in consumed power; and generation of electricity.

Example 129

The system of aggregated DERs of Example 123, wherein polling to inquire a cost differential comprises: requesting a participation cost for the corresponding site to participate in the response event; requesting a baseline cost for the site without participation in the response event; receiving the participation cost and the baseline cost, and wherein the impact comprises a cost differential between the baseline cost and the participation cost.

Example 130

The system of aggregated DERs of Example 123, wherein the aggregation opportunity includes an upshot for providing the requested power level production over the period of time of the response event.

Example 131

The system of aggregated DERs of Example 130, wherein the upshot includes one or both of a benefit for participating in the response event and a penalty for not participating in the response event.

Example 132

The system of aggregated DERs of Example 130, wherein the upshot is a function of power level production.

Example 133

The system of aggregated DERs of Example 130, wherein the upshot is a function of the requested power level production.

Example 134

The system of aggregated DERs of Example 123, wherein the one or more processors poll each of the plurality of site optimization engines by providing a proposed apportionment value indicating a portion of the requested power level production to be provided by the corresponding DER.

Example 135

The system of aggregated DERs of Example 134, wherein the one or more processors determine the proposed apportionment value of each given DER based on one or more of: a quantity of the plurality of DERs; a capacity of a battery of the given DER relative to a capacity of all batteries of the plurality of DERs; a power output of a battery of the given DER relative to a total power output of all batteries of the plurality of DERs; and assigning the total requested power level production as the proposed apportionment value.

Example 136

A site controller of an electrical system of a site, the site controller comprising: a central interface configured to communicate with a central controller; a control interface configured to communicate with one or more distributed energy resources (DERs) of an electrical system of a site, the one or more DERs electrically controllable by one or more control values of one or more control variables delivered to the one or more DERs through the control interface; and one or more processors configured to: process a proposed engagement rule set received from the central controller through the central interface, the proposed engagement rule set value configured to indicate a proposed site change in power, by the one or more DERs, the site change in power comprising provision of electrical power, reduction of consumption of electrical power, or both during a proposed period of time; determine a predicted impact of implementing the site change in power indicated by the proposed engagement rule set over the predetermined period of time; and generate an impact response message to be transmitted to the central controller through the central interface, the impact response message indicating the predicted impact.

Example 137

The site controller of Example 136, wherein the one or more processors are further configured to: process a committed engagement rule set received from the central controller through the central interface, the committed engagement rule set configured to indicate a committed site change in power, by the one or more DERs, during a committed period of time; and determine optimal control values for the one or more control variables, the optimal control values selected to minimize an economic cost of implementing the committed engagement rule set; and control operation of the one or more DERs to implement the committed engagement rule set by providing the optimal control values to the one or more DERs through the control interface.

Example 138

The site controller of Example 136, wherein the predicted impact of implementing the proposed site change in power indicated by the proposed engagement rule set is selected to minimize an economic cost of the implementing.

Example 139

The site controller of Example 136, wherein the predicted impact of implementing the proposed site change in power indicated by the proposed engagement rule set comprises a predicted difference in economic cost between implementing the proposed site change in power and not implementing the proposed site change in power during the predetermined time period.

Example 140

The site controller of Example 136, wherein the predicted impact of implementing the proposed site change in power indicated by the proposed engagement rule set comprises a predicted economic cost of implementing the proposed site change in power and a predicted economic cost of not implementing the proposed site change in power during the predetermined time period.

Example 141

The site controller of Example 136, wherein the one or more DERs comprise one or more energy storage systems (ESSs), one or more electrical power generators, or both, and wherein the proposed site change in power comprises a total electrical power proposed to be provided by the site during the proposed period of time.

Example 142

The site controller of Example 136, wherein the one or more DERs comprise one or more loads, and wherein the proposed site change in power comprises a total proposed reduction of consumption of electrical power by the one or more loads.

Example 143

The site controller of Example 136, wherein the proposed engagement rule set value comprises a proposed apportionment value, and wherein the electrical system is configured to participate in aggregation opportunities together with one or more other electrical systems at one or more other sites through the central controller.

Example 144

The site controller of Example 136, wherein the one or more processors are further configured to determine predicted impacts of implementing a plurality of different proposed engagement rule sets and generate impact response messages to report the predicted impacts to the central controller through the central interface.

Example 145

The site controller of Example 144, wherein the plurality of different proposed engagement rule sets is received one at a time and the impact response messages are transmitted to the central controller one at a time after reception of each corresponding one of the engagement rule sets.

Example 146

The site controller of Example 144, wherein the plurality of different engagement rule sets is received together and the impact response messages are transmitted to the central controller together after reception of the plurality of different engagement rule sets.

Example 147

A method of operating an electrical system including one or more distributed energy resources (DERs) at a site, the method comprising: receiving a proposed engagement rule set from a central controller, the proposed engagement rule set indicating a proposed site change in power, the proposed site change in power to be implemented by one or more DERs of an electrical system at a site during a predetermined period of time, the proposed site change in power comprising a provision of electrical power from the DERs, a reduction of consumption of electrical power by the DERs, or both; determining an optimal predicted economic impact of implementing the proposed site change in power with the DERs during the predetermined period of time; and reporting the optimal predicted economic impact of implementing the proposed site change in power to the central controller to enable the central controller to determine whether to commit the site to the site change in power (e.g., participation in a contracted maneuver).

Example 148

The method of Example 147, further comprising receiving a committed engagement rule set from the central controller, the committed engagement rule set indicating a committed site change in power, the committed site change in power to be implemented by the one or more DERs at the site during a committed period of time; and controlling operation of the one or more DERs to minimize a predicted economic cost of implementing the committed site change in power.

Example 149

The method of Example 148, wherein the committed engagement rule set received from the central controller is the same as the proposed engagement rule set.

Example 150

The method of Example 147, wherein determining an optimal predicted economic impact of implementing the proposed site change in power comprises constructing a cost function including a sum of predicted economic costs of operating the electrical system and performing an optimization algorithm on the cost function.

Example 151

The method of Example 150, wherein constructing a cost function comprises summing predicted time of use (ToU) supply charges and predicted demand charges.

Example 152

The method of Example 151, wherein constructing a cost function further includes summing the predicted ToU supply charges and the predicted demand charges with equipment degradation costs associated with degradation of at least one of the one or more DERs.

Example 153

A site controller of an electrical system, comprising: one or more data storage devices configured to store a proposed apportionment value received from an aggregation engine, the proposed apportionment value configured to indicate a proposed site change in power by an electrical system at a site during a proposed period of time, the proposed site change in power comprising part of a requested net change in power of an aggregation opportunity; and one or more processors operably coupled to the one or more data storage devices, the one or more processors configured to: determine a predicted impact of implementation of the proposed site change in power of the electrical system during the proposed period of time; report the predicted impact of implementation of the proposed site change in power to the aggregation engine; determine an optimal operation of one or more distributed energy resources (DERs) of the electrical system subject to a committed apportionment value received from the aggregation engine, the committed apportionment value configured to indicate a committed site change in power by the electrical system during the proposed period of time; and control the one or more DERs according to the determined optimal operation during the proposed period of time.

Example 154

The site controller of Example 153, wherein the one or more DERs include one or more loads having energy generation properties.

Example 155

The site controller of Example 153, wherein the one or more DERs include one or more loads having energy storage properties.

Example 156

The site controller of Example 153, wherein the predicted impact of implementation of the proposed site change in power on operation of the electrical system comprises an optimal predicted impact of implementation of the proposed site change in power.

Example 157

The site controller of Example 153, wherein the predicted impact of implementation of the proposed site change in power on operation of the electrical system comprises a minimum economic impact of implementation of the proposed site change in power.

Example 158

The site controller of Example 153, wherein the one or more DERs include an energy storage system (ESS).

Example 159

The site controller of Example 158, wherein the predicted impact of implementation of the proposed site change in power on operation of the electrical system takes into consideration a degradation cost of operating the ESS.

Example 160

A method to aggregate distributed energy resources (DERs), comprising: receiving at an aggregation engine an aggregation opportunity to participate in a response event, the aggregation opportunity specifying a requested power level production over a period of time of the response event; polling a plurality of site optimization engines each to control and optimize operation of a corresponding site of a plurality of sites each comprising one or more DERs, the polling to inquire a site impact of each corresponding site participating in the response event, the polling from the aggregation engine over a communication network to which the plurality of site optimization engines is connected; determining at each site optimization engine a site impact of the corresponding site operating during a given time period in accordance with one or more constraints and one or more cost elements associated with operation of the corresponding site; determining at the aggregation engine to participate in the response event, based on a total impact to the plurality of sites; instructing from the aggregation engine to each of the plurality of site optimization engines to schedule participation of the plurality of sites in the response event; and determining at each of the plurality of site optimization engines a set of control variables to effectuate a change to the corresponding site to participate in the response event by producing a portion of the requested power level production for the period of time of the response event.

Example 161

The method of Example 160, wherein polling comprises: providing an engagement rule set from the aggregation engine to each of the plurality of site optimization engines; and receiving an impact representation at each of the plurality of site optimization engines for the corresponding site participating in the response event, wherein the total impact is a summation of the impact representations for the plurality of sites.

Example 162

The method of Example 160, wherein polling comprises: repeatedly polling each site controller of the plurality of site controllers utilizing an aggregation optimization algorithm in order to determine a committed apportionment value for each of the plurality of site controllers.

Example 163

The method of Example 160, wherein producing a portion of the requested power level production comprises one or more of: reducing consumed power at the site; and generating of electricity at the site.

Example 164

An aggregation engine to aggregate power of distributed energy resources (DERs), the aggregation engine comprising: a communication interface to communicate over an electronic communication network with a plurality of site controllers each corresponding to a site of a plurality of sites each including one or more DERs; one or more processors to: receive an aggregation opportunity to participate in a response event, the aggregation opportunity specifying a requested net change in power over a period of time of the response event, the net change in power comprising a power level production, a reduction in consumption of power, or combinations thereof; poll, via the communication interface, each of the plurality of site controllers to inquire an impact of a corresponding site participating in the response event; determine, based on a total impact of the plurality of site controllers, to participate in the response event; and transmit, via the communication interface, a command to selected site controllers to schedule corresponding site participation in the response event by providing a portion of the requested net change in power for the period of time of the response event.

Example 165

An aggregation engine to aggregate distributed energy resources (DERs), the aggregation engine comprising: a communication interface to communicate over an electronic communication network with a site controller of each of a plurality of sites, each site of the plurality of sites including one or more DERs; one or more processors to: provide an engagement rule set to the site controller of each site of the plurality of sites, the engagement rule set defining parameters for a given site to participate in a response event; receive an impact representation from the site controller of each site of the plurality of sites, the impact representation indicating an impact of participation of the corresponding site in the response event; determine a committed apportionment value for each site of the plurality of sites based on the impact representations of the plurality of sites; and schedule participation in the response event by transmitting, via the communication interface, the committed apportionment values and instructions to each site controller of the plurality of sites to provide a portion of a requested net change in power for the response event according to the corresponding committed apportionment value.

Example 166

An aggregation engine to aggregate distributed energy resources (DERs), the aggregation engine comprising: a communication interface to communicate over an electronic communication network with a site controller of each of a plurality of sites, each of the plurality of sites including one or more DERs; one or more processors to: provide proposed apportionment values to the plurality of site controllers of the plurality of sites for participating in a response event to provide a net change in power over a period of time; receive differential values from the plurality of site controllers, each differential indicating a delta of an impact on a corresponding site of participating in the response event versus not participating in the response event; determine a committed apportionment value for each of the plurality of sites based on the differential values of the plurality of sites; and provide, via the communication interface, the committed apportionment values and instructions to the plurality of site controllers to schedule participation in the response event, wherein each of the plurality of sites is to participate in the response event by providing a portion of the net change in power according to the site's corresponding committed apportionment value.

The described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

Principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component (e.g., engine, system, subsystem) may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure.

The scope of the present invention should, therefore, be determined only by the following claims.

The invention claimed is:

1. A system of aggregated distributed energy resources (DERs), comprising:
    a plurality of site controllers each corresponding to and controlling a site of a plurality of sites each comprising one or more corresponding DERs of a plurality of DERs, each site controller to determine a set of control values for a set of control variables to effectuate a change to the corresponding one or more DERs, wherein each site controller can determine a site impact of the corresponding one or more DERs operating during a given time period in accordance with one or more constraints and one or more cost elements associated with operation of the corresponding one or more DERS;
    an aggregation engine to aggregate the plurality of DERs, the aggregation engine to:
    receive an aggregation opportunity to participate in a response event, the aggregation opportunity specifying a requested power level production over a period of time of the response event;
    provide an engagement rule set to each site controller of the plurality of site controllers, the engagement rule set comprising a proposed site change in power by the one or more DERs, the proposed site change in power comprising one or more of provision of electrical power and reduction of consumption of electrical power during a proposed period of time, wherein the proposed site change in power comprises multiple requested power levels corresponding to multiple portions of the proposed period of time of the aggregation opportunity;
    wherein the engagement rule set is used to determine a predicted impact of implementing the proposed site change in power, as indicated by the proposed engagement rule set, over the proposed period of time by determining a cost of operation for the site using the proposed site change in power, wherein to determine the cost of operation, each of the plurality of site controllers:
    predict local load and generation during a time period associated with the aggregation opportunity by:

performing an interpolation from observed load values to determine a load shape,
determining a scale and an offset based on the interpolation to determine the load shape and based on historic average values, and
generating a corrected load shape from which a future load value can be predicted, wherein the corrected load shape is generated based on the scale and the offset as applied to the load shape;
define a plurality of hypothetical control parameter sets that comprise the one or more values for the one or more control variables to control the one or more DERs to effectuate a change toward meeting the proposed site change in power for the aggregation opportunity, the plurality of control hypothetical parameter sets corresponding to a plurality of segments of the time period associated with the aggregation opportunity; and
minimize the cost of operation by determining which of the plurality of hypothetical control parameter sets results in a lowest site operating cost;
wherein the aggregation engine is configured to:
receive an impact representation from each site controller of the plurality of site controllers, the impact representation providing the site impact for the corresponding one or more DERs participating in the response event according to the engagement rule set versus not participating in the response event;
determine a committed apportionment value for each site controller of the plurality of site controllers based on the impact representations received from the plurality of site controllers, wherein the committed apportionment value is determined by one or more processors utilizing an aggregation optimization algorithm;
sum the site impacts of the plurality of site controllers to obtain a total participation impact;
determine whether to participate in the response event by comparing the total participation impact with the upshot specified by the response event;
and if the determination is to participate, instruct the plurality of site controllers to schedule the plurality of DERs for participation in the response event.

2. The system of aggregated DERs of claim 1, wherein the aggregation engine repeatedly polls each site controller of the plurality of site controllers utilizing the aggregation optimization algorithm in order to determine the committed apportionment value for each of the plurality of site controllers.

3. The system of aggregated DERs of claim 1, wherein each site controller considers a rule of the corresponding committed apportionment value, the rule set as a constraint during operation to contribute to the plurality of DERs providing the requested power level production over a period of time.

4. The system of aggregated DERs of claim 1, wherein receiving the impact representation comprises receiving a delta value from each of the plurality of site controllers, the delta value indicating a difference in impact of the site participating in the response event versus not participating in the response event.

5. The system of aggregated DERs of claim 1, wherein receiving the impact representation comprises receiving from each of the plurality of site controllers both a participation impact and a nonparticipation impact.

6. The system of aggregated DERs of claim 1, wherein the engagement rule set comprises a proposed apportionment value for each given site based on one or more of:
a quantity of the plurality of sites;
a capacity of a battery of a given DER relative to a capacity of all batteries of the plurality of DERs;
a power output of a battery of the given DER relative to a total power output of all batteries of the plurality of DERs; and
assigning the total requested power level production as the proposed apportionment value.

7. The system of aggregated DERs of claim 1, wherein the power level production is one of
an amount relative to a baseline level; and
an amount relative to an expected level.

8. The system of aggregated DERs of claim 1, wherein producing a portion of the power level production comprises one or more of:
a reduction in consumed power; and generation of electricity.

9. The system of aggregated DERs of claim 1, wherein the committed apportionment value for each of the plurality of site controllers is also determined based on an upshot to be received for providing the power level production over the period of time.

10. The system of aggregated DERs of claim 9, wherein the upshot includes one or both of a benefit for participating in the response event and a penalty for not participating in the response event.

11. The system of aggregated DERs of claim 9, wherein the upshot is a function of power level production.

12. A system of aggregated distributed energy resources (DERs), comprising:
a plurality of site optimization engines each to control and optimize operation of a corresponding site of a plurality of sites, each site comprising one or more DERs, each site optimization engine to determine a set of control variables to effectuate a change to the corresponding site, wherein each site optimization engine determines a site impact of the corresponding site operating during a given time period in accordance with one or more constraints and one or more cost elements associated with operation of the corresponding site;
an aggregation engine to aggregate the plurality of sites, the aggregation engine to:
receive an aggregation opportunity to participate in a response event, the aggregation opportunity specifying a requested power level production over a period of time of the response event;
provide an engagement rule set to each of the plurality of site optimization engines, the engagement rule set comprising a proposed site change in power by the one or more DERs, the proposed site change in power comprising one or more of provision of electrical power and reduction of consumption of electrical power during a proposed period of time, wherein the proposed site change in power comprises multiple requested power levels corresponding to multiple portions of the proposed period of time of the aggregation opportunity;
wherein the engagement rule set is used to determine a predicted impact of implementing the proposed site change in power, as indicated by the proposed engagement rule set, over the proposed period of time by determining a cost of operation for the site using the proposed site change in power, wherein to determine the cost of operation, each of the plurality of site controllers:
predict local load and generation during a time period associated with the aggregation opportunity by:
performing an interpolation from observed load values to determine a load shape,
determining a scale and an offset based on the interpolation to determine the load shape and based on historic average values, and
generating a corrected load shape from which a future load value can be predicted, wherein the corrected load shape is generated based on the scale and the offset as applied to the load shape;
define a plurality of hypothetical control parameter sets that comprise the one or more values for the one or more control variables to control the one or more DERs to effectuate a change toward meeting the proposed site change in power for the aggregation opportunity, the plurality of control hypothetical parameter sets corresponding to a plurality of segments of the time period associated with the aggregation opportunity; and
minimize the cost of operation by determining which of the plurality of hypothetical control parameter sets results in a lowest site operating cost;
poll, via a communication interface, each of the plurality of site optimization engines to inquire a site impact of each corresponding site participating in the response;
determine, based on a total impact of the plurality of sites, to participate in the response event; and
signal, via the communication interface, each of the plurality of site optimization engines to schedule participation of the plurality of sites in the response event, wherein participation comprises each site of the plurality of sites producing a portion of the requested power level production for the period of time of the response event.

13. The system of aggregated DERs of claim 12, wherein the aggregation engine polls each of the plurality of site optimization engines by:
providing to each site optimization engine an engagement rule set; and
receiving an impact representation for the corresponding site participating in the response event,
wherein the total impact is a summation of the impact representations for the plurality of sites.

14. The system of aggregated DERs of claim 13, wherein the engagement rule set specifies a period of time and a portion of the requested power level production to be provided by the corresponding site.

15. The system of aggregated DERs of claim 13, wherein the impact representation includes optimized cost information of a corresponding site participating in the response event.

16. The system of aggregated DERs of claim 12, wherein producing a portion of the requested power level production comprises one or more of:
a reduction in consumed power; and
generation of electricity.

17. The system of aggregated DERs of claim 12, wherein the aggregation engine polls by:
requesting a participation cost for the corresponding site to participate in the response event;
requesting a baseline cost for the site without participation in the response event; and
receiving the participation cost and the baseline cost,
wherein the-site impact comprises a cost differential between the baseline cost and the participation cost.

18. The system of aggregated DERs of claim 12, wherein the aggregation engine polls each of the plurality of site optimization engines by providing a proposed apportionment value indicating a portion of the requested power level production to be provided by the corresponding DER.

19. A method to aggregate distributed energy resources (DERs), comprising:
receiving at an aggregation engine an aggregation opportunity to participate in a response event, the aggregation opportunity specifying a requested power level production over a period of time of the response event;
polling a plurality of site optimization engines each to control and optimize operation of a corresponding site of a plurality of sites, each comprising one or more DERs, the polling to inquire a site impact of each corresponding site participating in the response event, the polling from the aggregation engine over a communication network to which the plurality of site optimization engines is connected;
determining at each site optimization engine a site impact of the corresponding site operating during a given time period in accordance with one or more constraints and one or more cost elements associated with operation of the corresponding site;
determining at the aggregation engine to participate in the response event, based on a total impact to the plurality of sites that is based at least in part on an engagement rule set provided by the aggregation engine, the engagement rule set comprising a proposed site change in power by the one or more DERs, the proposed site change in power comprising one or more of provision of electrical power and reduction of consumption of electrical power during a proposed period of time, wherein the proposed site change in power comprises multiple requested power levels corresponding to multiple portions of the proposed period of time of the aggregation opportunity;
wherein the engagement rule set is used to determine a predicted impact of implementing the proposed site change in power, as indicated by the proposed engagement rule set, over the proposed period of time by determining a cost of operation for the site using the proposed site change in power, wherein to determine the cost of operation, each of the plurality of site controllers:
predict local load and generation during a time period associated with the aggregation opportunity by:
performing an interpolation from observed load values to determine a load shape,
determining a scale and an offset based on the interpolation to determine the load shape and based on historic average values, and
generating a corrected load shape from which a future load value can be predicted, wherein the corrected load shape is generated based on the scale and the offset as applied to the load shape;
define a plurality of hypothetical control parameter sets that comprise the one or more values for the one or more control variables to control the one or more DERs to effectuate a change toward meeting the proposed site change in power for the aggregation opportunity, the plurality of control hypothetical parameter sets corresponding to a plurality of segments of the time period associated with the aggregation opportunity; and minimize the cost of operation by determining which of the plurality of hypothetical control parameter sets results in a lowest site operating cost;

instructing from the aggregation engine to each of the plurality of site optimization engines to schedule participation of the plurality of sites in the response event; and determining at each of the plurality of site optimization engines a set of control variables to effectuate a change to the corresponding site to participate in the response event by producing a portion of the requested power level production for the period of time of the response event.

20. The method of claim 19, wherein polling comprises:
providing an engagement rule set from the aggregation engine to each of the plurality of site optimization engines; and receiving an impact representation at each of the plurality of site optimization engines for the corresponding site participating in the response event, wherein the total impact is a summation of the impact representations for the plurality of sites.

21. The method of claim 19, wherein polling comprises:

repeatedly polling each site controller of the plurality of site controllers utilizing an aggregation optimization algorithm in order to determine a committed apportionment value for each of the plurality of site controllers.

22. The method of claim 19, wherein producing a portion of the requested power level production comprises one or more of:

reducing consumed power at the site; and generating of electricity at the site.

* * * * *